United States Patent
Baar

(10) Patent No.: US 7,979,313 B1
(45) Date of Patent: Jul. 12, 2011

(54) PARTS USAGE COMPARISON SYSTEM AND METHODS

(76) Inventor: Peter Baar, Tucson, AZ (US)

( * ) Notice: Subject to any disclaimer, the term of this patent is extended or adjusted under 35 U.S.C. 154(b) by 1562 days.

(21) Appl. No.: 11/229,391

(22) Filed: Sep. 15, 2005

Related U.S. Application Data

(60) Provisional application No. 60/610,478, filed on Sep. 15, 2004.

(51) Int. Cl.
*G06Q 30/00* (2006.01)
(52) U.S. Cl. .............. 705/26.1; 705/26.4; 705/26.41; 705/26.61; 705/28
(58) Field of Classification Search .................. None
See application file for complete search history.

(56) References Cited

U.S. PATENT DOCUMENTS

| | | | |
|---|---|---|---|
| 5,715,402 A | 2/1998 | Popolo | |
| 5,870,733 A | 2/1999 | Bass et al. | |
| 5,965,858 A | 10/1999 | Suzuki et al. | |
| 6,029,195 A | 2/2000 | Herz | |
| 6,119,101 A | 9/2000 | Peckover | |
| 6,219,653 B1 | 4/2001 | O'Neill et al. | |
| 2002/0062275 A1* | 5/2002 | Dyke | 705/37 |
| 2003/0115115 A1* | 6/2003 | Ouchi | 705/27 |
| 2003/0154127 A1* | 8/2003 | McAuliffe et al. | 705/14 |
| 2007/0143661 A1* | 6/2007 | Machalek | 715/503 |

OTHER PUBLICATIONS

"Royal Oak Assets to be Sold by August", Blobe & Mail, p. B13, May 4, 1999.*
"Integrating CRM: No. pain, no. gain", MacVittie, Lori, Network Computing, vol. 14, iss. 11, p. 58, Jun. 13, 2003.*

* cited by examiner

*Primary Examiner* — M. Thein
(74) *Attorney, Agent, or Firm* — Schmeiser, Olsen & Watts LLP

(57) ABSTRACT

A parts usage comparison system and methods to directly network buyers and sellers in the mining, construction and agriculture industries in order for buyers to easily and efficiently procure parts and for sellers to easily and efficiently liquidate surplus assets specific to the aforementioned particular industries. The present invention provides methods of searching, buying and selling new, used and reman or rebuilt products. The parts usage and comparison system includes a parts database, a processor coupled to the parts database and a software interface. Third party buyers and third party sellers are connected to the parts database through the software interface. This connection allows searching and maintaining of information on the database.

20 Claims, 72 Drawing Sheets

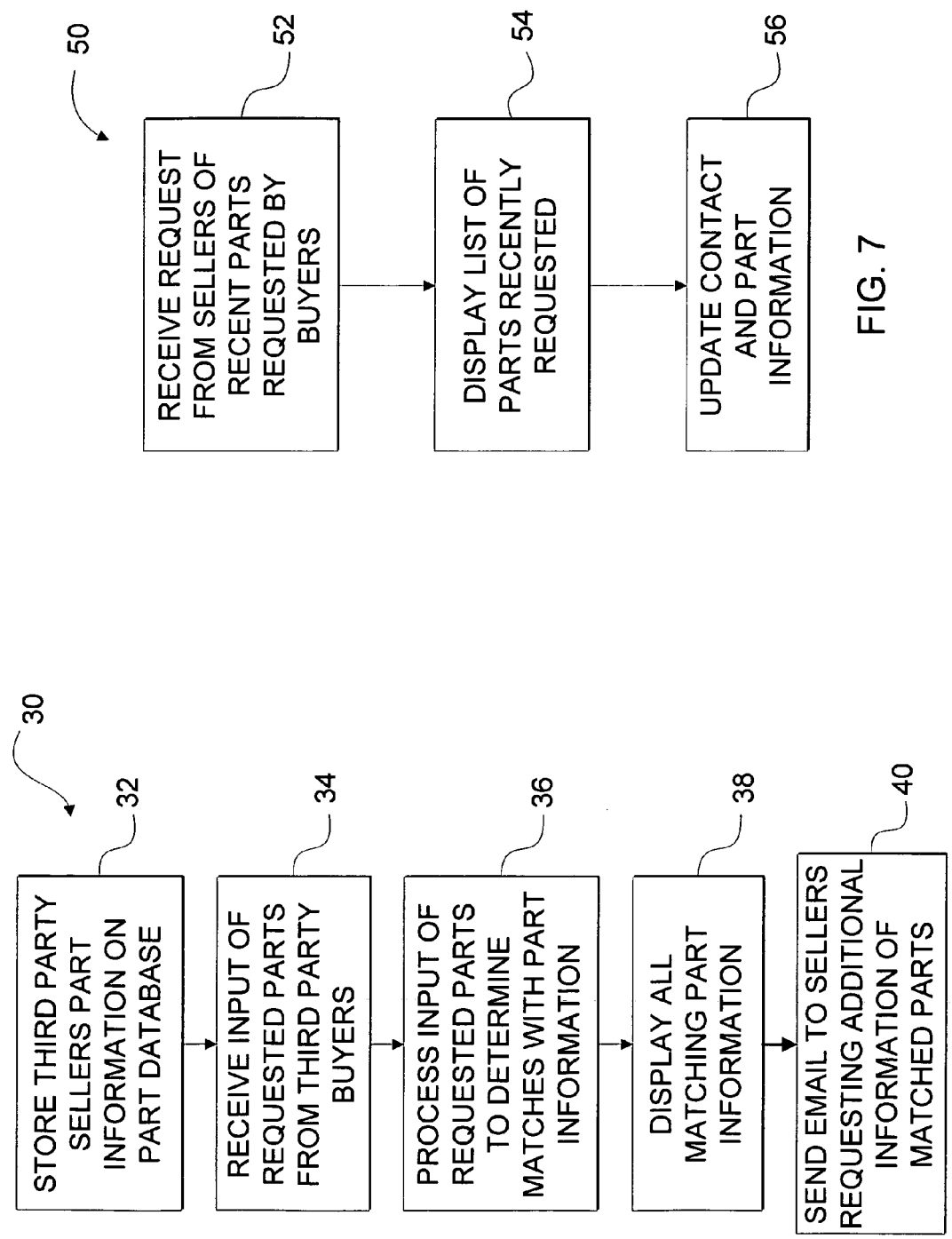

| Manufacturer | Quantity | PartNumber | Description | Condition | Price | Surplus | Branch | Company | ContactName | ContactPhone | Conta |
|---|---|---|---|---|---|---|---|---|---|---|---|
| KOEHRING | 1 | 1228-13 | NUT | U | | x | | Global Parts Solution | Pete Baar | 480-706-1762 | 480-70 |
| KOEHRING | 1 | 1228-15 | LOCK WASHER | U | | x | | Global Parts Solution | Pete Baar | 480-706-1762 | 480-70 |
| KOEHRING | 1 | 1228-16 | WASHER | U | | x | | Global Parts Solution | Pete Baar | 480-706-1762 | 480-70 |
| KOEHRING | 2 | 10423 | SHIM | N | $0.07 | x | | Global Parts Solution | Pete Baar | 480-706-1762 | 480-70 |
| KOEHRING | 1 | 1070 | KT, SEA | N | $19.39 | x | | Global Parts Solution | Pete Baar | 480-706-1762 | 480-70 |
| KOEHRING | 8 | 10848 | LOCK | N | $0.07 | x | | Global Parts Solution | Pete Baar | 480-706-1762 | 480-70 |
| KOEHRING | 8 | 10849 | LOCK | N | $0.07 | x | | Global Parts Solution | Pete Baar | 480-706-1762 | 480-70 |
| KOEHRING | 1 | 12014-15 | BUSHING | N | $94.74 | x | | Global Parts Solution | Pete Baar | 480-706-1762 | 480-70 |
| KOEHRING | 2 | 12014-6 | BUSHING | N | $100.73 | x | | Global Parts Solution | Pete Baar | 480-706-1762 | 480-70 |
| KOEHRING | 2 | 12014-7 | BUSHING | N | $47.98 | x | | Global Parts Solution | Pete Baar | 480-706-1762 | 480-70 |
| KOEHRING | 2 | 12014-9 | BUSHING | N | $49.80 | x | | Global Parts Solution | Pete Baar | 480-706-1762 | 480-70 |
| KOEHRING | 1 | 12019-317 | VALVE | N | $52.03 | x | | Global Parts Solution | Pete Baar | 480-706-1762 | 480-70 |
| KOEHRING | 2 | 12019-323 | SWITCH | N | $25.82 | x | | Global Parts Solution | Pete Baar | 480-706-1762 | 480-70 |
| KOEHRING | 1 | 12019-533 | VALVE | N | $69.46 | x | | Global Parts Solution | Pete Baar | 480-706-1762 | 480-70 |
| KOEHRING | 1 | 12019-96 | VALVE | N | $18.07 | x | | Global Parts Solution | Pete Baar | 480-706-1762 | 480-70 |
| KOEHRING | 2 | 1217-247 | FOLLOWER | N | $0.07 | x | | Global Parts Solution | Pete Baar | 480-706-1762 | 480-70 |
| KOEHRING | 2 | 1217-251 | BEARING | N | $22.73 | x | | Global Parts Solution | Pete Baar | 480-706-1762 | 480-70 |

FIG. 56

| Manufacturer | Quantity | PartNumber | Description | Condition | WholesalePrice | Surplus | Branch | Company | ContactName |
|---|---|---|---|---|---|---|---|---|---|
| KM | 12 | 104-62-37250 | CLIP | N | | x | 08 | Roland Machinery Company | Rosie Jacobi |
| KM | 2 | 112-94-64170 | CLIP | N | | x | 10 | Road Machinery Co | Shel Leibach |
| OandK | 1 | 1143422 | CLIP | N | | x | | Domex | Ms. Dana Ellefson |
| OandK | 17 | 1148136 | CLIP | N | | x | | Domex | Ms. Dana Ellefson |
| OandK | 1 | 1148149 | CLIP | N | | x | | Domex | Ms. Dana Ellefson |
| CD | 75 | 116678 | CLIP | N | | x | | Binder Machinery Company | Cecil Hughes |
| CD | 75 | 116678 | CLIP | N | | x | | Parts Unlimited | Mr. Shawn Calmers |
| CD | 80 | 128263 | CLIP | N | | x | | Binder Machinery Company | Cecil Hughes |
| CD | 80 | 128263 | CLIP | N | | x | | Parts Unlimited | Mr. Shawn Calmers |
| Komatsu | 1 | 135-04-32140 | CLIP | N | | x | Edmonton | Coneco Equipment Company | Bob Kular |
| KM | 5 | 141-06-11220 | CLIP | N | | x | 15 | Road Machinery Co | Shel Leibach |
| OandK | 3 | 1411736 | CLIP | N | | x | | Domex | Ms. Dana Ellefson |
| Komatsu | 1 | 142-06-13530 | CLIP | N | | x | Edmonton | Coneco Equipment Company | Bob Kular |
| Komatsu | 1 | 145-279-6620 | CLIP | N | | x | Edmonton | Coneco Equipment Company | Bob Kular |
| Komatsu | 61 | 14X-911-6291 | CLIP | N | | x | Edmonton | Coneco Equipment Company | Bob Kular |
| Onan | 1 | 150-0694 | CLIP | N | | x | | Ditch Witch of New Jersey | Tom Crouse |
| OandK | 1 | 1634531 | CLIP | N | | x | | Domex | Ms. Dana Ellefson |

PARTS USAGE COMPARISON SYSTEM AND METHODS

CROSS REFERENCE TO RELATED APPLICATION

This application claims priority to U.S. Provisional Patent Application Ser. No. 60/610,478, filed Sep. 15, 2004 by Peter Baar and entitled "PARTS USAGE COMPARISON SOFTWARE," the disclosure of which is hereby incorporated entirely herein by reference.

BACKGROUND OF THE INVENTION

1. Technical Field

The present invention relates generally to a system and methods for parts procurement and liquidation of surplus assets, and more specifically to a system and methods to directly network buyers and sellers in the mining, construction and agriculture industries in order to procure parts and liquidate surplus assets specific to the aforementioned particular industries.

2. State of the Art

The mining, construction and agriculture industries each have particular machinery and tools that require specific parts for such machinery and tools to properly function. As these parts are worn out they must be replaced for continued proper function of the machinery and tools. Additionally, some companies within these industries purchase several parts and inventory them for expected future use. Often, due to the inventory of parts, a surplus of parts is developed. This surplus of parts creates the need for liquidation of the inventoried parts.

Conventional systems and methods require the company in need of a particular part to search and procure them directly from a company. This often requires large amounts of time and effort to locate a seller of the needed parts, ensure they have the proper quantity of parts needed, determine the condition of the parts and then ship the parts to the buying company. Further, such conventional methods require the seller of parts to market and advertise their parts, incurring costs and time directed at the selling of parts, rather than at the core market of their business.

DISCLOSURE OF THE INVENTION

The present invention relates generally to a system and methods to directly network buyers and sellers in the mining, construction and agriculture industries in order to procure parts and liquidate surplus assets specific to the aforementioned particular industries. A particular aspect of the invention includes a parts usage comparison system for buying and selling parts, the system comprising at least one parts database storing part information corresponding to a plurality of new, used and reman parts, the part information comprising existing new, used and reman parts inventory of a plurality of third party sellers and a processor coupled to the parts database, the processor configured to receive the part information, store the information in the database, and process information in the database. The system further comprises a software interface in electronic communication with the processor, wherein the software interface is configured to receive input of requested parts from a plurality of third party buyers, the processor is further configured to process the input of requested parts and determine matches of the requested parts and the part information and the software interface is further configured to display all matching part information corresponding to the input of requested parts.

Another aspect of the invention includes a method of using a parts usage comparison system for buying and selling parts, the method comprising storing part information corresponding to a plurality of new, used and reman parts, the part information comprising existing new, used and reman parts inventory of a plurality of third party sellers on at least one parts database and receiving input of requested parts from a plurality of third party buyers through a software interface. The method also comprises processing the input of requested parts to determine matches of the requested parts and the part information and displaying all matching part information corresponding to the input of requested parts through the software interface.

Another aspect of the invention includes a method of using a parts usage comparison system for buying and selling parts, the method comprising storing part information corresponding to a plurality of new, used and reman parts, the part information comprising existing new, used and reman parts inventory of a plurality of third party sellers on at least one parts database and receiving input of requested parts from a plurality of third party buyers through a software interface. The method also comprises processing the input of requested parts to determine matches of the requested parts and the part information and displaying all matching part information corresponding to the input of requested parts through the software interface. The method further comprises sending an email from the plurality of third party buyers requesting pricing of the requested parts to the plurality of third party sellers who have matching parts.

Further the method may comprise requesting recent parts requested by the plurality of third party buyers by a third party seller through use of the software interface, wherein requesting recent parts requested includes requesting all recent parts requested and matching buyer self entered part number and model to sellers information stored on the parts database, displaying a list of recent parts requested through the software interface and updating contact information and part inventory of the plurality of third party sellers through the software interface.

The foregoing and other features and advantages of the present invention will be apparent from the following more detailed description of the particular embodiments of the invention.

BRIEF DESCRIPTION OF THE DRAWINGS

FIG. 6 is a flow chart of a method of searching for parts by a buyer using a parts usage comparison system; and FIG. 7 is a flow chart of a method of seller inventory management using a parts usage comparison system.

DETAILED DESCRIPTION OF EMBODIMENTS OF THE INVENTION

As discussed above, embodiments of the present invention relate to a system and methods to directly network buyers and sellers in the mining, construction and agriculture industries in order for buyers to easily and efficiently procure parts and for sellers to easily and efficiently liquidate surplus assets specific to the aforementioned particular industries. The present invention provides methods of searching, buying and selling products that are new, used and reman or rebuilt creating advantages for both buyers and sellers. As used herein, "reman" means rebuilt.

Figure 1:
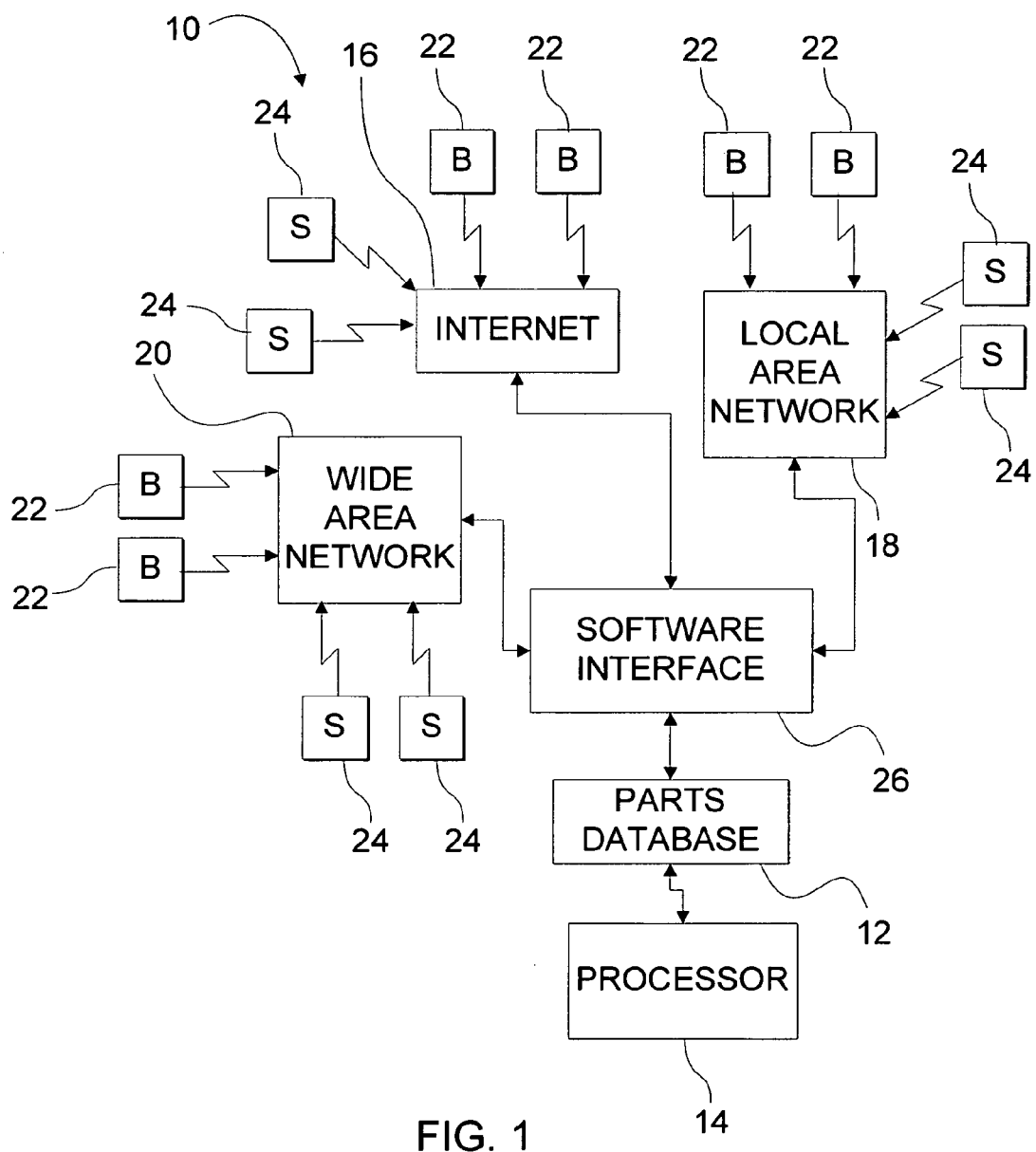
FIG. 1 is a block diagram of a parts usage comparison system according to a particular embodiment of the present invention.

As shown in FIG. 1, particular embodiments of the present invention include a part usage comparison system 10. The system 10 comprises a parts database 12, a processor 14 and a software interface 26. The third party buyers 22 and the third party sellers 24 may be connected to the parts database 12 through a software interface 26, wherein the Internet 16, a local areas network ("LAN") 18 and a wide area network ("WAN") 20 are each extensions or forms of the software interface 26. It will be understood that while particular embodiments use these types of connection with the software interface 26, other forms of connections may also be used, such as, but not limited to the Internet, Intranet, LAN, WAN, wireless connection, or other networks having access to a database configured to for relevant access. It will be understood by those of ordinary skill in the art that the software interface 26 may include an Internet website, a software tool interface or a combination of each.

In a particular embodiment of the system 10, the software interface 26 provides the buyers 22 access to the parts database 12. In particular embodiments, the parts database 12 is configured to the store part information corresponding to a plurality of new, used and reman parts. The part information may comprise existing new, used and reman parts inventory of the sellers 24. The software interface 26 may prompt the buyer 22 to search for a particular part and receive input on a requested part. The processor 14 processes the input from the software interface 26 and determines matching products stored in the part information located in the parts database 12. The software interface 26 then displays the available parts matching the part request received.

The software interface 26 may be configured to provide to the buyers 22 and receive input from the buyers 22 several types of searches. The information entered in the interface 26 by the buyers 22 may be stored on the parts database 14. This information of the buyer is stored as Gold Mine information; defined as customer self entered part number and specific model number preferences and requests. For example, and without limitation, the types of searches may comprise searching by part number, an extended search of source parts, parts available by model, manufacturer specific surplus, part description and annual or bulk consumption list. In each type of search, the interface 26 is used to compare customer requests (i.e. annual usage) of parts against inventory available. This allows a potential buyer 22, the ability to send in a list of what parts and components they consume, and through the software interface 26 it is determined exactly what each seller has available. Various reports are generated, one of which "request for quote" can be automatically sent via email, or fax to the seller 24 to obtain a cost quote for the parts required. A considerable savings can result to the buyer 22 of such used, rebuilt, and/or new surplus inventory. They also gain the ability to go to numerous sellers at once, thus obtaining the best possible price.

The search by part number includes the software interface 26 receiving a part number entered in by the buyer 22. The processor 14 process the par number entered and compares it to the part information stored on the parts database 12. The processor 14 determines which parts match the requested part number and the software interface 26 displays the part information for each matching part.

The extended search of source parts may include the software interface 26 providing two separate ways of sourcing products: by category or by manufacturer. The sourcing by category is for searches, such as, but not limited to, finding a company that supplies a specialty product less than the entire product line. The sourcing by manufacturer is for searches, such as, but not limited to, finding a business that specializes in supplying the entire product line for a certain manufacturer.

The parts available by model may include the software interface 26 providing a list of manufacturers and receiving input from the buyer 22 of a particular manufacturer. Upon receiving the manufacturer input, the software interface 26 displays a list of models and/or model numbers, the system 10 then processes and displays all available parts according to that particular model.

The manufacturer specific surplus allows the software interface 26 to receive input of buyers 22 and the system 10 to provide the buyers 22 with all parts of that particular manufacturer being offered by the sellers 22.

The search by part description may include a software interface 26 configured to receive a description of the part requested by the buyers 22. The processor would process the input and the software interface 26 would display the results of parts matching the inputted description.

The search by annual or bulk consumption list comprises the software interface 26 receiving a list of parts that are needed annually or in bulk. The processor 14 processes the list and determines the product information stored in the parts database 12 that matches the parts requested in the list and the software interface 26 displays that list to the buyers 22. The buyers then have a list of sellers 22 that can be contacted in order to fulfill their part needs.

It will be known by those of ordinary skill in the art that the preferred manner of searching and displaying parts and their availability is through use of an Internet website, though any database access method if acceptable. The database may be stored in a single location or on several servers in various locations so as to best store and process the list of parts, customers and vendors.

In another particular embodiment of the system 10, the software interface 26 may provide sellers 24 access to the parts database 12. The software interface 26 may accomplish this in various ways, such as, but not limited to, listing recent parts requested and updating seller contact information and inventory. To receive a list of recent parts requested, the software interface 26 receives input from sellers 24 such as, but not limited to, particular manufacturer parts that the sellers 24 are listed under. The software interface 26 may then provide a list of all requests for a particular manufacturer recently made by the processor 14 processing the input of the sellers 24 and determining which requests relate to the manufacturers listed under the sellers 24. For example, and without limitation, the types of requests for recently requested parts comprise, Gold Mine matches, matching seller data with Gold Mine information exported in a spreadsheet and matching seller data with Gold Mine information exported in a postcard or text file format.

The Gold Mine matches request allows the software interface 26 to receive "Gold Mine data requests". The processor 12 then processes the request and finds matches within the seller's 24 inventory. The resulted output is a postcard (with changeable blocks) that can be sent out electronically and automatically via email or fax. Now individual companies have a viable method to sell their surplus, or used and/or rebuilt product to others that have recently asked us to let us know when specific parts or models become available.

Requests for matching seller data with Gold Mine information exported in a spreadsheet allows the software interface 26 to receive input from a seller 24 regarding matching the seller 24 inventory with requests from parts made from buyer 22. The processor 14 is used to match surplus inventory against buyer 22 requests stored on the parts database 12. The resulting output will be a spreadsheet containing specific customer self entered part number requests. This output can be given to a company showing them exactly from their surplus, what other companies have been asking for.

Requests for matching seller data with Gold Mine information exported in a postcard is similar in every aspect as the requests for matching seller data with Gold Mine information exported in a spreadsheet with a few differences. One difference includes, without limitation, the result displayed as a postcard that can be sent out electronically via email or fax. Vendors now have a viable method to sell their surplus, or used and/or rebuilt product to the individual companies that have recently asked us to let us know then when these such items become available. An additional option allows the addition of a second company logo, allowing each company to visually show on the postcard that they have teamed up to sell the first company's surplus.

Additionally, the software interface 16 may prompt a seller 24 for information specific to the seller 24. After receiving the information from the seller 24, the processor 14 processes the input and verifies that it is the seller 14 with the proper part information stored on the parts database 12. The seller 24 may then update, change, add and/or perform any other task associated with managing the seller's 24 contact information and inventory of parts stored in the parts database 12. For example, and without limitation the seller 24 may export information according to company and model, wherein the software interface 26 can display to a seller what their surplus consists of by model number. Further the seller 24 may obtain information according to part, wherein the software interface 26 is configured to receive input from a seller 24 and displays the results as a columniation of the data imported. This gives the seller 24 a method to determine what models a particular part fits.

It is also contemplated that various methods of receiving search requests and displaying search results may be used, such as, but not limited to, email or fax of the lists of parts to be searched and the results from the search.

Figure 2:
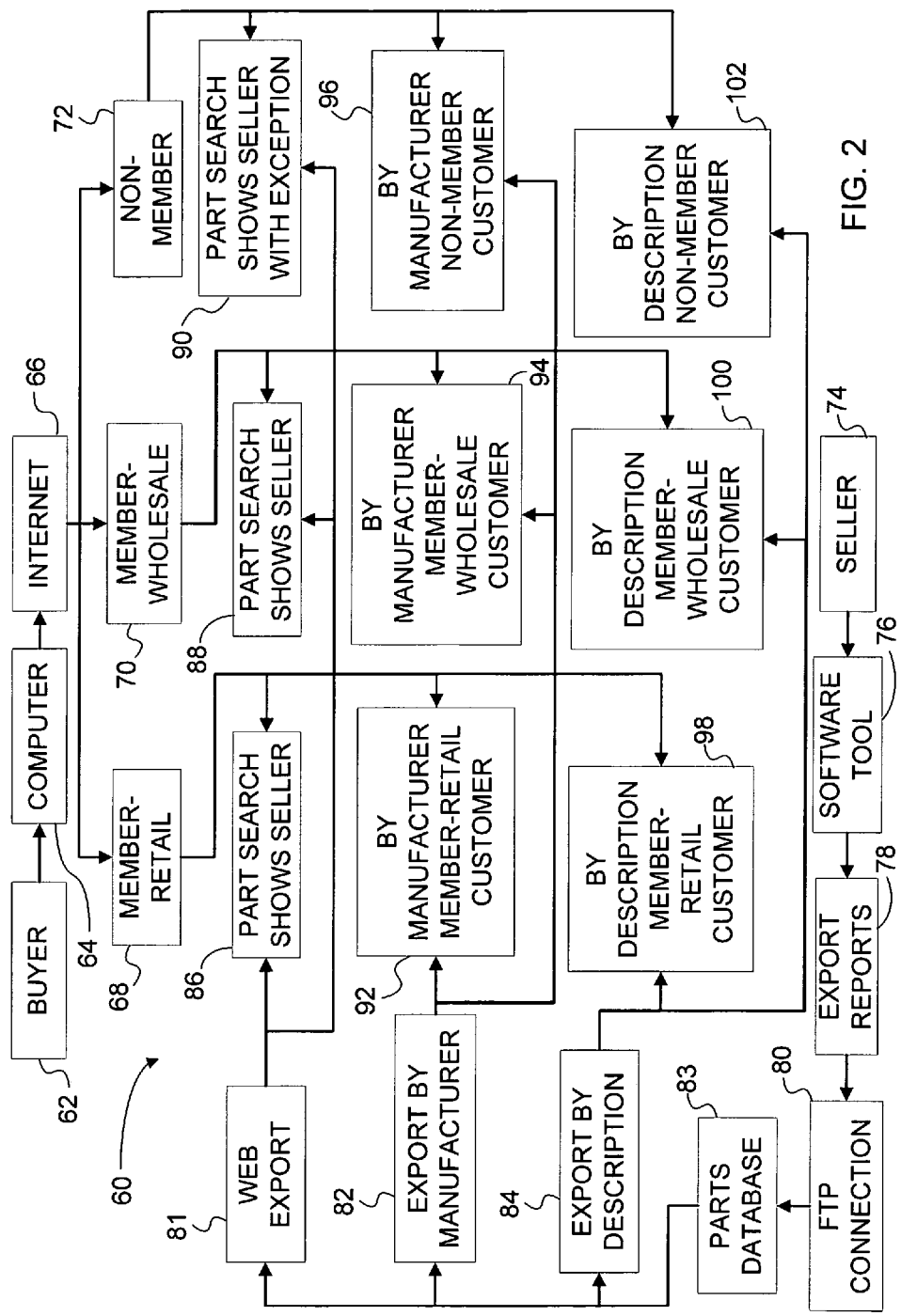
FIG. 2 is a block diagram of a parts usage comparison system using a surplus software tool interface.

According to FIG. 2, a particular embodiment of the present invention may comprise system 60 of a parts usage comparison system. The system 60 may comprise a buyer 62 who is connected to the Internet 66 by use of a computer 64. The website accessed on the Internet 66 determines what type of customer the buyer 62 is, which include a member-retail customer 68, a member-wholesale customer 70, or a non-member customer 72. The system may also comprise a seller 74 that uses software tool 76 as an interface to export reports 78 through an FTP connection 80 to the parts database 83. The database 83 may export part information in three different ways, including a web export 81, an export by manufacturer 82 and an export by part description 84. The web export 81 is useful for part searches performed by each type of buyer 62. For a member-retail customer 68 a web export 81 shows sellers with matching part 86. For a member-wholesale customer 70 a web export 81 shows sellers with matching part 88. For a non-member customer 72, the web export 81 shows sellers with matching part 90 if the seller is a member, and shows a third party manager of the database with the seller is a non-member.

The export by manufacturer 82 is useful for part searches by manufacturer performed by each type of buyer 62. For a member-retail customer 68, an export by manufacturer 82 shows part information by manufacturer for a member-retail customer 92. For a member-wholesale customer 70, an export by manufacturer 82 shows part information by manufacturer for a member-wholesale customer 94. For a non-member customer 72, an export by manufacturer 82 shows part information by manufacturer for a non-member customer 96.

The export by description 84 is useful for part searches by description performed by each type of buyer 62. For a member-retail customer 68, an export by description 84 shows part information by description for a member-retail customer 98. For a member-wholesale customer 70, an export by description 84 shows part information by description for a member-wholesale customer 100. For a non-member customer 72, an export by description 84 shows part information by description for a non-member customer 102.

Figure 3:
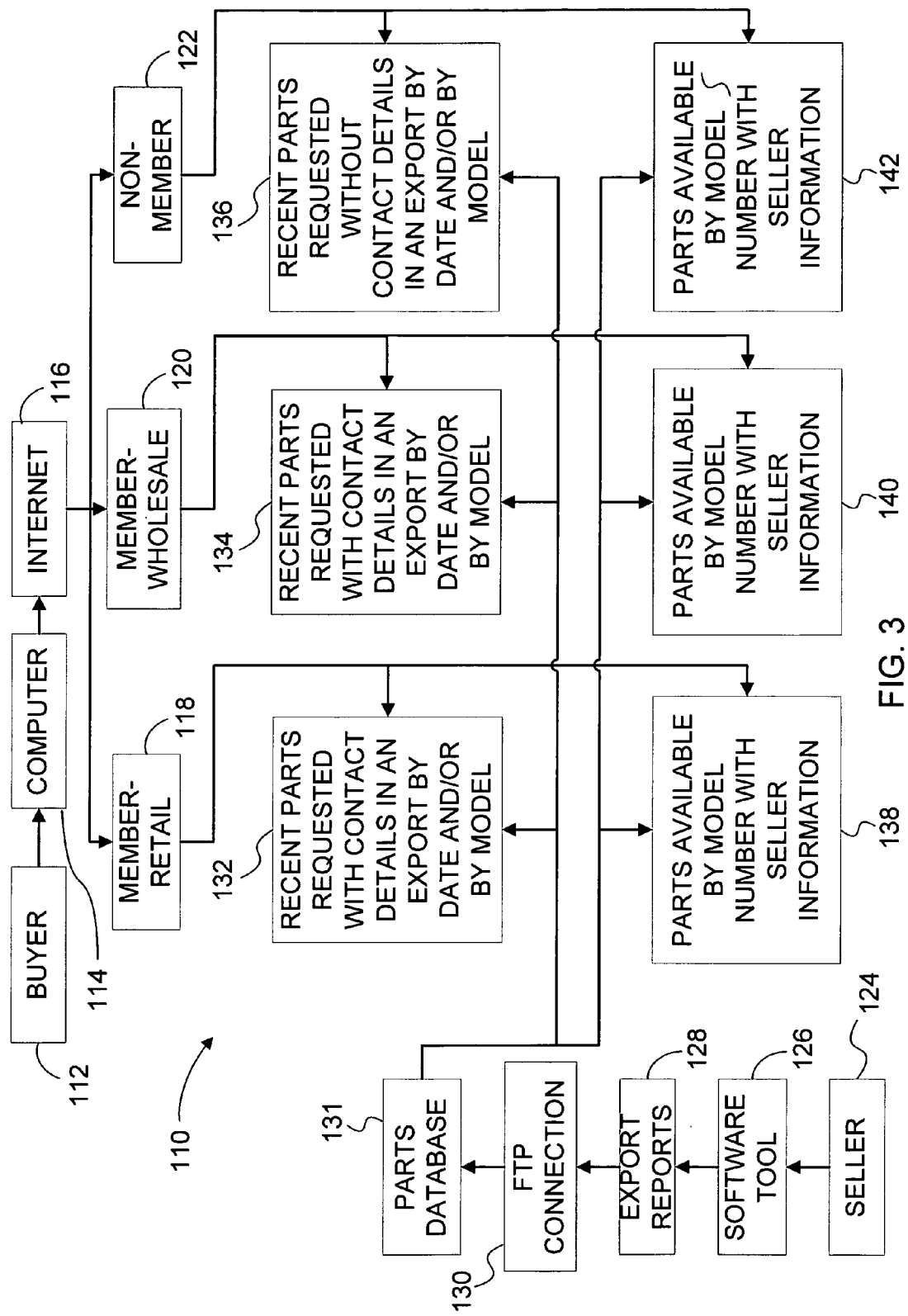
FIG. 3 is a block diagram of a parts usage comparison system using a model match software tool interface.

Referring to FIG. 3, particular embodiments of the present invention may include a parts usage comparison system 110. The system 110 comprises a buyer 112 who is connected to the Internet 116 by use of a computer 114. The website accessed on the Internet 116 determines what type of customer the buyer 112 is, which include a member-retail customer 118, a member-wholesale customer 120, or a non-member customer 122. The system may also comprise a seller 124 that uses software tool 126 as an interface to export reports 128 through an FTP connection 130 to the parts database 131. The Internet website 116 receives a search request by model number from the member-retail customer 118, the database 131 exports a report with parts available by model number with corresponding seller information 138. The Internet website 116 may also receive a search request by model number from the member-wholesale customer 120, the database 131 exports a report with parts available by model number with corresponding seller information 140. The Internet website 116 may also receive a search request by model number from the non-member customer 122, the database 131 exports a report with parts available by model number without corresponding seller information 142, unless the seller is a member.

Further, the seller 124 may request a search of recent parts requested by the member-retail customer 118, the member-wholesale customer 120 and the non-member retail customer 122. The database 131 exports reports of recent parts requested with contact details in an export by date and/or by model 132 for a member-retail customer 118. The database 131 exports reports of recent parts requested with contact details in an export by date and/or by model 134 for a member-wholesale customer 120. The database 131 exports reports of recent parts requested without contact details in an export by date and/or by model 132 for a non-member retail customer 122.

Figure 4:
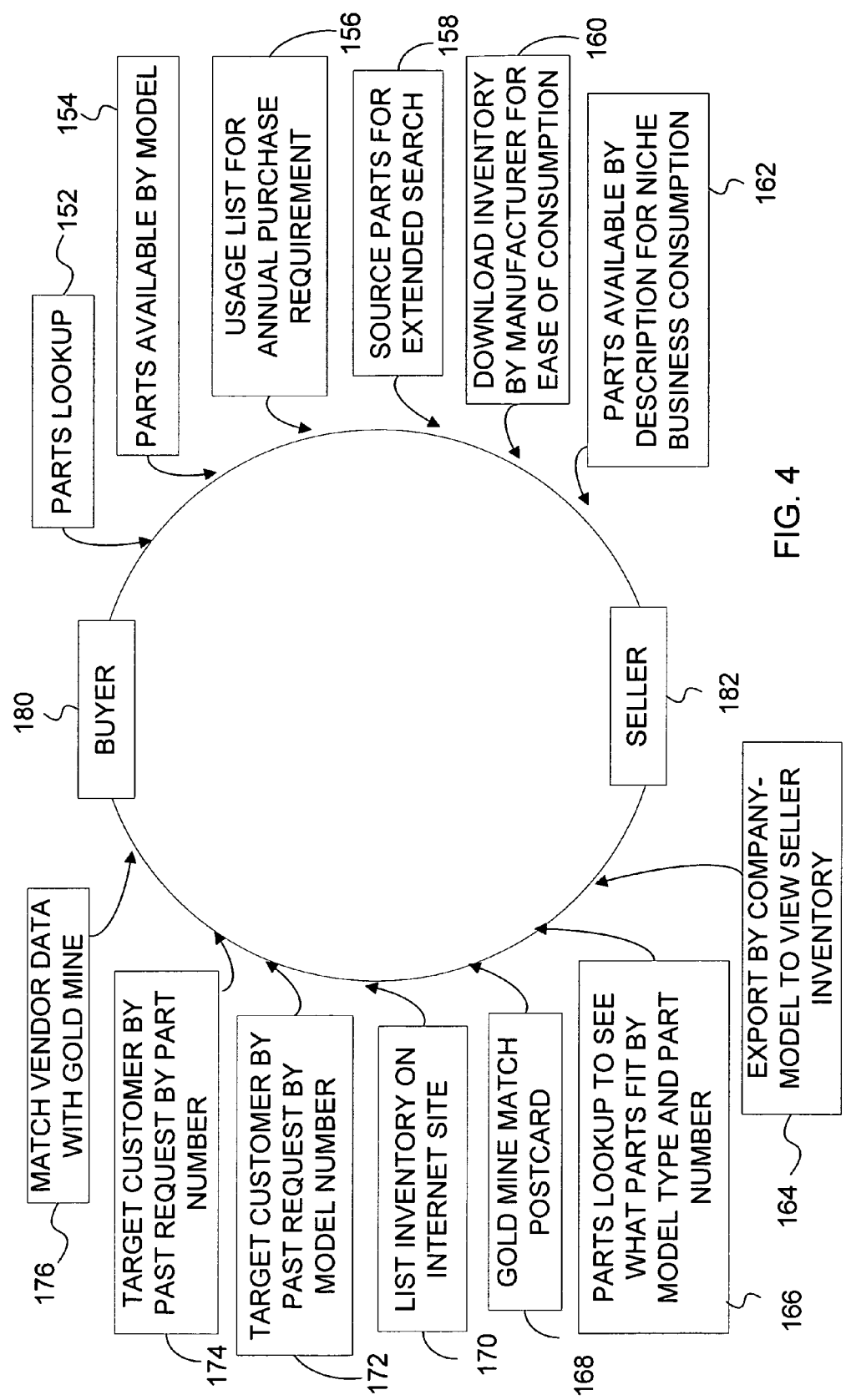
FIG. 4 is a flow diagram of the aspect of a parts usage comparison system that connects the buyer with the seller information and the seller with the buyer information.

FIG. 4 is a flow diagram showing how the various aspects of a part usage comparison system 150 connect a customer 180 and a seller 182. The customer 180 is connected to the supplier when the system receives search request input by the customer 180 in the following ways: parts lookup 152, parts available by model 154, customer usage list for annual purchase requirements 156, source parts for extended search 158, download inventory by manufacturer for ease of consumption 160 and parts available by description for niche business consumption 162. Each of these searches provides access to the seller's 182 part information stored within the system 150.

Alternately, the seller 182 may also access data from stored search information inputted into the system 150 by the customer 180. This access may be provided in the following ways: export by company-model to view seller inventory 164, parts lookup to see what parts fit by model type and part number 166, Gold Mine match postcard 168, listing inventory on Internet site 170 for viewing by customer 180, target customer by past requests by model number 172, target customer by past request by part number 174 and match seller data with Gold Mine Data of customer 176. Each type of access provides customer 180 information directly to the seller 182. The seller 182 may then contact various customers 180 and offer for sale parts in seller's 182 inventory.

FIG. 4 shows a type of circular relationship provided between the customer 180 and the seller 182 when each is using the parts usage comparison system 150. The system enables both customers and sellers access to each others' information so as to expedite the selling of surplus parts at the best price.

Figure 5:
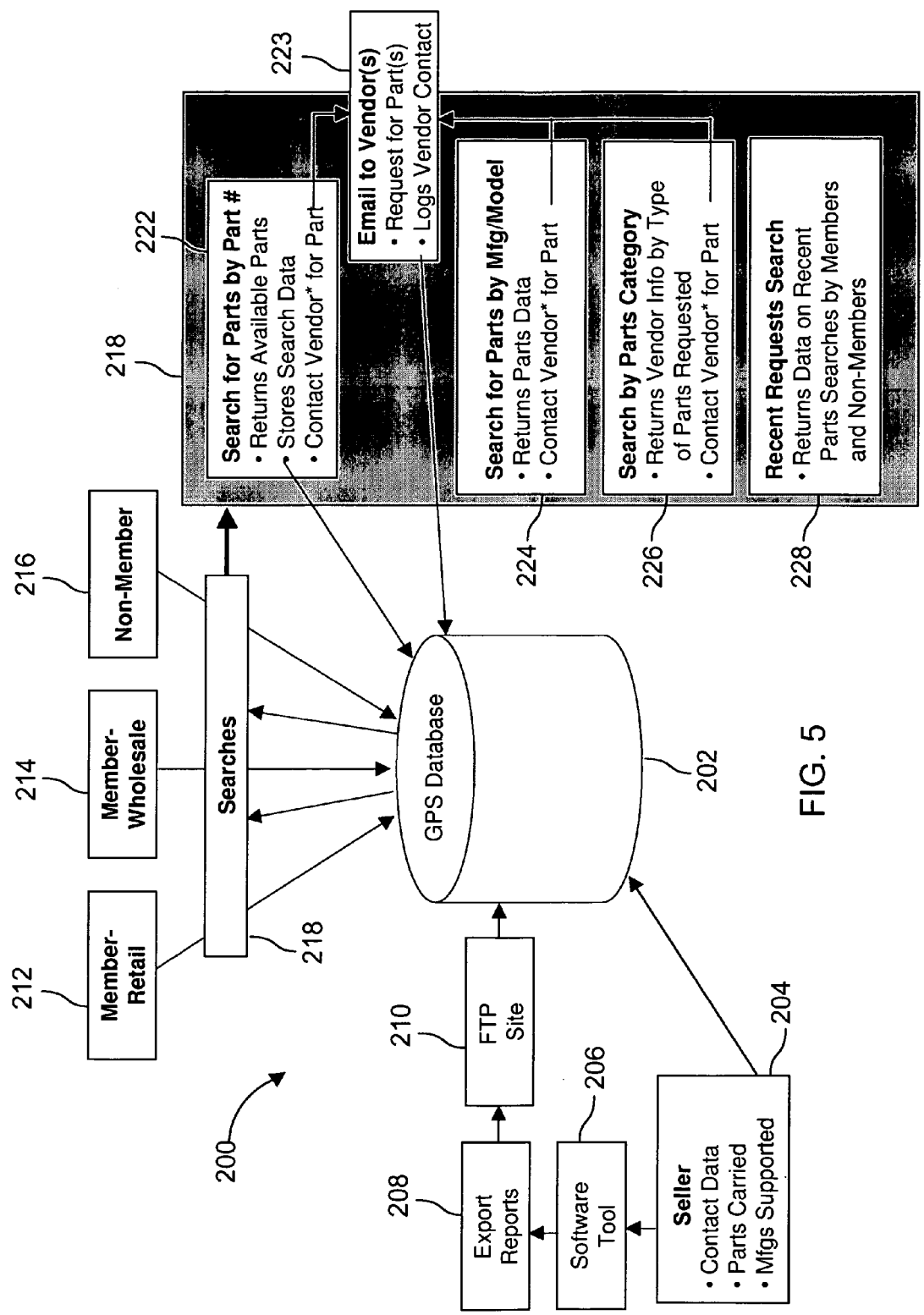
FIG. 5 is block diagram of a parts usage comparison system using an Internet site as a software interface.

According to FIG. 5, particular embodiments of a parts usage system 200 may utilize an Internet site to provide the software interface for both the seller and the buyer. The system may include a parts database 202 and a seller 204 and three types of buyers, which include a member-retail customer 212, a member-wholesale customer 214 and a non-member customer 216. The system 200 may receive access from a seller 204 in two different ways. First, a software tool 206 is used to export reports 208 through an FTP Internet site 210 to the database 202. Second, the Internet website may provide direct access to the database 202 for such purposes and updating contact data, parts carried and manufacturers supported.

The database 202 may provide access to the buyers 212, 214 and 216 through the Internet site. The buyers 212, 214 and 216 may then search for parts in various ways. Some of the ways allow the buyers 212, 214 and 216 to send emails to sellers 223 to request parts or to add the buyers 212, 214 and 216 to a log of seller contacts. These ways include search for parts by part number 222, search for parts by manufacturer and/or model 224 and search by parts category 226. These recent search requests may be stored on the database and provide the seller with the ability to place a recent request search 228. Through this particular embodiment and all embodiments of the present invention, both the seller and the buyer are at a greater advantage. The sellers advantage comes from having access to potential customers that are in need of the sellers inventory, allowing the seller to more effectively and efficiently decrease his/her surplus. The buyer is at the advantage of finding a seller that meets important criteria for the buyer, such as condition of parts, price, location of seller or any other factor important to a buyer.

Referring to FIG. 6, particular embodiments of the present invention include a method 30 of searching for parts using a parts usage comparison system of the invention. The method 30 may be accomplished by the following steps: store third party sellers part information on the part database (Step 32); receive input of requested parts from third party buyers (Step 34); Process input of requested parts to determine matches with part information (Step 36); display all matching part information (Step 38); and send emails to sellers requesting additional information of matched parts (Step 40).

Step 32 to store part information comprises storing a part number, a part description and part quantities for each part of the sellers, which may include new, used and reman parts. Step 32 to store part information may further comprise storing at least one of store branch information, manufacturer, part condition, part cost, list price and any combination thereof.

Step 34 to receive input of requested parts may comprise receiving at least one of a part number, a model, an inventory needed, a part source needed and any combination thereof. Additionally, Step 38 to display matching part information may include at least one of sending an email, sending a facsimile and providing a downloadable file containing the part information matching the input of requested parts.

It will be understood that the steps described in method 30 for searching parts are not limited those previously described, and there may be intermittent steps dependent on the type of search being performed, which examples of various search types have been aforementioned.

FIG. 7 shows method 50 of seller inventory management using a parts usage comparison system according to particular embodiments of the present invention. The method 50 comprises the following steps: receive requests from sellers of recent parts requested by buyers (Step 52); display list of parts recently requested (Step 54); and update contact and part information (Step 56). Step 54 to display list of parts recently requested may include at least one of sending an email, sending a facsimile and providing a downloadable file containing the part information matching the input of requested parts.

Prior to applicant's invention and system there was no widely available system for buying and selling used heavy equipment parts. Use of the system allows companies to purchase and sell used replacement parts for their existing equipment, saving significant amounts of money for their companies.

EXAMPLES

The following examples further illustrate, not limit, the invention.

Example 1

The first example provides a software interface referred to as "Model Match," wherein the interface and function of the interface is further described.

Model Match Database Documentation

The Model Match software contains information on parts lists for models, pricing for parts, parts on hand, and gold mine data. This document will explain in detail the functionality of the Model Match software.

Main Menu

Figure 8:
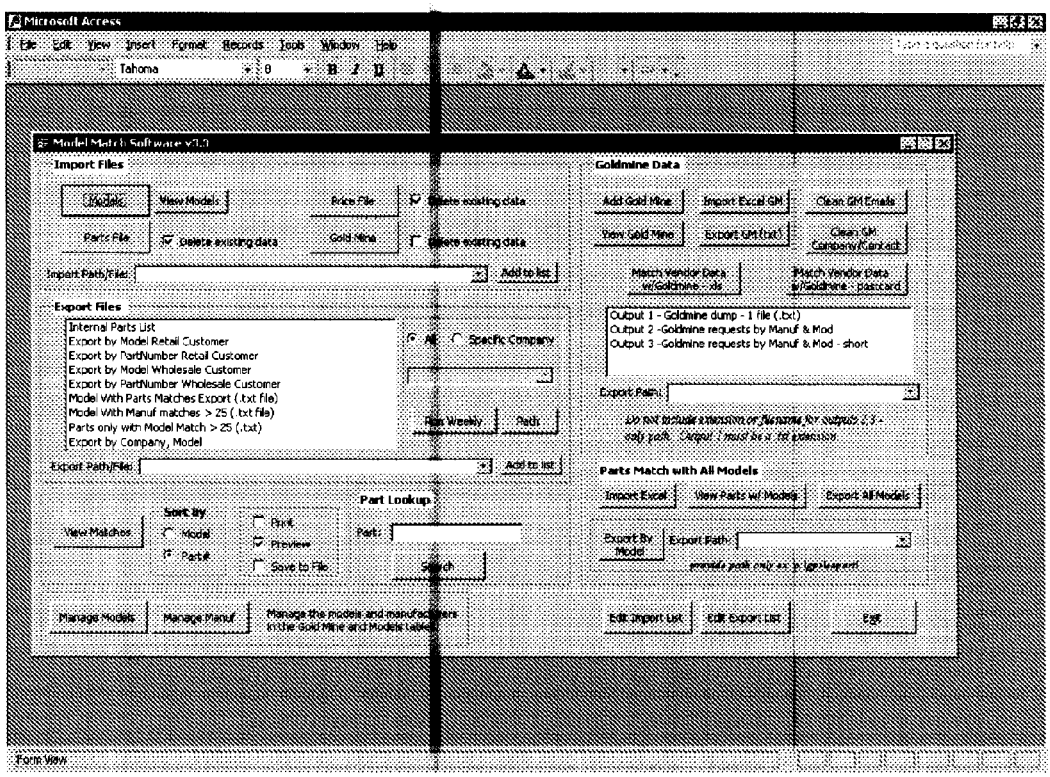
FIGS. 8-85 are views of various user interfaces of a parts usage comparison system.

The form shown in FIG. 8 is the main menu for the Model Match software. There are several different functions located on the main menu. Each section will be further explained.

Importing Files

The upper left section of the screen contains 4 buttons for importing Model data; Parts file from the Surplus database, Price data, and Gold Mine data. The Parts File, Price File, and Gold Mine buttons each have a check box next to it entitled 'Delete existing data'. When this button is checked, all data existing for the type of data being imported will be deleted from the database before the new file is imported. To save the current data in the database, uncheck the box.

Viewing and Importing Models

Figures 9, 10:
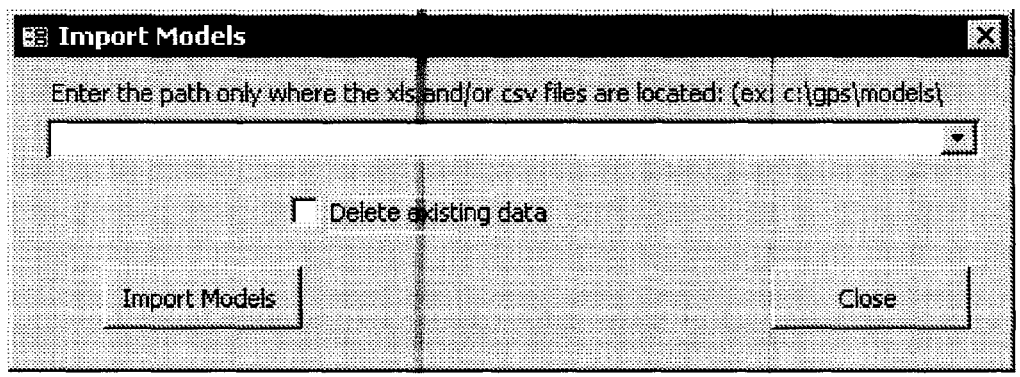

Models can be imported or viewed. To view the models that currently exist in the database, click on the View Models button located next to the Model button. The screen shown in FIG. 9 will appear.

Enter information in any of the fields listed at the top screen and click on the Search button to narrow the search of models.

Model files can be imported by clicking on the Model button in the Import Files section of the main menu. The screen shown in FIG. 10 will appear.

More than 1 model can be imported at a time. The model files to be imported must be in a comma delimited text file or csv file. The path where the files reside must be filled in before importing. Only put the path of where the files reside, not the filename. For example, c:\globalpartssolution\models might be where the files are located. The files must end with a .csv or .xls extension. All files located in the path specified will be imported.

The model file contains the following 6 fields in the order specified: 1) Model, 2) Part Number, 3) Quantity Required, 4) Description, 5) Company From and 6) Email From.

The fields Model and Quantity Required are required and must be filled in for the record to be imported. The field names for the headings should NOT be in the file. Make sure the 'Delete existing data' checkbox is unchecked if you do not want to delete all of the model data that already exists in the database. The import process will also update all manufacturers to their alias if one exists.

Importing Parts File

Parts files can be imported by clicking on the Parts File button in the Import Files section of the main menu. The parts files will be created by exporting data from the Surplus database. Under the Search For Part button on the main menu in the Surplus software in the export files listbox, select the item listed Export for Data Match. The files exported from the Surplus database and imported into the Data Match software will be excel spreadsheets. There may be more than one excel spreadsheet that will be created from the Surplus software. These files will need to be imported one at a time. The path and filename of the spreadsheet must be entered in the field titled 'Import File/Path'. Remember that the file must end with an .xls extension.

The parts file must contain the following 8 fields in the order specified: 1) Data Match ID, 2) Company, 3) Manufacturer, 4) Part Number, 5) Condition, 6) Price, 7) Wholesale Price and 8) Quantity.

The field names for the headings will be in the file. Make sure you uncheck the 'Delete existing data' checkbox if you do not want to delete the parts data that already exists in the database.

Importing Price File

Price files can be imported by clicking on the Price File button in the Import Files section of the main menu. The price file to be imported should be an excel spreadsheet. The price file to be imported must be entered in the field titled 'Import File/Path'. The full path and filename of the price file must be included. For example a sample price file may be c:\globalpartssolution\pricefiles\manuf.xls. If the file is being appended to the existing data and a part number in the file already exists in the table, a popup message will appear asking if it is OK to overwrite the existing prices. It gives an option to cancel the import if the prices should not be overwritten.

The price file must contain the following 4 fields in the order specified: 1) Part Number, 2) Dnet, 3) List and 4) RC.

The field names for the headings will be in the file. Make sure you uncheck the 'Delete existing data' checkbox if you do not want to delete all of the price data that already exists in the database.

Importing Gold Mine

Goldmine files can be imported by clicking on the Gold Mine button in the Import Files section of the main menu. The goldmine file to be imported should be a pipe delimited text file. The string fields in the text file should not be enclosed by quotes. This file is generated by exporting the goldmine requests from the GPS website. The goldmine file to be imported must be entered in the field titled 'Import File/Path'. The full path and filename of the goldmine file must be included and should end with a .txt extension. For example a sample goldmine file may be c:\globalpartssolution\goldminefiles\goldmine.txt.

The goldmine file must contain the following 13 fields in the order specified: 1) Date Sent, 2) Email of Sender, 3) Person Sourced For, 4) Company Sourced for, 5) Email Sourced for, 6) Phone Sourced for, 7) Fax Sourced for, 8) Type of Customer, 9) Manufacturer, 10) Quantity, 11) Part Number, 12) Description and 13) Model.

The field names for the headings need to be in the file. Make sure you uncheck the 'Delete existing data' checkbox if you do not want to delete all of the goldmine data that already exists in the database.

Exporting Files

The middle left section of the screen contains a listbox listing the types of exports that are available. The path and name for each file to be exported must be entered in the Export Path/File field. Double-click on the name in the listbox of the export to be created after the name is entered. To run an export for a particular company or vendor, unclick the all radio button and click on the button labeled Specific Company and select the company from the list below. The exports will be detailed below.

Run Weekly

Figure 11:
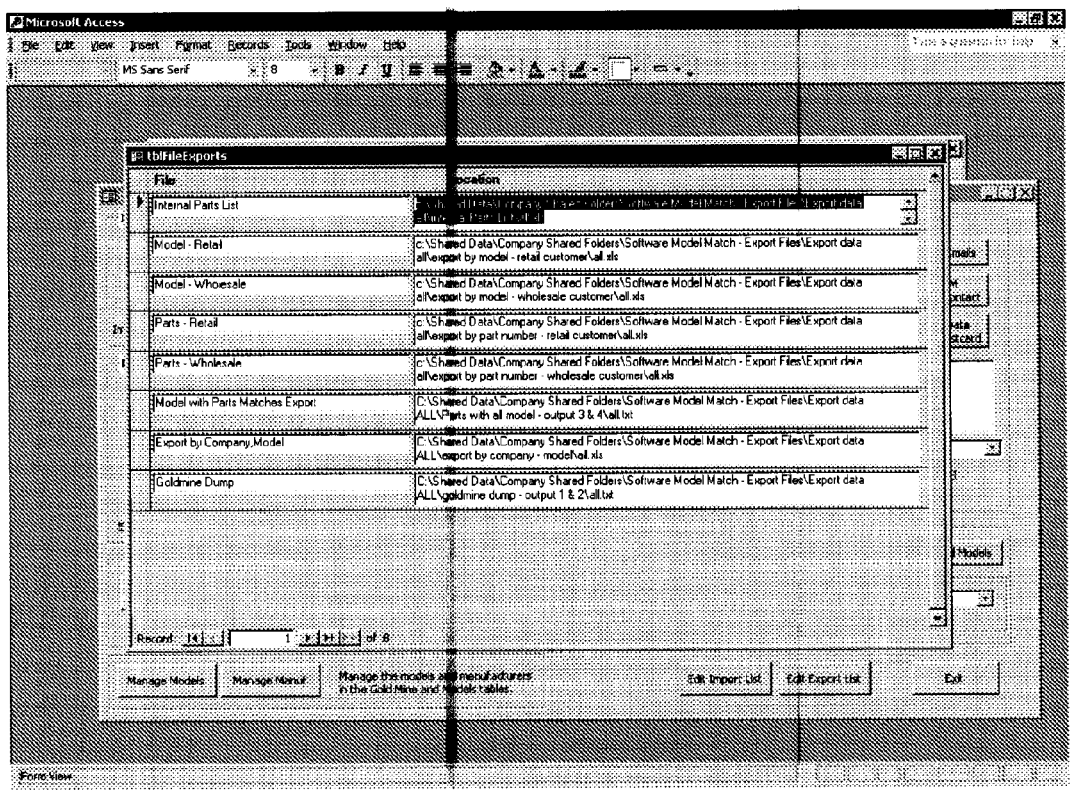

Clicking on the Run Weekly button in the Export Files section will automatically run the following exports—Internal Parts List, Export by Model Retail, Export by Part Retail, Export by Model Wholesale, Export by Part Wholesale, Model with Part Matches Export, Export by Company Model, and Gold Mine Dump shown in FIG. 11. The files generated from each export will be created in a specified path. To change the path for each export type, click on the Path button. Click in the location field to change the location of the files generated. Each export can have a different path.

Internal Parts List

The internal parts list exports all parts inventory along with any prices that may match against the part number in the price list. The exported file is an Excel spreadsheet and multiple files will be created if there are more than 65535 parts. The columns in the export include: 1) Quantity, 2) Part Number, 3) Description, 4) Condition, 5) Dnet, 6) List, 7) Price, 8) WholesalePrice and 9) RC.

Export by Model Retail Customer

The export by model retail customer exports all models with matching parts in the inventory table. Multiple files will be created with each file containing all parts for the particular model that have matches in inventory. The exported file will be an Excel spreadsheet. The filename will consist of the name entered in the Export Path/File field along with the name of the model for the file. The price will be the retail price of the part. The columns in the export include: 1) Model, 2) Quantity, 3) Part Number, 4) Description, 5) Condition, 6) Price and 7) List.

Export by Part Number Retail Customer

The export by partnumber retail customer exports all parts inventory along with any prices that may match against the part number in the price list. The exported file is an Excel spreadsheet and multiple files will be created if there are more than 65535 parts. The price is the spreadsheet is the retail price of the part. The columns in the export include: 1) Quantity, 2) Part Number, 3) Description, 4) Condition, 5) Price, 6) Model.

Export by Model Wholesale Customer

The export by model wholesale customer exports all models with matching parts in the inventory table. Multiple files will be created with each file containing all parts for the particular model that have matches in inventory. The exported file will be an Excel spreadsheet. The filename will consist of the name entered in the Export Path/File field along with the name of the model for the file. The price will be the wholesale price of the part. The columns in the export include: 1) Model, 2) Quantity, 3) Part Number, 4) Description, 5) Condition, 6) WholesalePrice, 7) List Export by Part Number Wholesale Customer The export by partnumber wholesale customer exports all parts inventory along with any prices that may match against the part number in the price list. The exported file is an Excel spreadsheet and multiple files will be created if there are more than 65535 parts. The price is the spreadsheet is the wholesale price of the part. The columns in the export include: 1) Quantity, 2) Part Number, 3) Description, 4) Condition, 5) WholesalePrice, 6) Model.

Model with Part Matches Export

The Model with Part Matches exports all models with matching parts in inventory. The models with the part numbers will come from both the model table and the goldmine table. The file created will be a pipe (|) delimited text file with no quotes around strings. The file name entered in the Export Path/File field must end with a .txt extension. This file will be transferred to the website for further online processing. 1) Manufacturer, 2) Model, 3) Part Number, 4) Description, 5) Company, 6) Condition, 7) Quantity Available.

Model with Manufacturer Matches >25

The Model with Manufacturer Matches >25 exports only the model and manufacturer with matching parts of greater than 25. The models with the part numbers will come from both the model table and the goldmine table. The file created will be a tab delimited text file with no quotes around strings. The file name entered in the Export Path/File field must end with a .txt extension. 1) Manufacturer, 2) Model Parts Only with Model Match >25

The Parts Only with Model Match >25 exports the part numbers with matching parts of greater than 25. This file will contain all the part numbers that exist for the Model with Manuf Matches >25 export. The part numbers will come from both the model table and the goldmine table. The text file created will only contain the part number field with quotes surrounding it. The file name entered in the Export Path/File field must end with a .txt extension. This file will be transferred to the website for further online processing. 1) Part Number Export by Company, Model The export by company, model exports all models and companies or vendors with matching parts in inventory. This export does not include goldmine data. A file is created for each unique model and company. The file will contain the parts in inventory that exist for that model and company. The exported file will be an Excel spreadsheet. The filename will consist of the name entered in the Export Path/File field along with the name of the model and company for the file. 1) Company, 2) Model, 3) Quantity, 4) Part Number, 5) Description, 6) Condition.

Viewing Matches

There are two ways of viewing parts with matching models: sort by part # or sort by model. Click on the Preview checkbox to view the report on the form, click on the Print checkbox to print the report to the default printer, or click on the Save to File checkbox to save the report to a file. You will be prompted for the type of file and the location where the file will be created.

Figure 12:
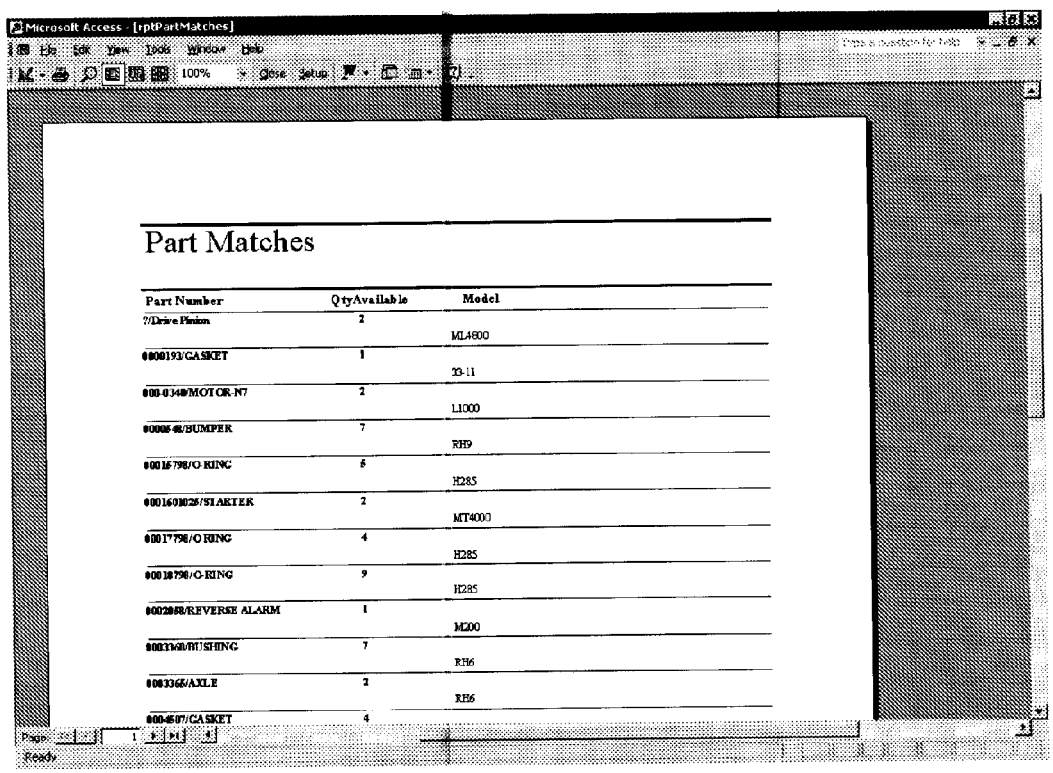

To view parts with matching models sorted by part #, select the sort by part # and click on the View Matches button. The report shown in FIG. 12 will be produced. It lists all parts with their matching models.

Figure 13:
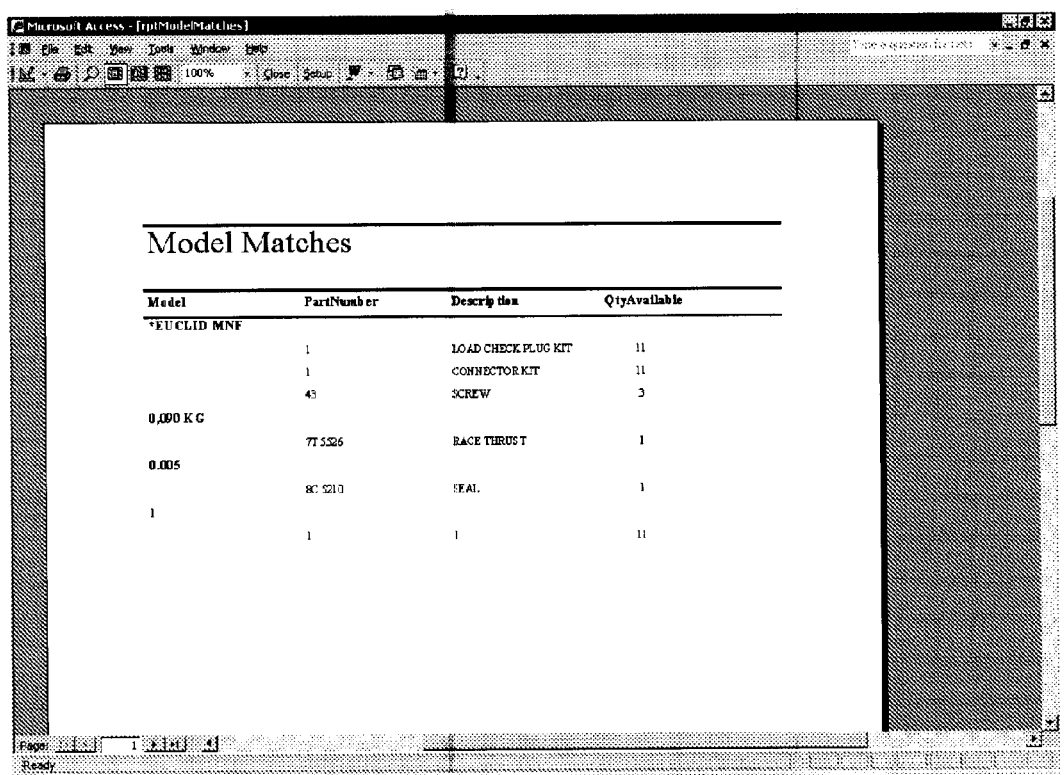

To view models with matching parts sorted by model #, select the sort by Model and click on the View Matches button. The report shown in FIG. 13 will be produced.

Part Lookup

Figure 14:
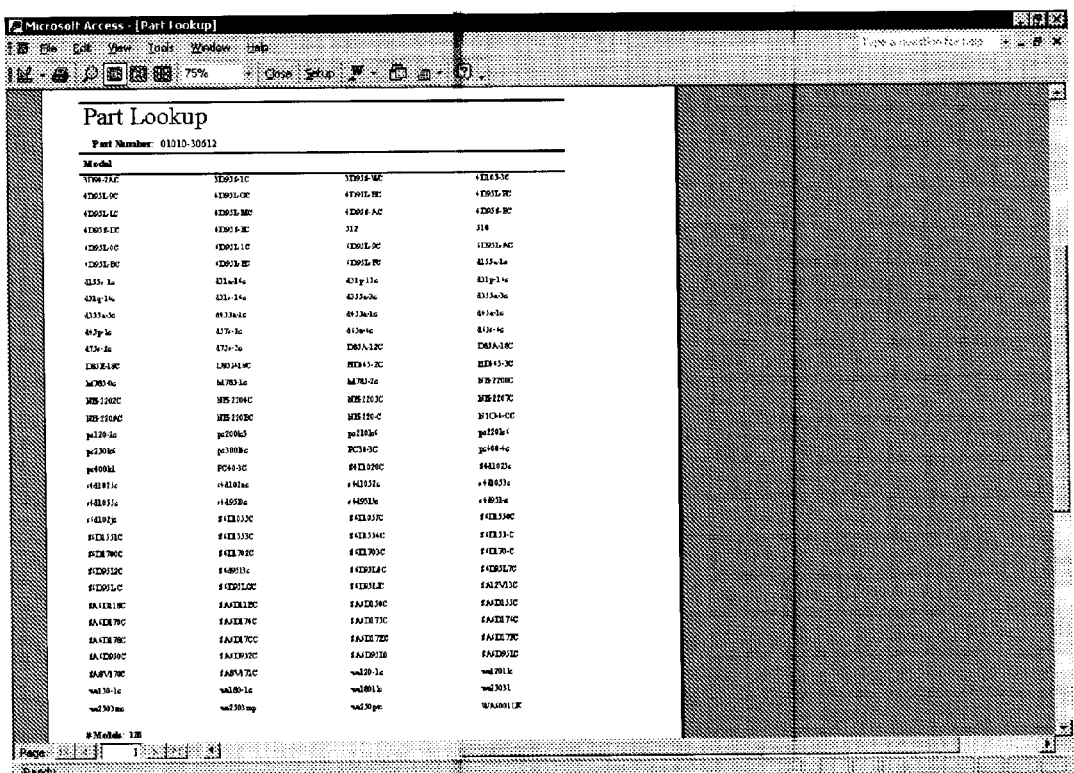

To quickly find out the models that a particular part fits, fill in the part number next to the Part field and click on the search button. A report (see FIG. 14) will show displaying all the models that this part fits along with the total models.

Goldmine Data

There are 2 ways to gather Goldmine data. The first is through importing a file from the website and the second way is to input each record manually. Refer to the Importing Goldmine Data section to get details about importing the file from the web.

Add Goldmine

Figure 15:
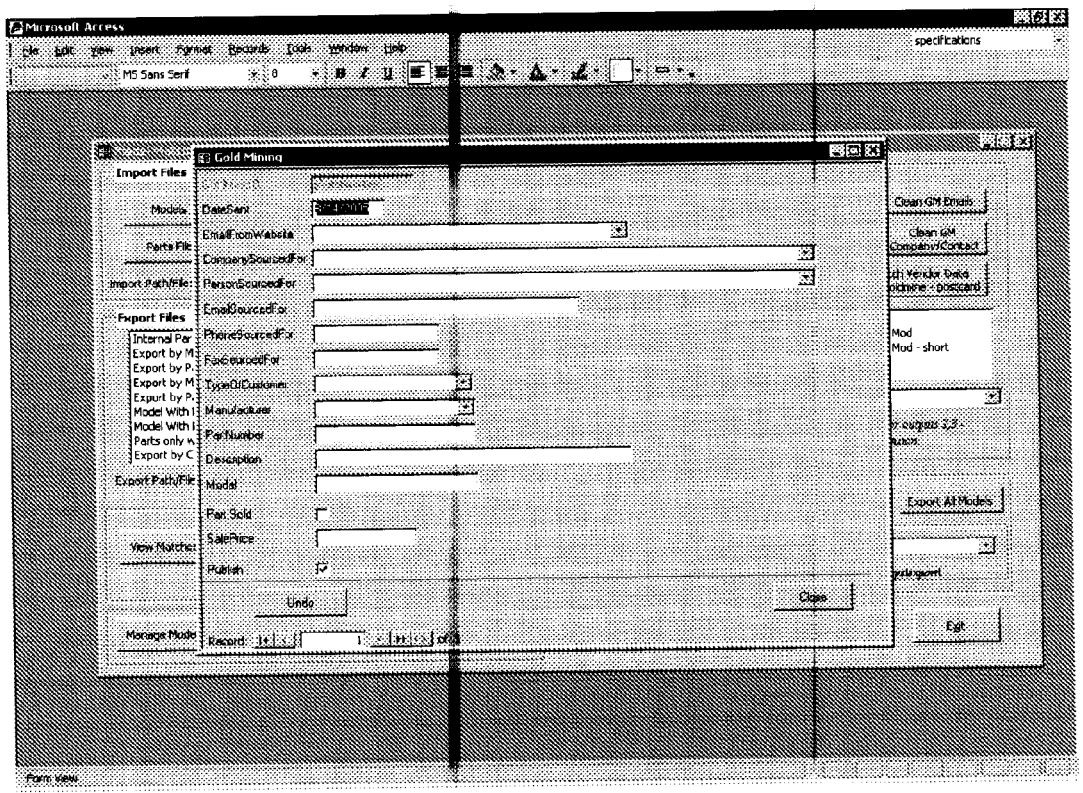

To import goldmine data manually click on the Add Gold Mine button. The screen shown in FIG. 15 will appear.

Click on the listbox in the EMailFromWebsite field to see a list of previous emails. Enter a new one or choose from the list.

Clicking on the CompanySourcedFor listbox will bring up all unique combinations of CompanySourcedFor, PersonSourcedFor, EMailSourcedFor, PhoneSourcedFor, and FaxSourcedFor that have already been entered in the database. Choosing one from the list will automatically fill in the values for each of the fields in the listbox. That is, CompanySourcedFor, PersonSourcedFor, EMailSourcedFor, PhoneSourcedFor, and FaxSourcedFor will be filled in with the values that were selected from the listbox. Enter in a new CompanySourcedFor if it doesn't exist in the listbox.

Clicking on the PersonSourcedFor listbox will bring up all unique combinations of PersonSourcedFor, CompanySourcedFor, EMailSourcedFor, PhoneSourcedFor, and FaxSourcedFor that have already been entered in the database. Choosing one from the list will automatically fill in the values for each of the fields in the listbox. That is, PersonSourcedFor, CompanySourcedFor, EMailSourcedFor, PhoneSourcedFor, and FaxSourcedFor will be filled in with the values that were selected from the listbox. Enter in a new PersonSourcedFor if it doesn't exist in the listbox.

Click on the listbox in the TypeofCustomer field to see a list of previous types of customers. Enter a new one or choose from the list.

Click on the listbox in the Manufacturer field to see a list of previous manufacturers. Enter a new one or choose from the list.

View Goldmine

Figures 16, 17:
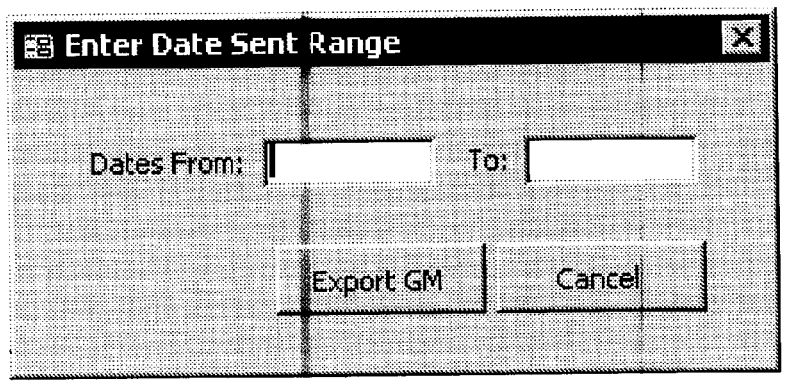

To view the existing Goldmine data click on the View Goldmine button. The screen (see FIG. 16) shows all the goldmine data that has either been entered manually or through an import. Goldmine data can be deleted by selecting a specific record and clicking on the Delete button at the bottom or the screen.

Clicking on the Export button located at the bottom of the screen will export the gold mine data into an Excel spreadsheet to the filename listed in the export path field.

The tool bar located at the top of the screen allows you to sort the data by a particular field, export the data into an Excel file or Word document, or close the form.

To sort by a particular column, select the column by clicking the mouse in the column, and either click on the AZ button to sort in ascending order or the ZA button to sort in descending order.

Clicking on the X button will export the data to an Excel spreadsheet and clicking on the W button will export the data into a Word document. The files will automatically be created in the default My Documents folder and can be saved to a new location by choosing Save As on the File menu.

Clicking on the last icon that looks like a closed file will close the form.

Import Excel GM

The Import Excel GM button is used when all of the goldmine data has been previously exported and cleaned up and needs to replace the existing goldmine data. Since most of the goldmine data is imported from the web site in a raw format, some of the fields may need to be cleaned up with common values. For instance, a company in the company sourced for field may be spelled differently at times, even though it is the same company. In order to make the values consistent and clean up any bad data, the goldmine data is first exported into an Excel spreadsheet. To export all of the goldmine data, click on the View Gold Mine button and then export the data into an Excel spreadsheet by clicking on the X or the Excel icon on the toolbar. Once the data is exported it can be cleaned. Do not make any other changes to the Excel spreadsheet other than data changes since it will need to be reimported. Once the spreadsheet is cleaned it can be reimported into the database. This process will delete all the current goldmine data and replace it with the cleaned up data in the Excel spreadsheet. The import file path must be filled in before clicking on the Import Excel GM button. After the Excel file name with the path is specified in the Import Path/File field, click on the Import Excel GM button. The current goldmine data will be deleted and replaced with the new data in the spreadsheet.

Export GM (txt)

The Export GM button is used to export the goldmine data for a specified data range to be used in the Software Surplus software to send information about matching parts to the company or person who requested a part in the past. The file created will be a text file. Clicking on the Export GM button will bring up the screen shown in FIG. 17.

Either enter a date range for the date sent field in the Goldmine data to get a subset of the data or leave the date range blank to get all of the Goldmine data. The Export Path in the Goldmine section must be filled in to export the data. The filename in the export path must end in a .txt extension. This file can then be imported into the Software Surplus application to find matches on the parts.

Clean GM Emails

Figure 18:
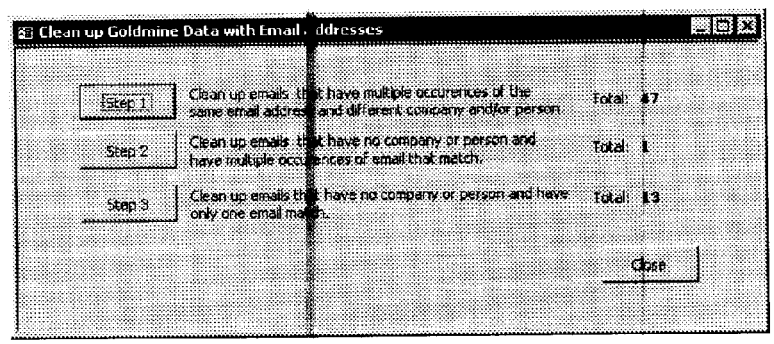

The Clean GM Emails button is used to clean up the email addresses of existing goldmine data. This is crucial when sending emails and faxes to companies that have requested inventory through gold mine and will be sent an email or fax to let them know that there is inventory for the items they requested. It is used to eliminate duplicate emails, faxes, and/or letters when it is actually the same company. There are three steps shown in FIG. 18 that must be performed in order to clean the emails.

Figure 19:
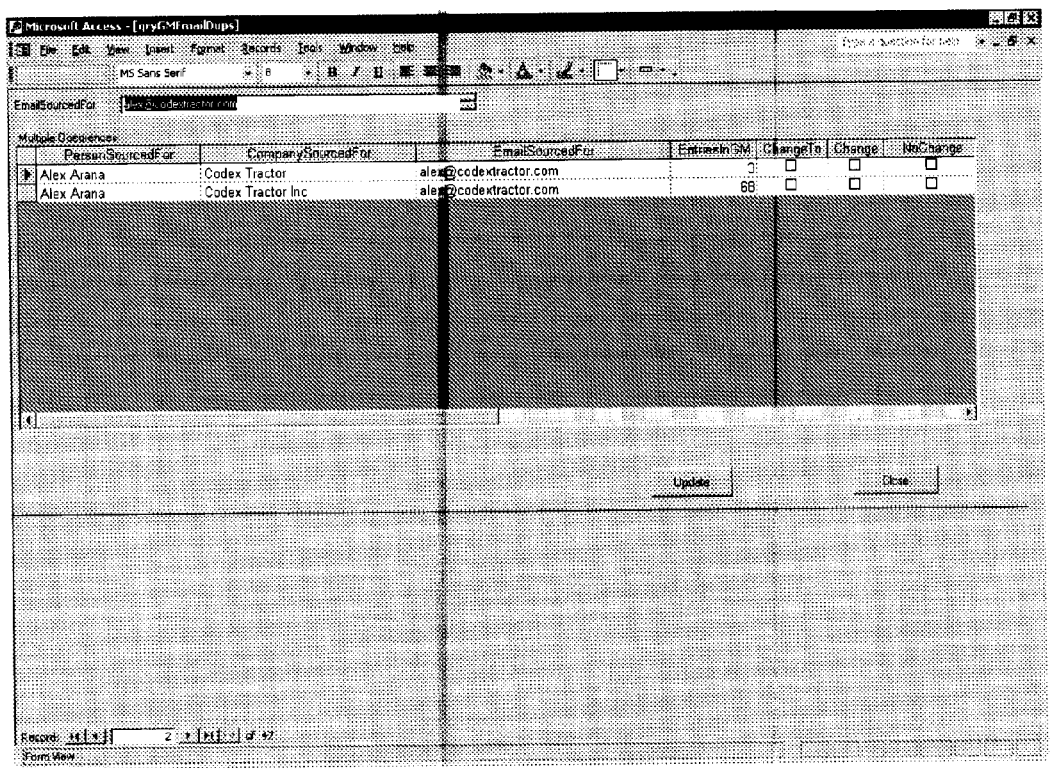

Step 1 will clean up email addresses that have multiple occurrences of the same email address but with a different company and/or person. The total count of how many emails that have multiple occurrences is listed to the right entitled Total. Clicking on the Step 1 button will bring up the screen shown in FIG. 19.

The email address with duplicates is listed at the top of the screen. Below the email address is the multiple occurrences of this email along with the corresponding gold mine data. The PersonSourcedFor, CompanySourcedFor, and EmailSourcedFor entries are listed. The total number of these occurrences is listed under EntriesInGM. In the example above, there are 3 entries where the CompanySourcedFor is listed as Codex Tractor and 68 entries where the CompanySourcedFor is listed as Codex Tractor Inc. The remaining 3 columns give the ability to combine these different entries into one. Check the ChangeTo box to change the entry to the entry item where the Change box is checked. For example, since there are 3 entries with Codex Tractor and 68 entries with Codex Tractor Inc, it may be a good idea to click on the ChangeTo box for Codex Tractor and the Change box for Codex Tractor Inc. Once these boxes are checked, the Update button can be clicked to change all the Codex Tractor entries to Codex Tractor Inc eliminating the duplicate entries.

The NoChange box is checked if the entry is to remain as is. There may be times when entries should not be combined because there is a need to send to different persons or companies. Check the NoChange box to keep the entry.

To go to the next duplicate email address click on the single right arrow located at the bottom of the page next to the work Record and continue updating the emails.

Figure 20:
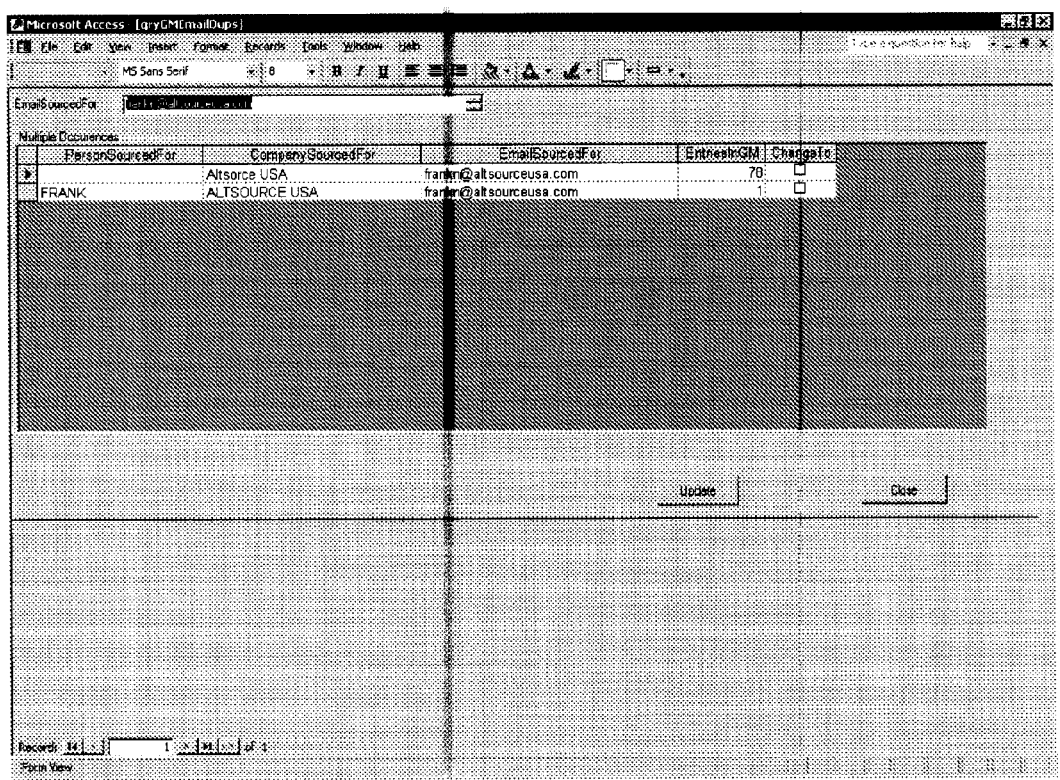

Step 2 will clean up email addresses that have no company or person listed in the gold mine data and have multiple occurrences of an email that match. The total count of how many of these emails exist is listed to the right entitled Total. Clicking on the Step 2 button will bring up the following screen shown in FIG. 20.

The email address with duplicates is listed at the top of the screen. Below the email address is the multiple occurrences of this email along with the corresponding gold mine data. The PersonSourcedFor, CompanySourcedFor, and EmailSourcedFor entries are listed. The total number of these occurrences is listed under EntriesInGM. In the example above, there are 78 entries where the PersonSourcedFor is blank and the CompanySourcedFor is listed as Altsorce USA and 1 entry where the PersonSourcedFor is FRANK and the CompanySourcedFor is listed as ALTSOURCE USA. The last column gives the ability to combine these different entries into one. Check the ChangeTo box to change all of the remaining entries to this entry. For example, since there are 78 entries with Altsorce USA and 1 entry with ALTSOURCE USA, it may be a good idea to click on the ChangeTo box for Altsorce USA since this spelling is most likely correct. Once these boxes are checked, the Update button can be clicked to change all the ALTSOURCE USA entries to Altsorce USA eliminating the duplicate entries.

To go to the next duplicate email address click on the single right arrow located at the bottom of the page next to the work Record and continue updating the emails.

Step 3 will clean up email addresses that have no company or person listed in the gold mine data and have only one email that matches. The total count of how many of these emails exist is listed to the right entitled Total. Clicking on the Step 3 button will automatically clean up the email addresses that have only one email match.

Clean GM Company/Contact

The Clean GM Company/Contact button is used to clean up the companies and contacts of existing goldmine data. This is crucial when sending emails and faxes to companies that have requested inventory through gold mine and will be sent an email or fax to let them know that there is inventory for the items they requested. It is used to eliminate duplicate emails, faxes, and/or letters when it is actually the same company. There are 5 different options to help merge companies that are the same. They are Show all Companies, Show Companies without email, phone or fax with no other records, Show Companies without email, phone or fax with other records, Show a Specific Company and Show All Contacts without a company.

Figure 21:
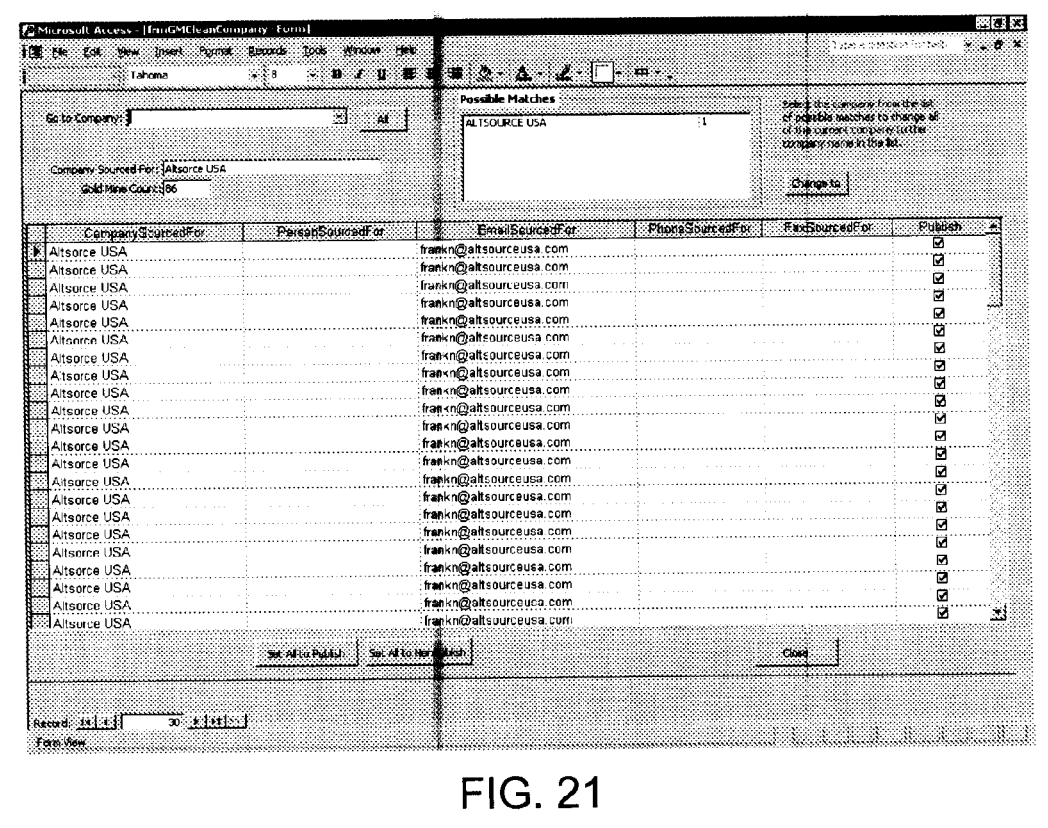

The first item is Show all Companies. If this item is checked and the View Details button is clicked, the screen shown in FIG. 21 will appear.

The Company is listed in the Company Sourced For field followed by the Gold Mine Count indicating how many gold mine entries exist for this company. The list box located on the upper right hand portion of the screen shows other entries in the gold mine table with similar company names and how many entries in the gold mine table for the company exist. If the companies are indeed the same and the company in the list box is the correct one, click on the entry and then click on the Change To button. The company sourced for listed below will be changed to the one selected in the list box. Continue to the next company by clicking on the right arrow located at the bottom of the screen next to the label Record.

Figure 22:
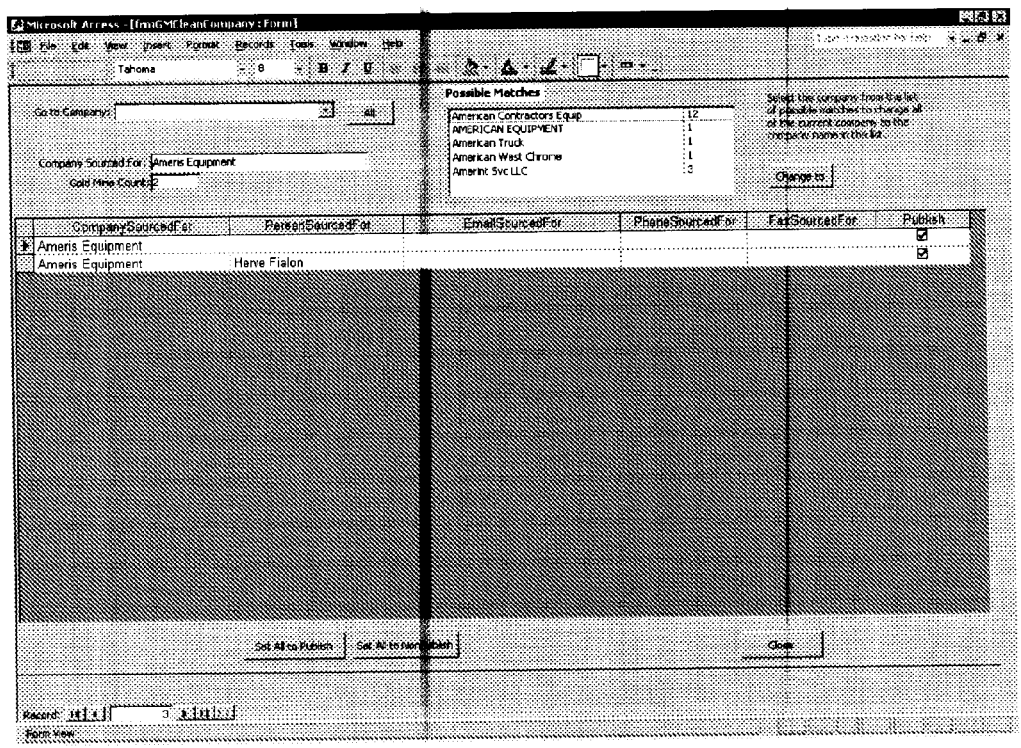

The second list item is Show Companies without email, phone or fax with no other records. If this item is checked and the View Details button is clicked, the screen shown in FIG. 22 will appear.

The Company is listed in the Company Sourced For field followed by the Gold Mine Count indicating how many gold mine entries exist for this company. The list box located on the upper right hand portion of the screen shows other entries in the gold mine table with similar company names and how many entries in the gold mine table for the company exist. If the companies are indeed the same and the company in the list box is the correct one, click on the entry and then click on the Change To button. The company sourced for listed below will be changed to the one selected in the list box. Continue to the next company by clicking on the right arrow located at the bottom of the screen next to the label Record.

Figure 23:
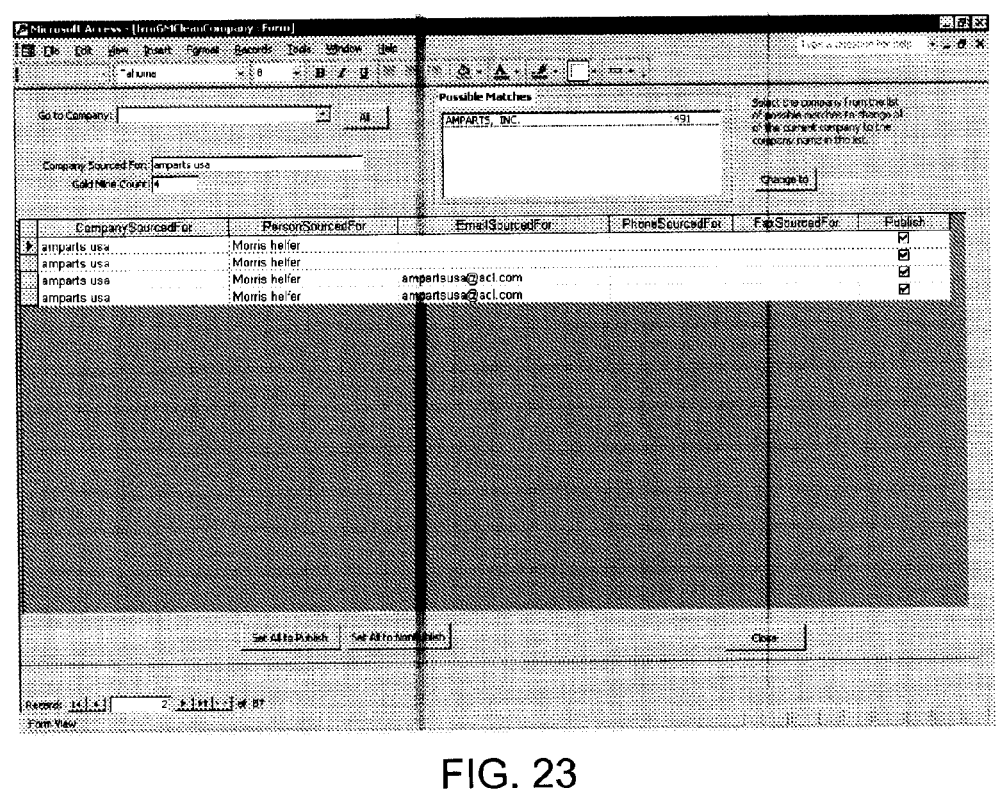

The third list item is Show Companies without email, phone or fax with other records. If this item is checked and the View Details button is clicked, the screen shown in FIG. 23 will appear.

The Company is listed in the Company Sourced For field followed by the Gold Mine Count indicating how many gold mine entries exist for this company. The list box located on the upper right hand portion of the screen shows other entries in the gold mine table with similar company names and how many entries in the gold mine table for the company exist. If the companies are indeed the same and the company in the list box is the correct one, click on the entry and then click on the Change To button. The company sourced for listed below will be changed to the one selected in the list box. Continue to the next company by clicking on the right arrow located at the bottom of the screen next to the label Record.

The fourth list item is Show a Specific Company. Select the company to view and click on the View Details button to view the same screen as the ones listed above except that it only shows the company specified.

Figures 24, 25:
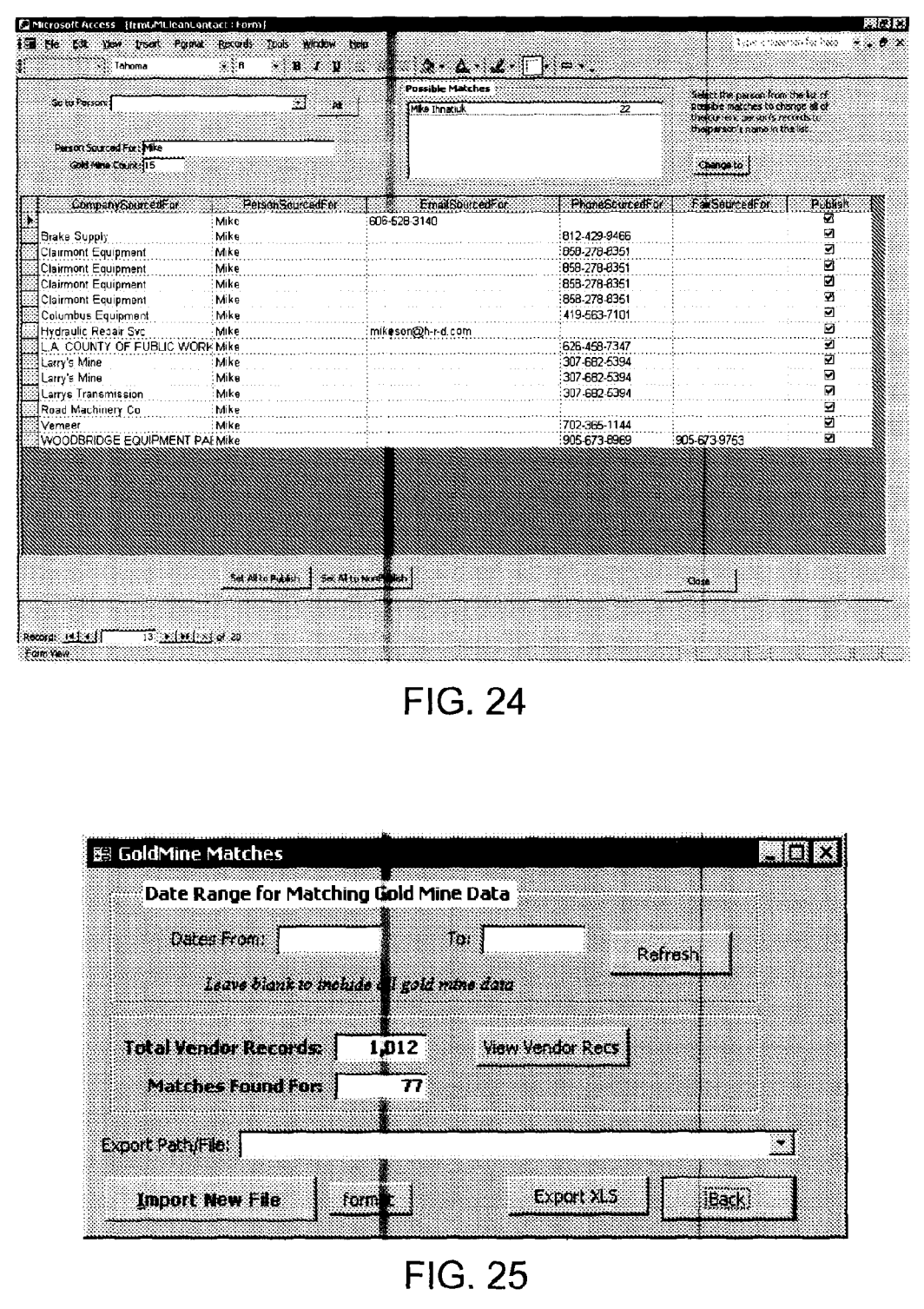

The fifth list item is Show All Contacts without a company. If this item is checked and the View Details button is clicked, the screen shown in FIG. 24 will appear.

The Contact is listed in the Person Sourced For field followed by the Gold Mine Count indicating how many gold mine entries exist for this company. The list box located on the upper right hand portion of the screen shows other entries in the gold mine table with similar contact names and how many entries in the gold mine table for the company exist. If the contacts are indeed the same and the contact in the list box is the correct one, click on the entry and then click on the Change To button. The person sourced for listed below will be changed to the one selected in the list box. Continue to the next contact by clicking on the right arrow located at the bottom of the screen next to the label Record.

Match Vendor Data w/Goldmine—xls

The Match Vendor Data w/Goldmine—xls button is used to match surplus inventory from a vendor against goldmine requests. The output generated will be an excel spreadsheet containing matches of inventory for each item. After clicking on the Match Vendor Data w/Goldmine-xls button, the screen shown in FIG. 25 will appear.

Enter the date range of the gold mine data that you want to match against. To match against all gold mine data, leave the date fields blank. Next click on the Import New File button to find the file for the surplus inventory that will be imported. The file should be in an Excel format and will contain the following fields with the column names: 1) Part Number, 2) Description, 3) Model, 4) QuantityRequested and 5) Condition.

Click on the format button to view the format that the file needs to be in. Once the file has been imported, a total count of the vendor records will be listed as well as how many matches were found. Click on the View Vendor Recs button to see the records that have been last imported.

Once the file is imported, click on the Export XLS button to create an excel spreadsheet of the matching inventory. The spreadsheet will contain the following fields: 1) Part Number, 2) Model, 3) Condition, 4) QuantityRequested 5) CompanySourcedFor, 6) PersonSourcedFor, 7) EMailSourcedFor, 8) PhoneSourceFor and 9) Quantity.

Match Vendor Data w/Goldmine—Postcard

Figure 26:
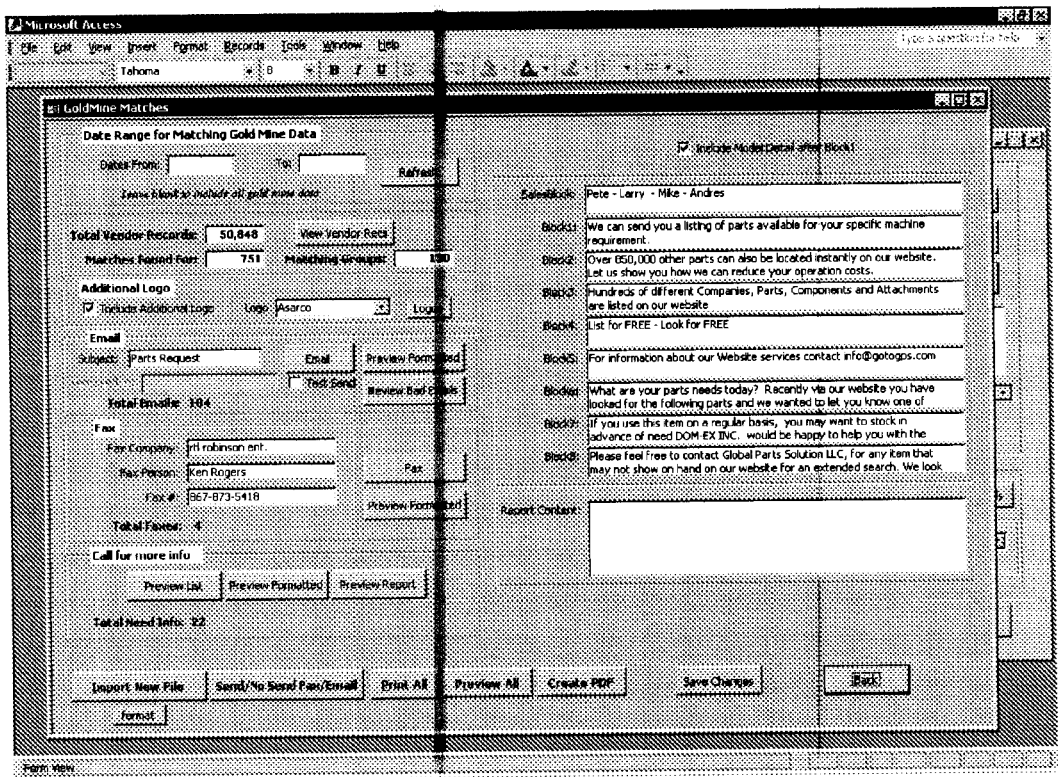

The Match Vendor Data w/Goldmine—postcard button is used to match surplus inventory from a vendor against goldmine requests and send email, fax or letters to the vendors stating which requests they have made in the past that are currently in inventory. After clicking on the Match Vendor Data w/Goldmine-postcard button, the screen shown in FIG. 26 will appear.

Enter the range of dates to match the gold mine data against and click on the Import New File button. Once the file is found and imported, the total number of vendor records will be displayed along with how many matches were found and the number of matching groups. The matching groups consist of the unique occurrence of CompanySourcedFor, PersonSourcedFor and EmailSourcedFor in the gold mine table. The emails and letters generated will be based on the matching groups. To view the records that have been imported for the vendor, click on the View Vendor Recs button. The input format of the imported file can be viewed by clicking on the format button located below the Import New File button. The format of the vendor file to be imported is: 1) Part Number, 2) Description, 3) Model, 4) QuantityRequested and 5) Condition.

The output based on the vendor matches against inventory can be either sent via email, fax, or a letter. Each output will contain the models and/or parts that the vendor has matched against the gold mine data. The right hand side of the screen contains blocks of information that will be displayed either on the email postcard or the fax/letter. These blocks may be changed before sending the output. Change any block of information and click on the Save Changes button to have the output reflect the new changes.

An additional logo for a vendor besides the one for GPS may also be added to all emails, faxes and reports. A logo will be added if the checkbox located next to Include Additional Logo is checked. The logo must be selected from the drop down box. To add new logos for vendors, click on the Logos button.

The email section displays the total emails that were found for the matching groups. If a matching group has both an email and a fax number, the group will show up in the email group rather than the fax group since email is the preferred method of sending the results. Click on the Review Bad Emails button to review any email addresses that may be incorrect. If there are any bad email addresses a screen will appear displaying them otherwise if the addresses look correct, a message will display indicating that the email addresses have been validated. Fix any bad email addresses in the gold mine data before continuing. To test the email function before actually sending to the email addresses in the gold mine group, click on the Test Send box and fill in the email address where all the emails will go to. Click on the Email button and all the emails will go to the address specified for testing.

Figure 27:
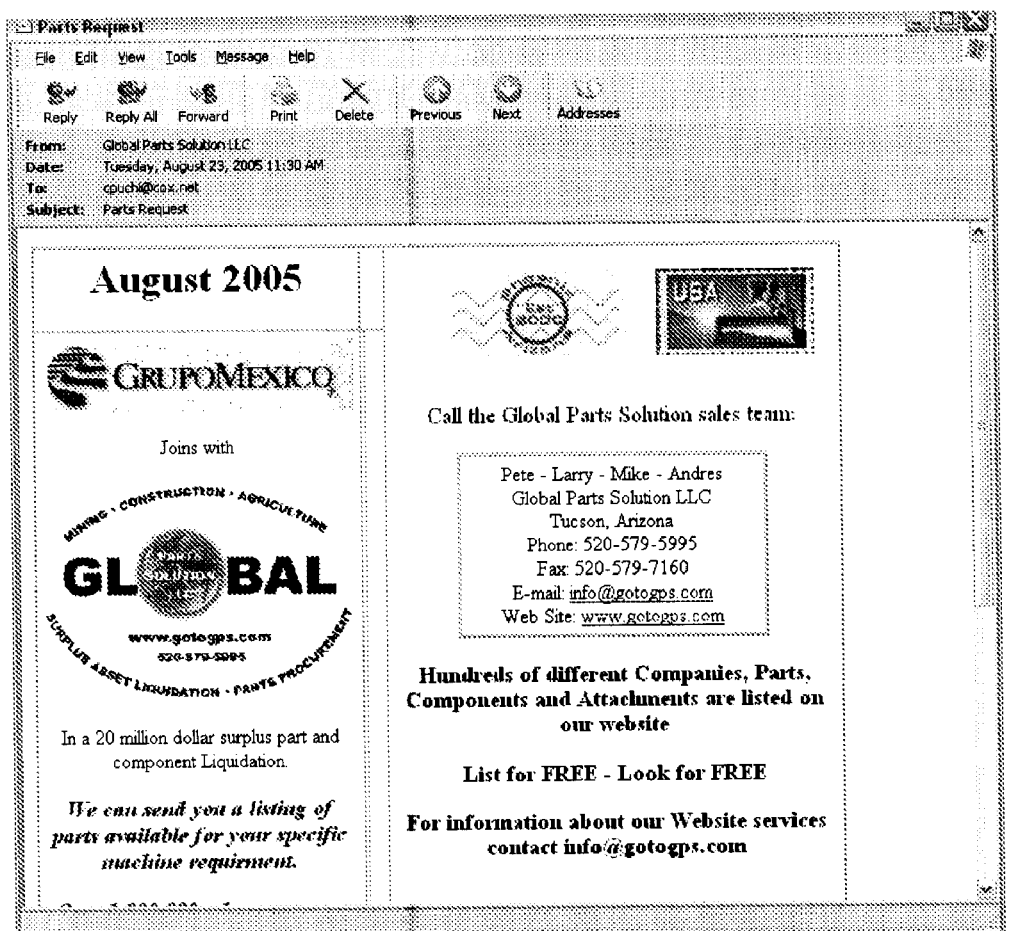

Type what will be displayed in the subject of each email next to the Subject field on the screen. Click on the Email button to send the email postcard to all those groups in the gold mine table that have matches against the vendor inventory imported. Make sure the Test Send box is not checked. Each group that has a valid email address will be sent a postcard listing the parts that match. A sample postcard email is shown in FIG. 27.

Figure 28:
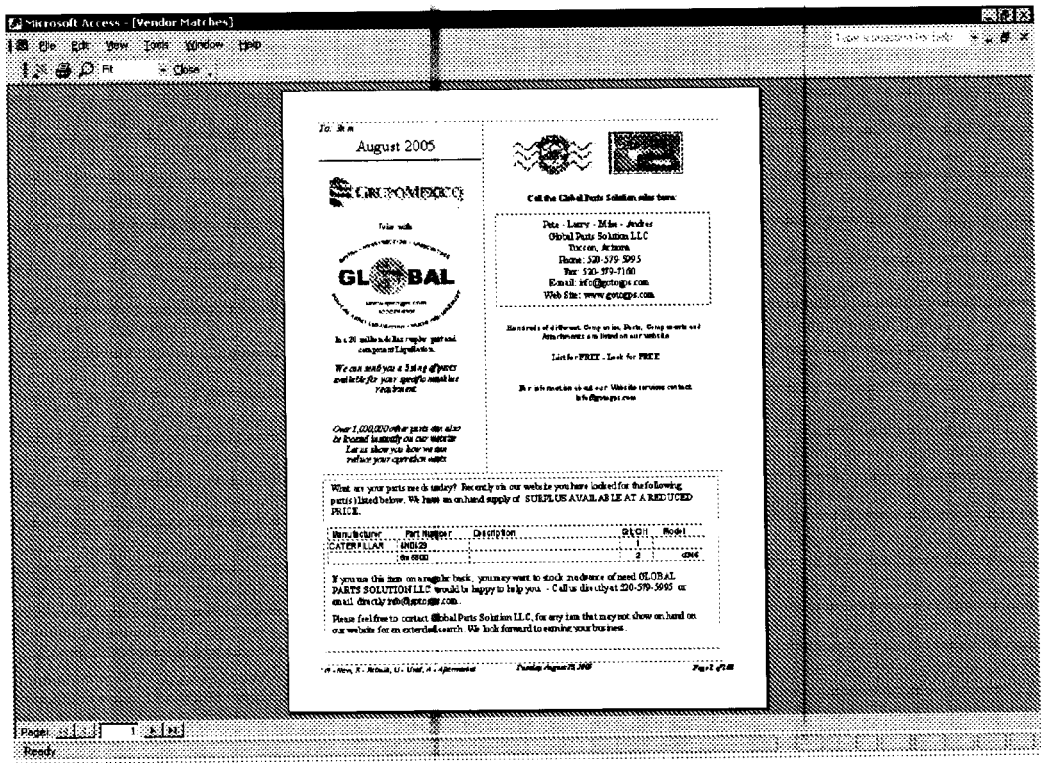

To preview a sample letter that looks like the emails that will be sent, click on the Preview Formatted button in the email section. A sample letter is shown in FIG. 28.

The Fax section displays the total number of matching groups without an email and with a fax next to the Total Faxes label. Faxes will be sent one at a time. Click on the Fax button and a dialog will appear from the fax software loaded on the workstation asking for the fax number. Enter the information from the Fax Company, Fax Person and Fax # listed on the screen. The fax will be sent and the next fax group will appear. Continue sending each fax until they are complete.

Figure 29:
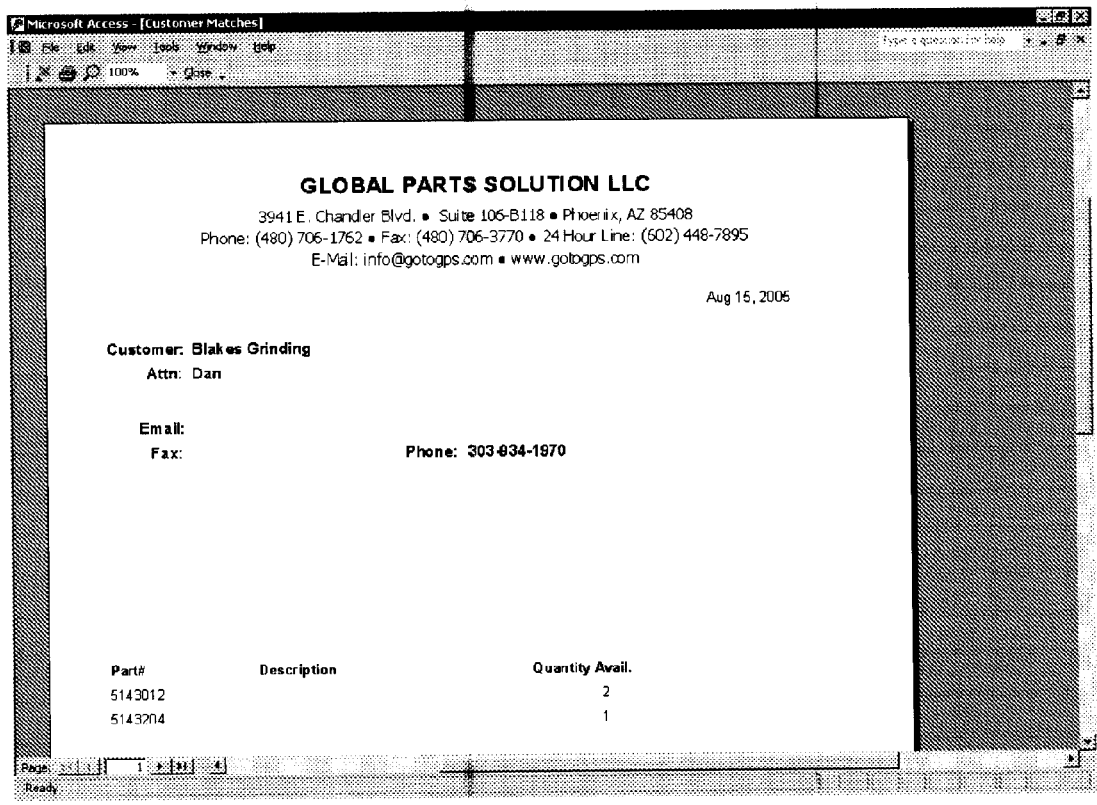

The Call For More Info section displays the number of groups that do not have an email address or fax number next to the Total More Info field. Click on the Preview List button to show the vendors and their phone numbers. The Preview Formatted button will display the matching information in the formatted letter. The Preview Report button will display the report shown in FIG. 29.

Figure 30:
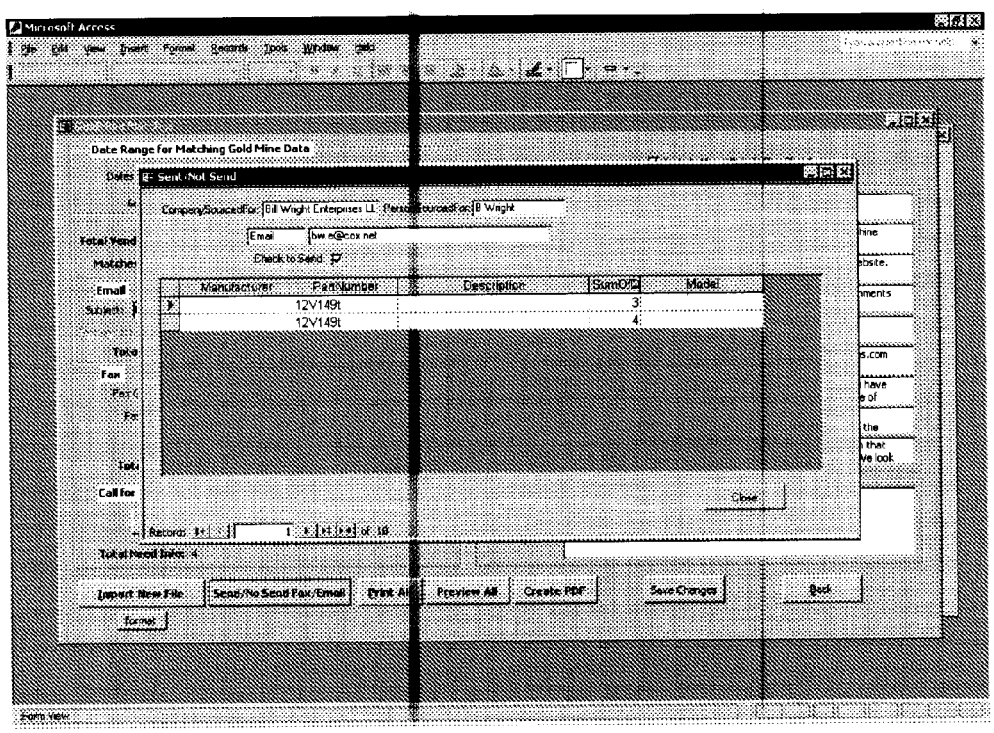

The Send/No Send Fax/Email button located on the bottom of the screen gives the option of not sending individual groups when emailing of faxing. Clicking on the button will bring up the screen shown in FIG. 30.

The Check to Send check box is checked by default. To not send this fax or email, uncheck the Check To Send box. The group will be skipped when emailing or faxing.

The Print All button prints the formatted report for all groups directly to the printer. The Preview All button displays the formatted report for all groups to the screen. The Create PDF button creates a pdf document for all the groups.

Output 1—Goldmine dump—1 file

Output 1 creates a single text file of the gold mine data to be used as an import into the web application. Specify the name and path of the file created in the Export Path field in the Goldmine section. It must end with a .txt extension. The text file created is a tab delimited file with no quotes around the strings. The file consists of the following fields: 1) Manufacturer, 2) Model, 3) Quantity, 4) Part Number, 5) Description, 6) CompanySourcedFor, 7) PersonSourcedFor, 8) PhoneSourcedFor, 9) FaxSourcedFor, 10) EmailSourcedFor, 11) SentDate Output 2—Goldmine requests by Manuf & Mod Output 2 creates several files. Each file will contain the parts requested for a specific manufacturer and model. Therefore, there will be as many files as unique manufacturers and models. Enter the path where the files will be created only. The filename will consist of the manufacturer followed by an underscore and the model. The files created will be tab delimited text files with no quotes for string fields. The files consist of the following fields: 1) Quantity, 2) Part Number, 3) Description, 4) CompanySourcedFor, 5) PersonSourcedFor, 6) PhoneSourcedFor, 7) FaxSourcedFor, 8) EmailSourcedFor Output 3—Goldmine requests by Manuf & Mod—Short Output 3 creates several files. Each file will contain the parts requested for a specific manufacturer and model. Therefore, there will be as many files as unique manufacturers and models. Enter the path where the files will be created only. The filename will consist of the manufacturer followed by an underscore and the model. The files created will be tab delimited text files with no quotes for string fields. The files consist of the following fields: 1) Quantity, 2) Part Number, 3) Description Parts Match with All Models This section imports a file of part numbers and displays all the models that will fit this part in a query. The Import Path/File must be filled in before importing the file. Click on the Import Excel button to import the file. The file to be imported must be an Excel spreadsheet with the following fields: 1) Part Number, 2) Description, 3) Quantity Click on the View Parts w/ Models button to view all the models that the list of parts fits. The list of parts will be along the left side of the query and the models will be columns along the top of the query. Each cell will be filled in with a '1' if it belongs to the model. On the top of the screen there will be a toolbar with an Excel icon, a printer icon, a page setup icon, and a folder icon. To export the query to Excel, click on the Excel icon. To print, click on the printer icon. To change the setup of the printout, click on the page setup icon. To close the screen, click on the folder icon.

Figure 31:
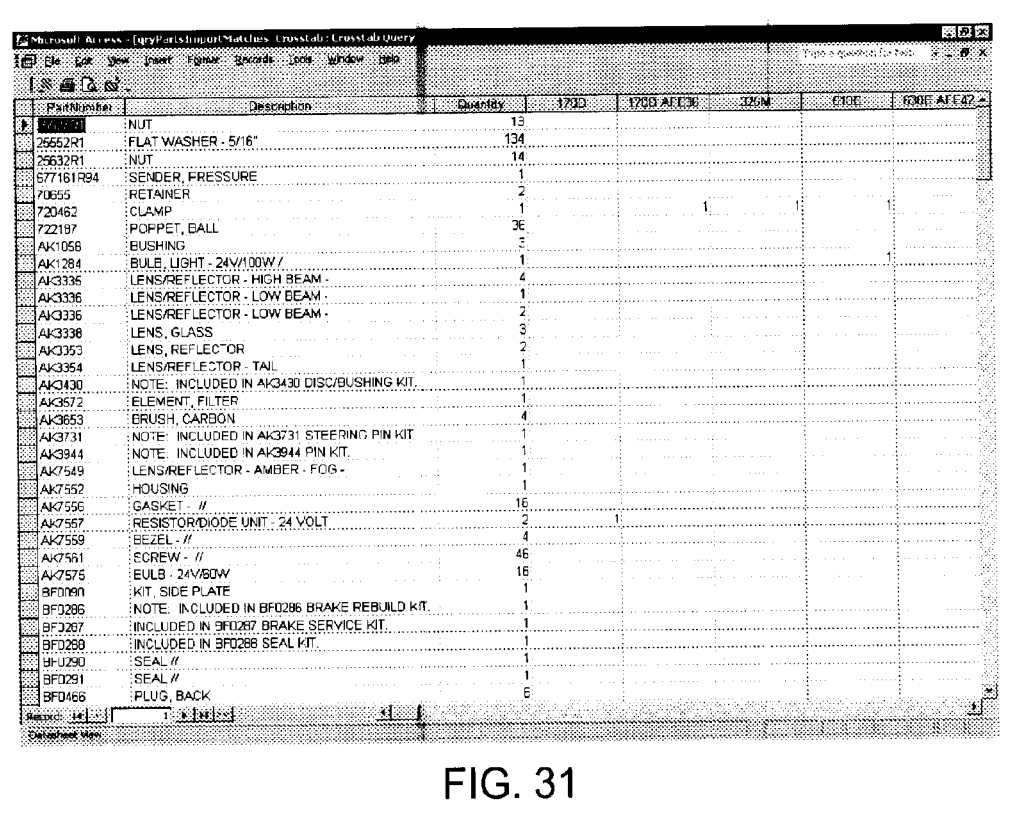

The output looks like the screen shown in FIG. 31.

Clicking on the Export All Models button is another way to save the output shown above. After clicking on the button, a list of different formats will appear to save the output into. Choose the format from the list and provide a filename to save the output.

Figure 32:
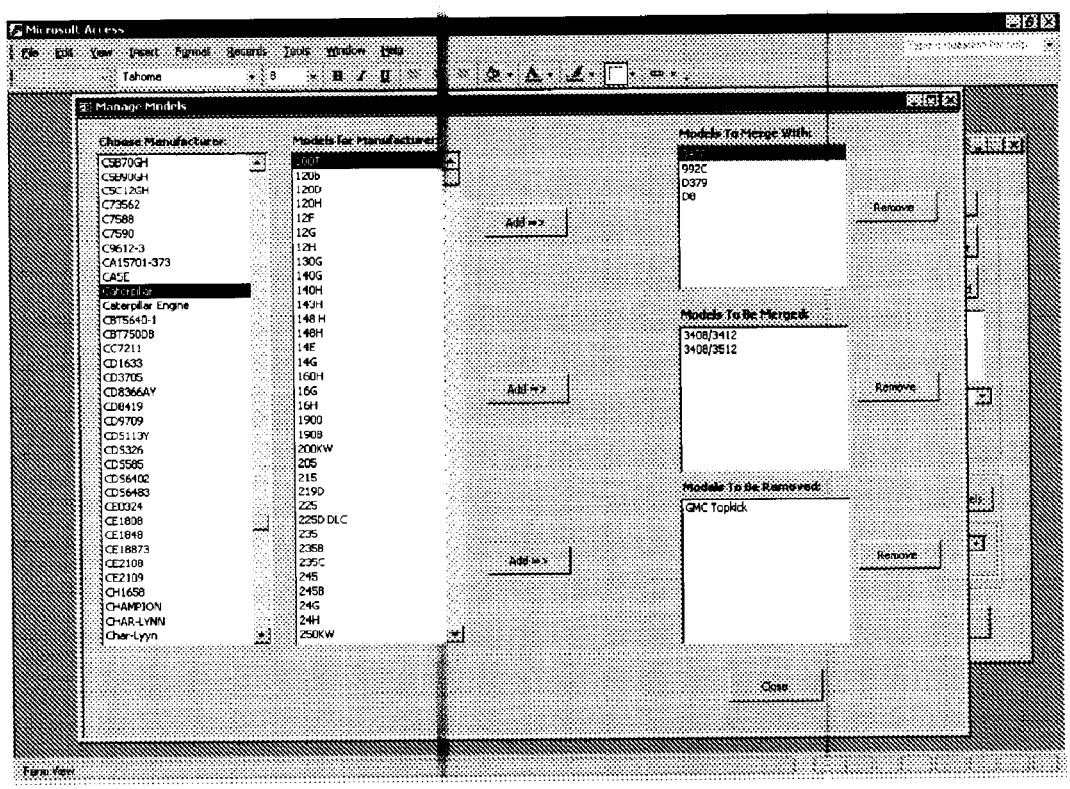

The Export By Model button will generate separate Excel files for each model with the list of parts that match the model. Enter the path where the files will be generated. The fields in each file will consist of: 1) Part Number, 2) Description, 3) Quantity Manage Models There are several models in the database located in the Models and Gold Mine tables. Some models may be put in these tables more than once under different names. For example, a model named D8 may also be put into the database with the name of D8-D10. This may indeed be the same model but just named differently. To avoid these duplicates, click on the Manage Models button. This screen, shown in FIG. 32, will allow the merging of models with different names as well as the removal of insignificant models.

The list of all the manufacturers is on the left hand of the screen. Click on a manufacturer in the list to view all of the models for that manufacturer. Click on the top Add button to move the model to the Models to Merge With. Click on the model in the Models To Merge With to add other models with similar names to merge with this model. Once the model is highlighted, click on another model that is the same and click on the middle Add button to add it to the Models To Be Merged list box. Continue to click on any other models that are the same as the model in the Models To Merge With and add them to the Models To Be Merged list box.

Select any models in the Models for Manufacturer list box and click on the bottom Add button to remove the model.

Manage Manufacturers

Figure 33:
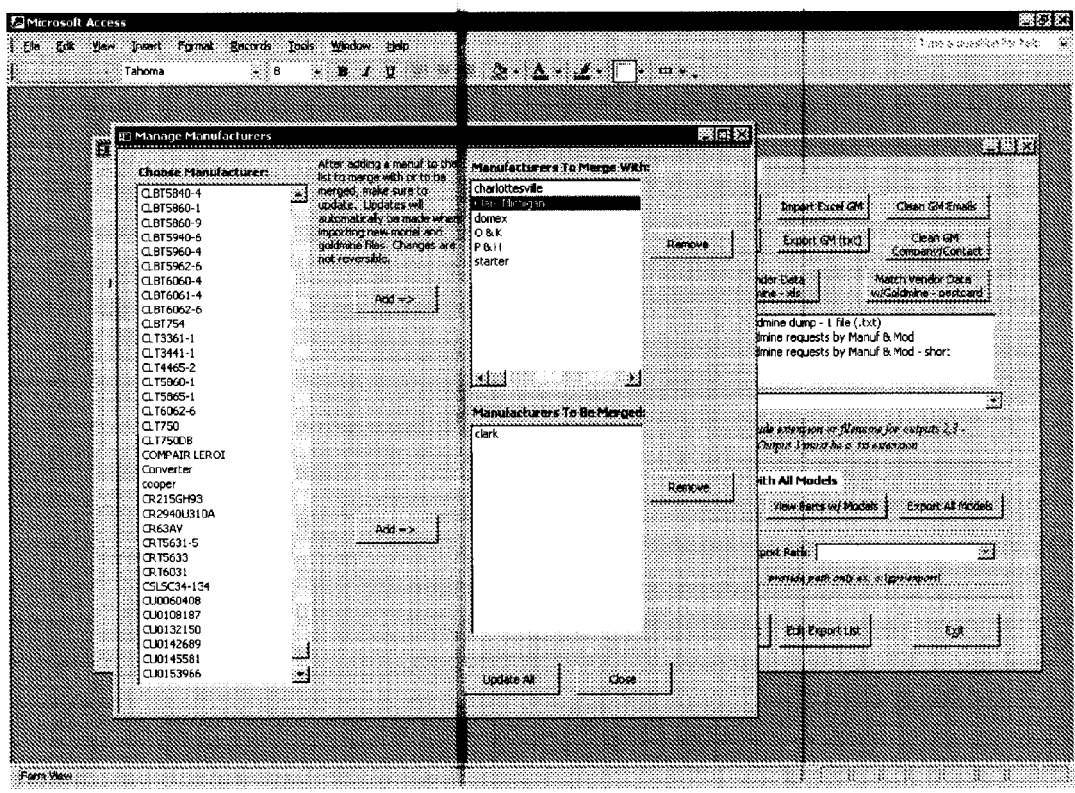

There are several manufacturers in the database located in the Models and Gold Mine tables. Some manufacturers may be put in these tables more than once under different names. For example, a manufacturer named Caterpillar may also be put into the database with the name of CAT. This may indeed be the same manufacturer but just named differently. To avoid these duplicates, click on the Manage Manufacturers button. This screen, shown in FIG. 33, will allow the merging of manufacturers with different.

The list of all the manufacturers is on the left hand of the screen. Select a manufacturer in the list and then click on the top Add button to move the Manufacturer to the Manufacturers to Merge With list box. Make sure the manufacturer you just added is highlighted in the Manufacturers to Merge With list box then select another manufacturer from the Choose Manufacturer list with the similar name to merge with the manufacturer selected. Click on the bottom Add button to add this manufacturer to the Manufacturers To Be Merged list box. Continue to click on any other manufacturers that are the same as the manufacturer in the Manufacturers To Merge With and add them to the Manufacturers To Be Merged list box. Once all the manufacturers have been selected, click on the Update button to make the changes to the database permanent. This operation cannot be undone so be careful when choosing the manufacturers.

Edit Import List

Figure 34:
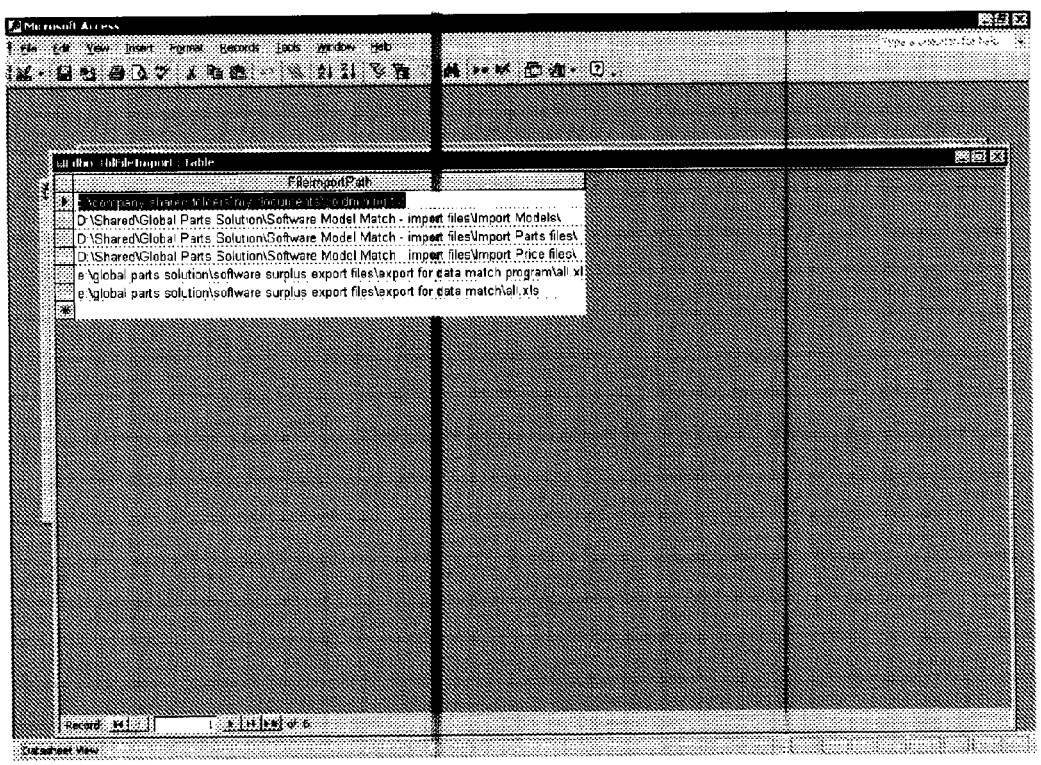

The Edit Import List button located on the bottom right hand portion of the screen allows you to add, update and delete paths and filenames that will appear in the drop down list box located next to the Import Path/File field. Clicking on the button will bring up the screen shown in FIG. 34.

Edit Export List

Figure 35:
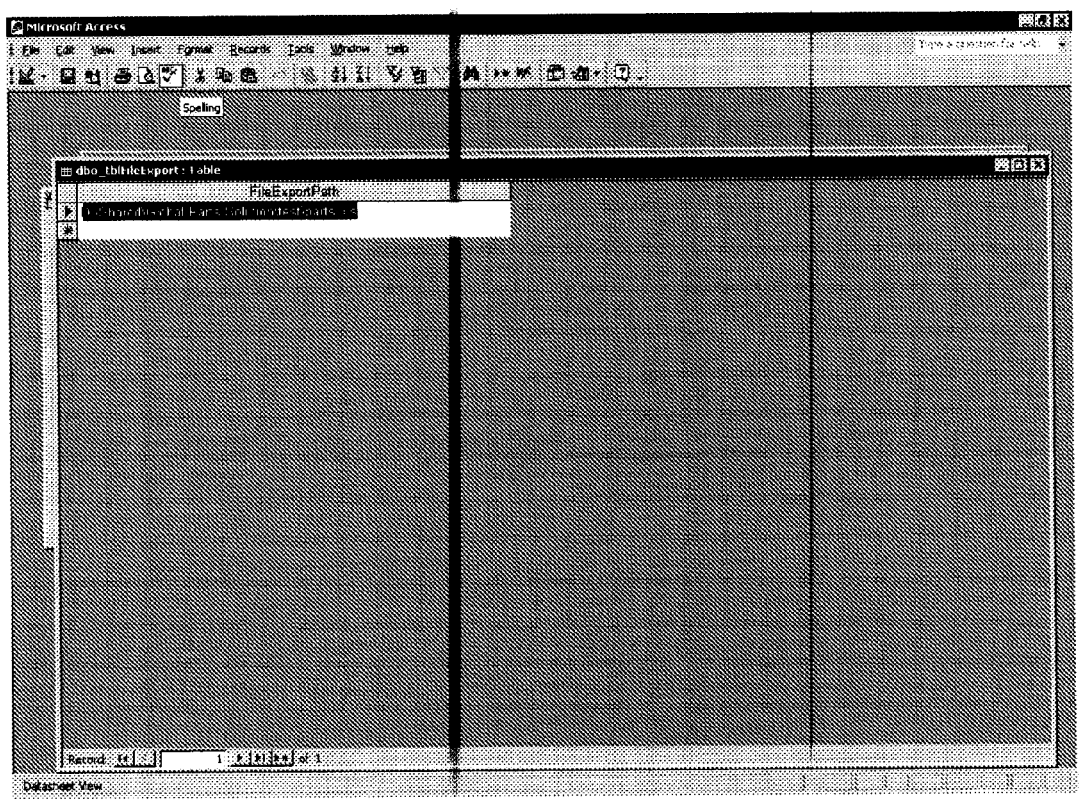

The Edit Export List button located on the bottom right hand portion of the screen allows you to add, update and delete paths and filenames that will appear in the drop down list box located next to the Export Path/File field. Clicking on the button will bring up the screen shown in FIG. 35.

Example 2

Overview

The GPS Surplus Tool is an application that manages vendors and their inventory. The tool stores information about the vendor including company name, contact information, address, phone and fax for the vendor. Once the vendor is added into the database, inventory for the vendor can be stored.

The GPS Surplus Tool allows searching for parts based on criteria specified and exporting the results of the searches into MS Excel spreadsheets. The tool also has the ability to import customer files with part numbers based on a provided format and match those part numbers against current inventory providing an output with numbers of matches for each part number against vendors' inventory. It can also import gold mine requests from the Model Match software to find which of those requested parts are in inventory.

Figure 36:
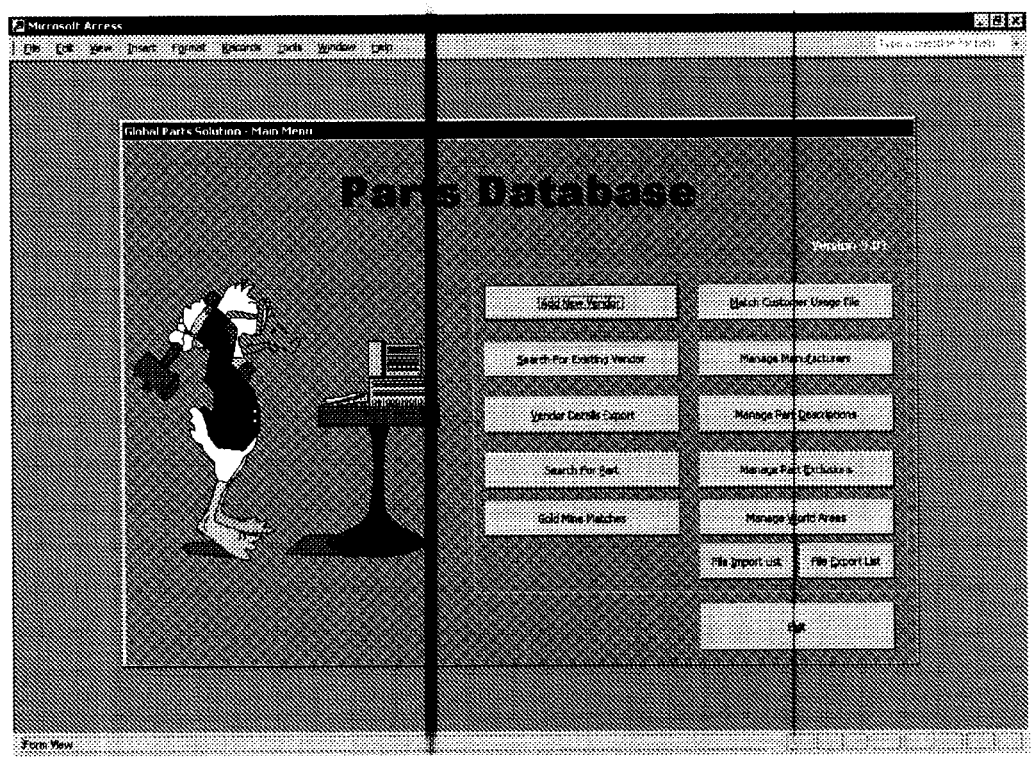

The screen shown in FIG. 36 is the main menu of the GPS Surplus Tool. It consists of the following buttons: Add New Vendor, Search for Existing Vendor, Vendor Details Export, Search for Part, Gold Mine Matches, Match Customer Usage File, Manage Manufacturers, Manage Descriptions, Manage Part Exclusions, Manage World Areas, File Import List, File Export List Each of these functions will be discussed in detail in the remainder of this document.

Vendors

A vendor must first be added into the database in order to store any inventory for that vendor. Each vendor is assigned a unique identifier that will be used to reference that vendor. Changes may be made to a vendor and inventory can be added into the database once a vendor is added.

Adding a New Vendor

Figure 37:
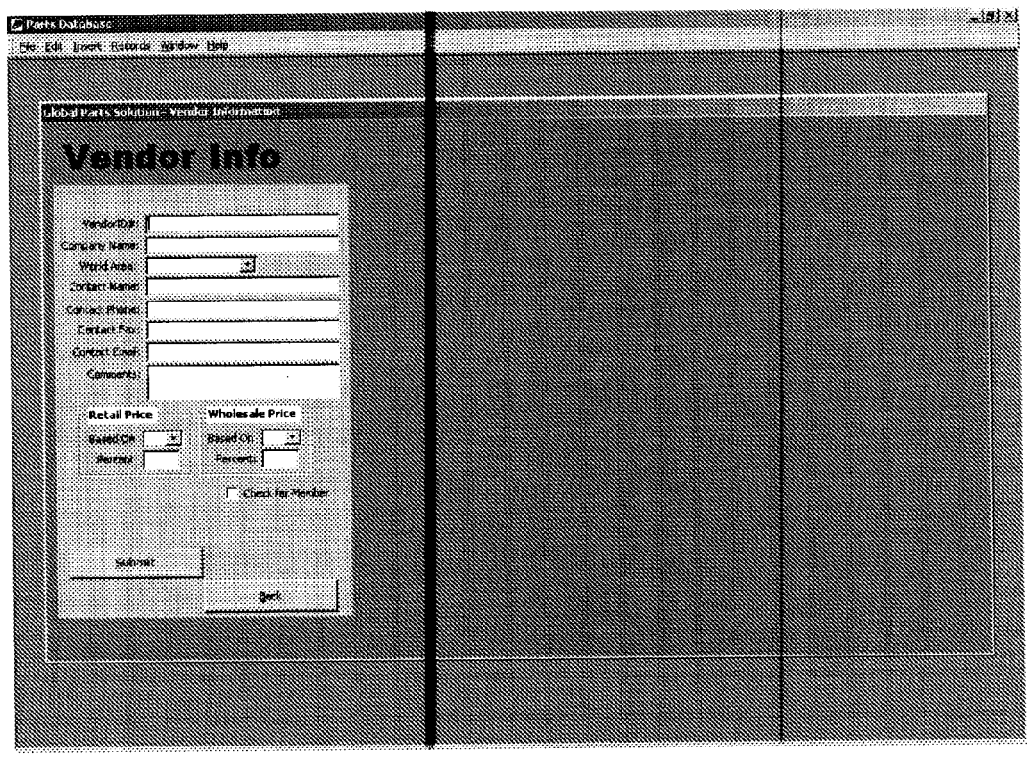

The vendor may be added into the database by clicking on the Add New Vendor button on the main menu. The Vendor Info screen shown in FIG. 37 will appear listing the details for the vendor. Enter in the fields for the vendor then click on the Submit button to save the vendor.

The information stored for a vendor consists of the following:

Vendor ID#—Required field. This is a unique identifier for the vendor. The ID must be numeric and unique in the database.

Company Name—Required field. This is the name of the vendor. The name cannot exceed 40 characters.

World Area—Optional field. The world area where vendor supplies surplus from.

Contact Name—Required field. First and Last name of the vendors primary contact. The contact name cannot exceed 40 characters.

Contact Phone—Optional field. Phone number of the primary vendor contact. The phone number cannot exceed 20 characters.

Contact Fax—Optional field. Fax number of the primary vendor contact. The fax number cannot exceed 20 characters.

Contact Email—Optional field. Electronic mail address of the primary vendor contact. The email address cannot exceed 40 characters.

Comments—Optional field. Any comments regarding this vendor. The comments must not exceed 255 characters.

Retail Price Based On—Required field. Choose Net or List from the drop down box to determine what price the retail price will be based on.

Retail Price Percent—Required field. The percent the retail price will be calculated from. Enter the decimal number. For example, enter 1 for 100%, 0.75 for 75%, and 1.2 for 120% of the list or net price.

Wholesale Price Based On—Required field. Choose Net or List from the drop down to determine what price the wholesale price will be based on.

Wholesale Price Percent—Required field. The percent the wholesale price will be calculated from. Enter the decimal number. For example, enter 1 for 100%, 0.75 for 75%, and 1.2 for 120% of the list or net price.

Check for Member—Required field. Click in this field if the vendor has signed up as a member of GPS. Those vendors that are members will have their vendor information printed on reports and exports. Those vendors that are not members will have GPS information printed.

Searching and Making Changes to an Existing Vendor

Figure 38:
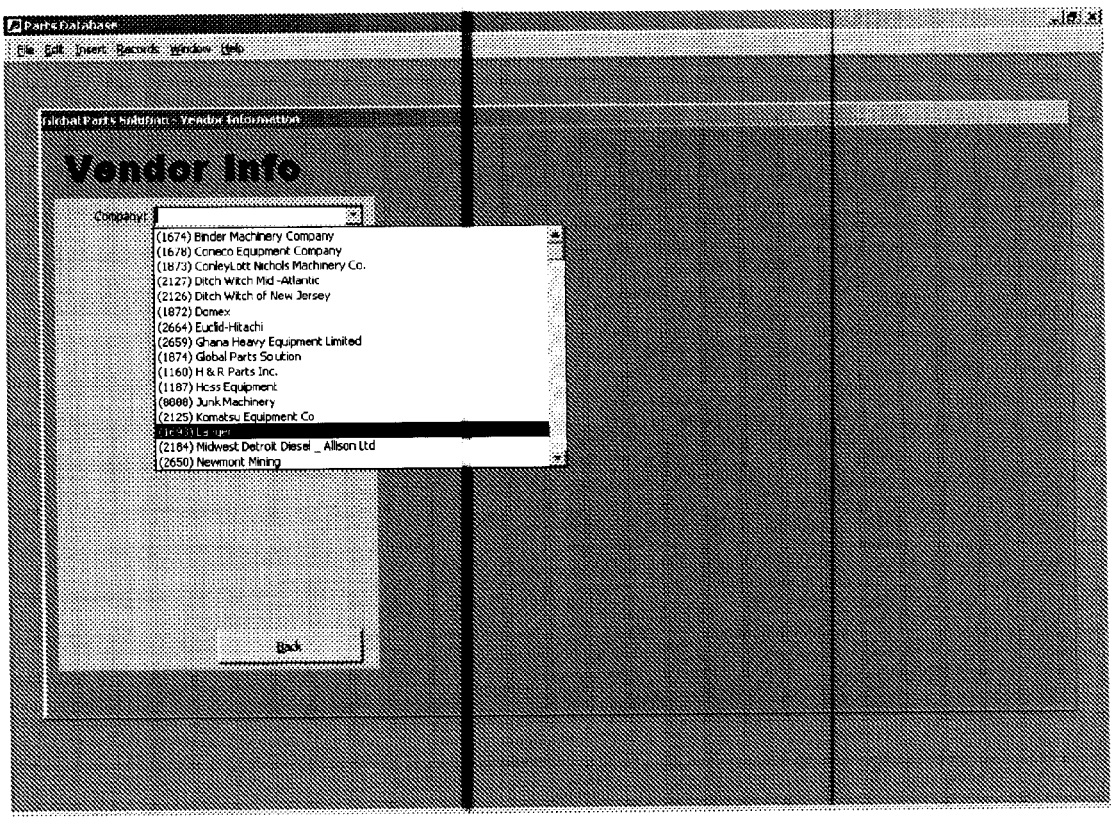

Vendor details can be displayed for existing vendors by clicking on the Search for Existing Vendor button from the main screen. A screen shown in FIG. 38 will appear with a drop down box for the Company. Click on the box with the arrow pointing down to choose a vendor from the list of vendors existing in the database. Move through the box with your mouse and click on the vendor to be displayed. Once the vendor is selected, all information regarding that vendor will be displayed on the screen.

Figure 39:
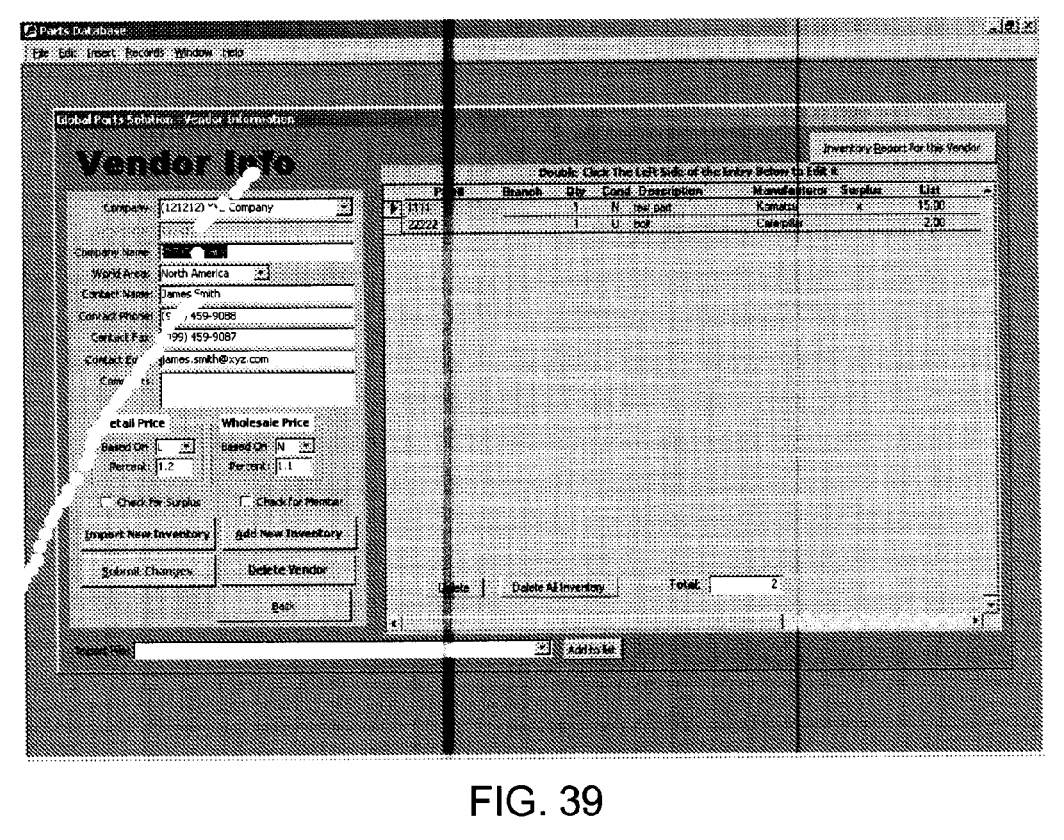

Once the vendor is selected, all information regarding that vendor will display on the screen shown in FIG. 39 including current inventory of that vendor.

Adding Vendor Inventory by Importing

Once a vendor is added to the database inventory for that vendor can be imported. To import inventory for an existing vendor, click on the Search for an Existing Vendor button on the main screen. Select the vendor you would like to import the inventory from by clicking the down arrow next to the Company field. Once the vendor is selected, the information for that vendor will appear on the screen. To import inventory that is surplus click in the box next to the Click for Surplus field. This will import all the records as surplus inventory. Surplus records will appear with an "x" in the Surplus field. To add inventory that is not surplus, make sure the box next to the Click for Surplus field is not checked.

Enter the file name and path of the file in the Import File field listed at the bottom left corner of the screen. You must enter the entire path where the file exists including the file name. An example might be: c:\MyCompany\MyInventory.xls. You may save the path or the path and filename by clicking on the Add To List button next to the Import File field. This will allow you to select the path or path and filename next time from a drop down box by clicking on the arrow next to the Import File field. The file to be imported must be in a specific format that will be detailed later in this section. Once the filename and path are entered, click on the Import New Inventory button. If no path is entered or an invalid path is entered, an error message will appear. If the filename and path are found, a message will appear stating the number of records that will be added and asking if you would like to continue with the operation. Clicking on the No button will return you to the screen without adding any records. If you click on the Yes button, another popup message will appear asking if you want to delete the existing inventory for this vendor. Click on the Yes button to clear out the existing inventory before adding the new inventory or click on the No button to add the new inventory to the existing inventory. You will then receive another message stating how many records will be added. Click on the Yes button to continue adding or the No button to cancel the import.

Once the import is complete, the screen will be updated with the newly imported inventory.

Vendor Inventory Import Formats

There are three types of files that may be imported into the system; an Excel spreadsheet, a delimited text file, or an MS Access database. Whichever way is chosen, the file sent in should be named appropriately with your VendorID and the date. Whichever means you choose to submit your inventory items; the file will contain the following information (without spaces in Part Number).

Branch—Then name or number of your Branch.
Part Number—Unique part number of the item.
Description—Brief description of the item.
Manufacturer—The industry standard name of the manufacturer of the item (Optional).
Condition—Either 'N' (New), 'R' (Refurbished/Rebuilt) or 'U' (Used).
Quantity—How many of this exact item are available.
Cost—The cost of one individual item listed (NOT cost*quantity). This will be a number with decimal values if needed. There is NOT a need to format the number as currency, or have a '$' sign present. (Optional Field).
List—The list price of one individual item listed (NOT list price*quantity). This will be a number with decimal values if needed. There is NOT a need to format the number as currency, or have a '$' sign present. (Optional Field).

MS Excel Format

Figure 40:
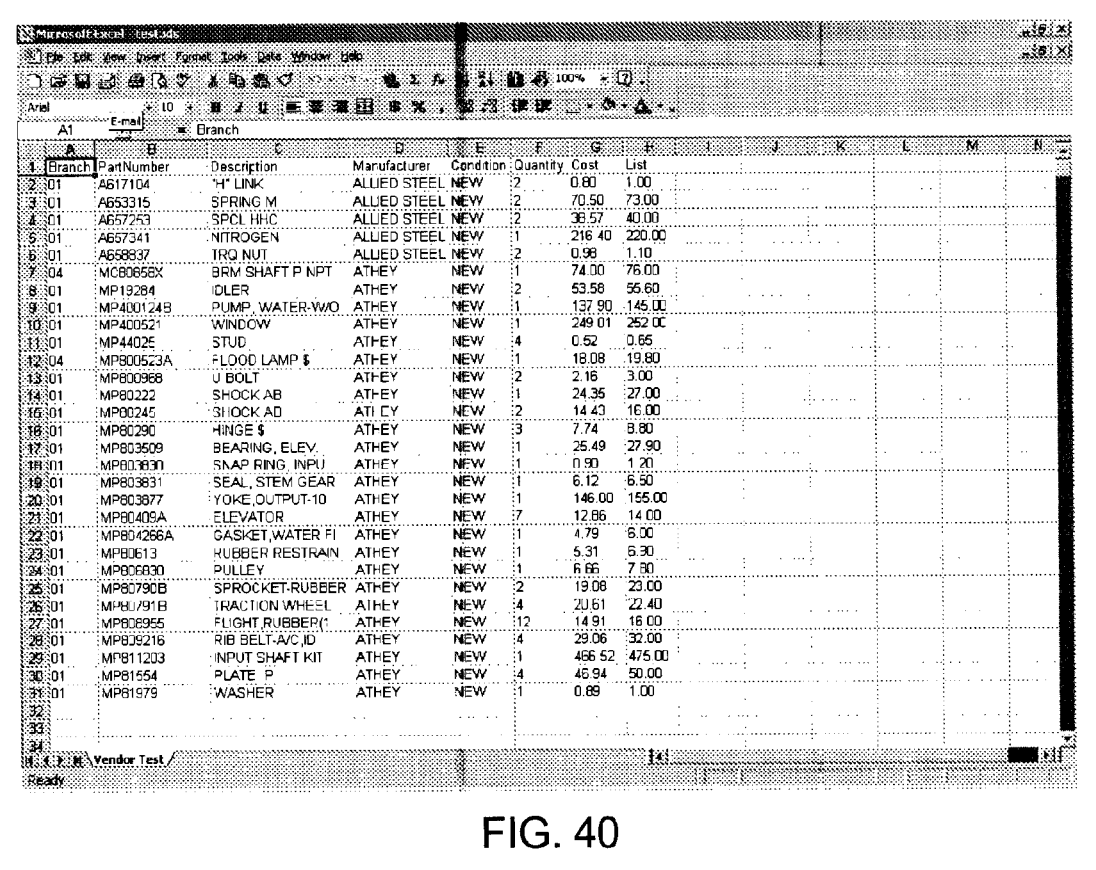

The inventory items may be listed in an MS Excel spreadsheet. The field names listed above must be named exactly as they appear and must exist in the first row as headings of the excel spreadsheet. It is crucial that the information be presented in the proper order with Branch followed by Part Number, Description, etc., ending with List. Do not put any spaces in the names. Beginning with row 2, you will enter your inventory items and continue doing so only on the first sheet. Do not include any hidden columns. Centering, bolding or otherwise formatting information is not necessary. A sample file is shown in FIG. 40 below MS Access Format The inventory items may also be stored and imported from an MS Access database. Only Access 2000 or greater is acceptable, as Access 97 databases need to be converted to a higher version of Access or this will cause problems with the automated importation process. The database will contain one table named 'tblVendorImport' with the following fields defined and populated. *Note: Be sure to name both the table and fields EXACTLY as described—no spaces!

Table: tblVendorImport
Columns
Branch—Text(30), AllowZeroLength: False, Required: False
Part Number—Text(25), AllowZeroLength: False, Required: True
Description—Text(255), AllowZeroLength: False, Required: True
Manufacturer—Text(40), AllowZeroLength: True, Required: False
Condition—Text(5), AllowZeroLength: False, Required: True
Quantity—Integer, AllowZeroLength:False, Decimal Places: Auto, Default:1, Required: True
Cost—Long Integer(4), AllowZeroLength:False, DecimalPlaces: 2, Default: 0, Required: True
List—Long Integer(4), AllowZeroLength:False, DecimalPlaces: 2, Default: 0, Required: True Text File Format The inventory items may also be placed in an ASCII text file. This will be a pipe "|" delimited file with the same fields as above, only separated by the pipe character. This file must have a filename extension of '.txt'. There is no pipe after the last field, only a carriage return. If there is no data for an optional field such as Branch, then you will have two pipes right next to each other. This is necessary so that the automated import program will no that there is no data for that field. If you leave it out completely, it will pull the next fields information into the incorrect field. Listed below is a sample of a pipe delimited text file.

01|87888444|Bearings|Allison|N|1|33|31.10
04|1012Z4611|Gasket|Allison|R|1|70|68
01|983393|Steering Column|Catapillar|U|1|134.50|130

Adding Vendor Inventory Manually

Figure 41:
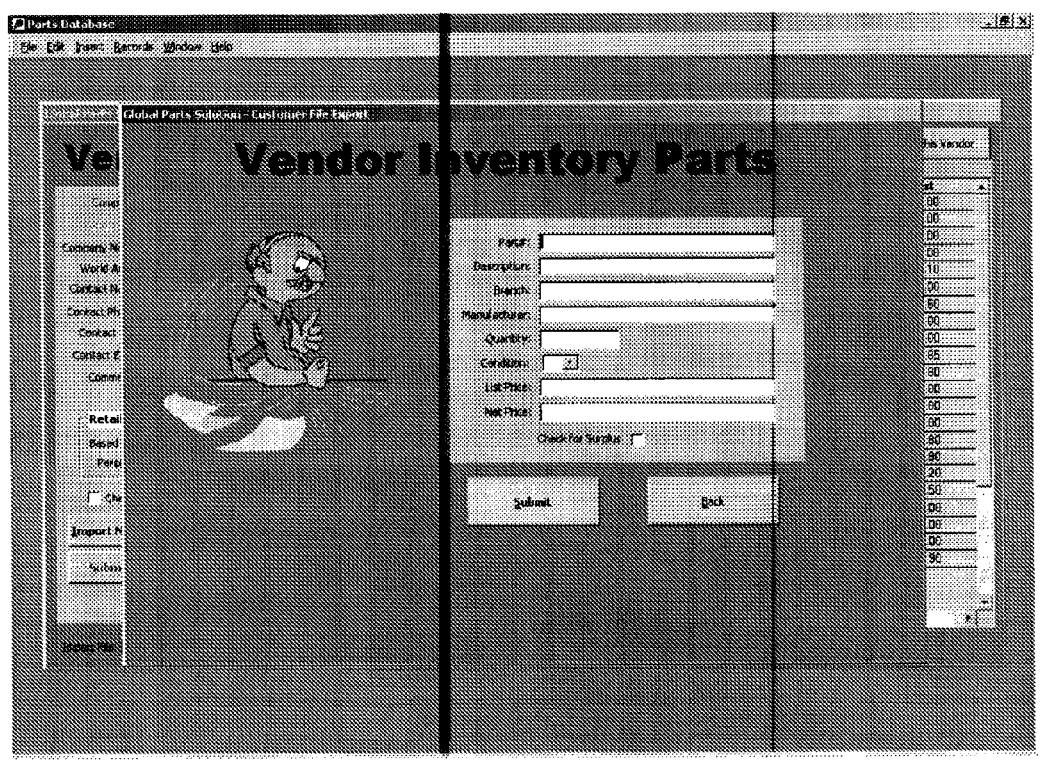

Inventory can also be added one item at a time by clicking on the Add New Inventory button on the Vendor screen. Make sure that the vendor you wish to add inventory had been selected and appears on the screen before adding any inventory. Once the button has been clicked, the screen in FIG. 41 will appear.

The following fields make up the inventory for the vendor. Enter the inventory details into each field and click on the Submit button to save your record. Click on the Back button to cancel the operation.

Branch—The name or number of your Branch.
Part Number—Unique part number of the item.
Description—Brief description of the item.
Manufacturer—The industry standard name of the manufacturer of the item. (Optional)
Condition—Either 'N' (New), 'R' (Refurbished/Rebuilt) or 'U' (Used). Select from the drop down box.
Quantity—How many of this exact item are available.
Cost—The cost of one individual item listed (NOT cost*quantity). (Optional)
List—The list price of one individual item listed (NOT list price*quantity). (Optional)

Deleting a Vendor

Click on the Delete Vendor button to delete the vendor details along with all of the vendor's inventory. A warning message will appear asking if you are sure you would like to delete the vendor.

Click on the Yes button to continue with the delete operation or click on the No button to cancel the delete operation.

Inventory Report

Figure 42:
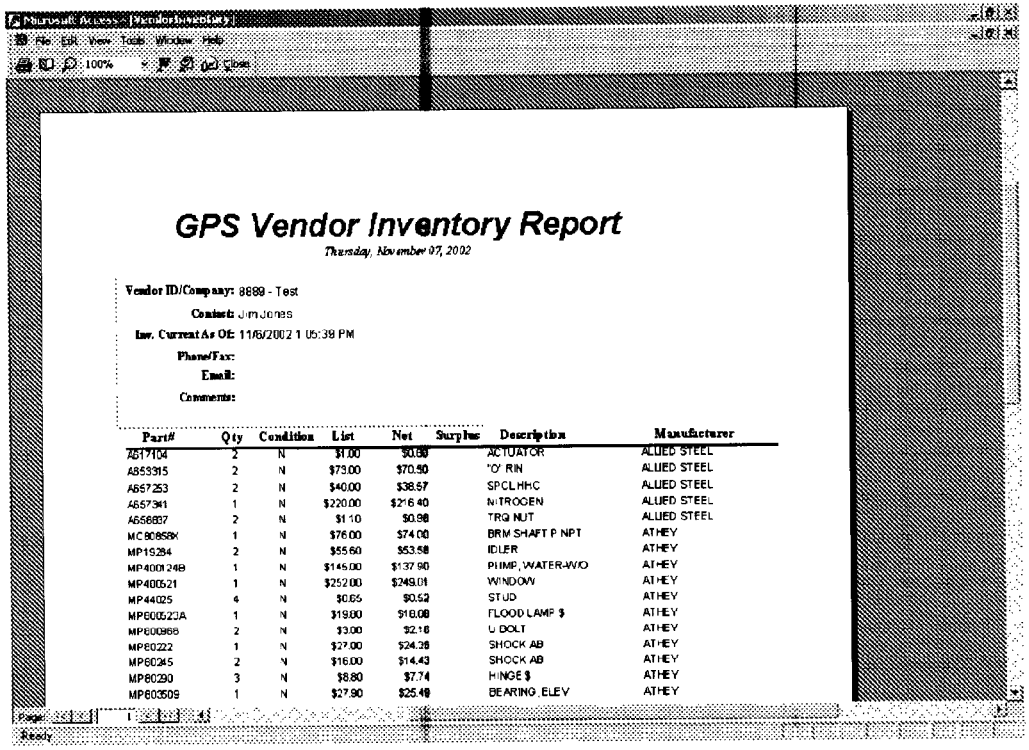

A report can be run listing all of the inventory for a vendor selected. To view or print the report make sure you have selected the vendor you would like to view the inventory from and click on the Inventory Report for this Vendor button located on the upper right side of the screen. The report shown in FIG. 42 will appear.

To print the report click on the printer icon located below the menu bar on the upper left portion of the screen. You may also change the settings of the page by clicking on the book icon, zoom in or out by clicking on the magnifying glass, set the size shown on the screen by clicking on the drop down box with the 100% title, publish the report in a MS Word document by selecting the Word icon, output the report to a Notepad text file by clicking on the notebook icon, send an email with the report as an attachment by clicking on the envelope icon, or close the report by selecting the close icon.

Deleting Inventory

There are two ways to delete inventory for a vendor. You can either delete one line of inventory at a time or all inventory listed for a vendor. To delete inventory, make sure you have selected the vendor who you would like to delete the inventory from.

Deleting One Line of Inventory

To delete one inventory line item, select the inventory line item you want to delete by clicking the record in the inventory table. The arrow to the left of the inventory table indicates which line item will be deleted. Once the line item is selected, click on the Delete button. A message will appear that will tell you that you are about to delete a record. Click on the Yes button to continue with the delete operation or on the No button to cancel the delete operation.

Deleting all Inventory for a Vendor

To delete all inventory for a vendor, click on the Delete All Inventory button located below the list of inventory. A message will appear that will tell you that you are about to delete a record. Click on the Yes button to continue with the delete operation or on the No button to cancel the delete operation.

Making Changes to Inventory

Figure 43:
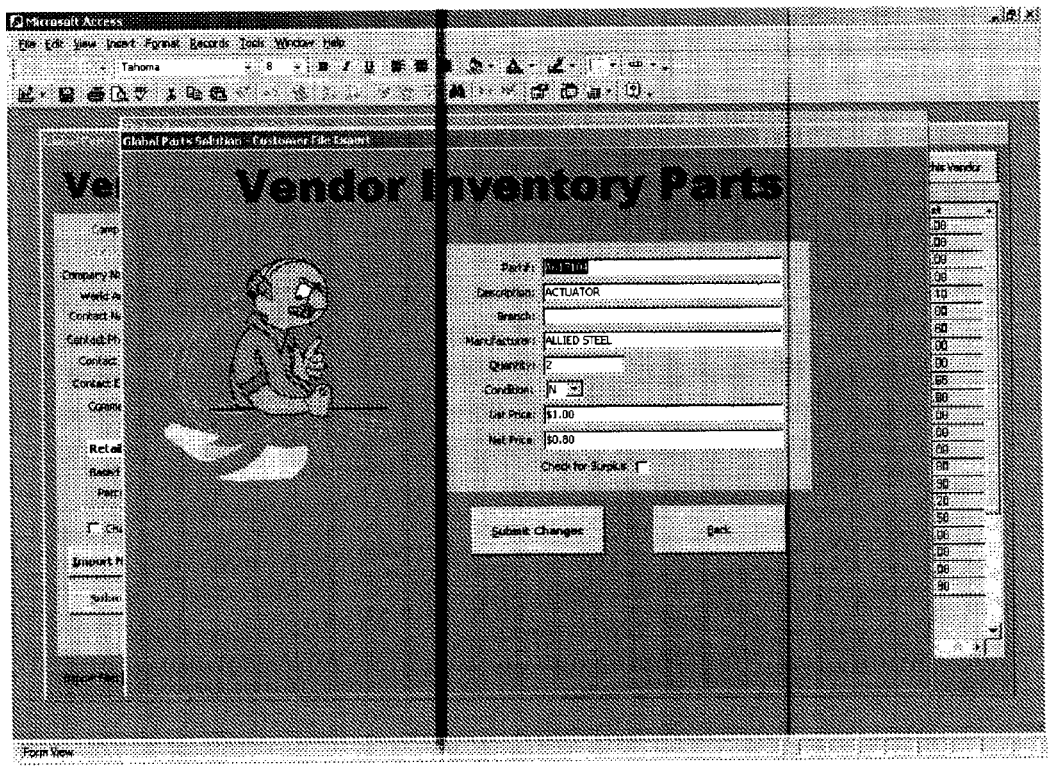

Changes may be made to existing inventory for a vendor. To change inventory, make sure you have selected the vendor who you would like to make inventory changes to. Select the inventory line item you want to make changes to in the inventory table. The arrow to the left of the inventory table indicates which line item will be changed. Once the line item is selected, double click on the arrow. A new screen shown in FIG. 43 will appear showing the information for the line item. Make any changes to the fields on the screen and click on the Submit button to save your changes. To cancel any changes, click on the Rack button. Once the changes are saved, the changes will appear in the inventory table.

Vendor Details Export

The Vendor Details Export button on the main menu will create a listing of all of the vendors in the database along with the details about the vendor. Clicking on the button will bring up a save file dialog box asking where the file will be saved. Choose the path and name of the file to create the Excel file.

Figure 44:
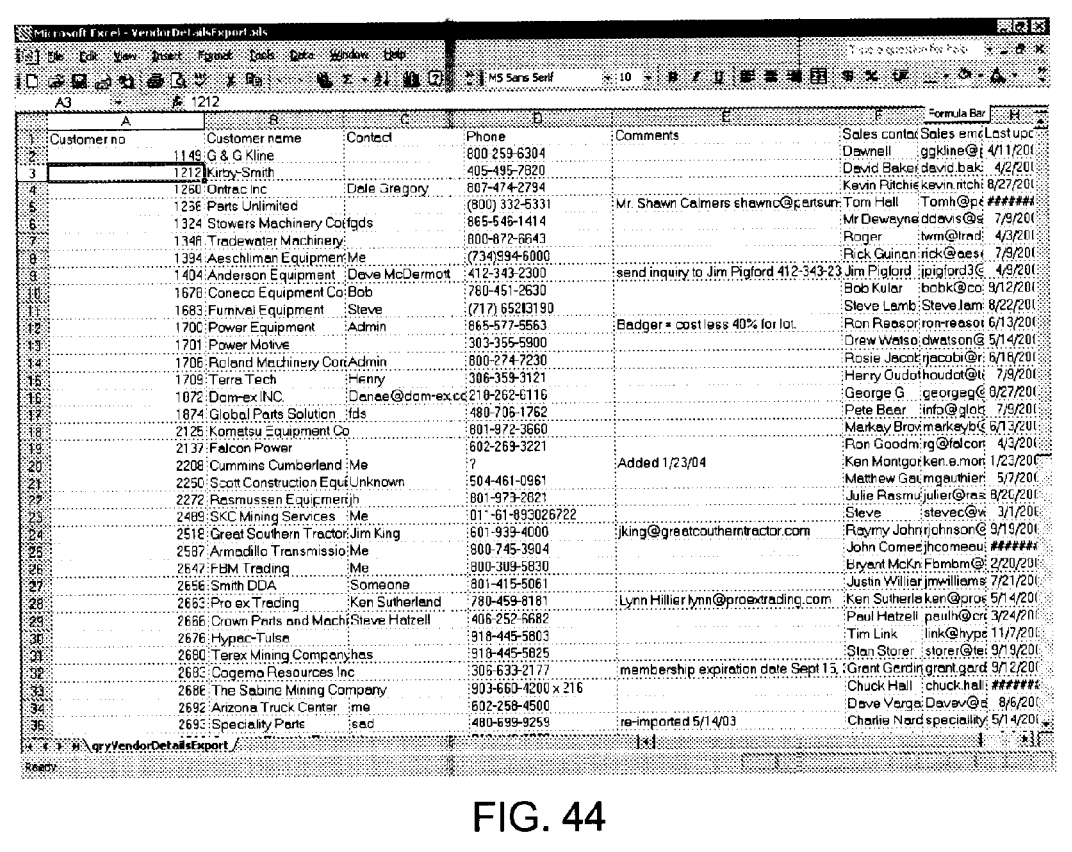

A sample of the file is shown in FIG. 44.

Search for Part

Figure 45:
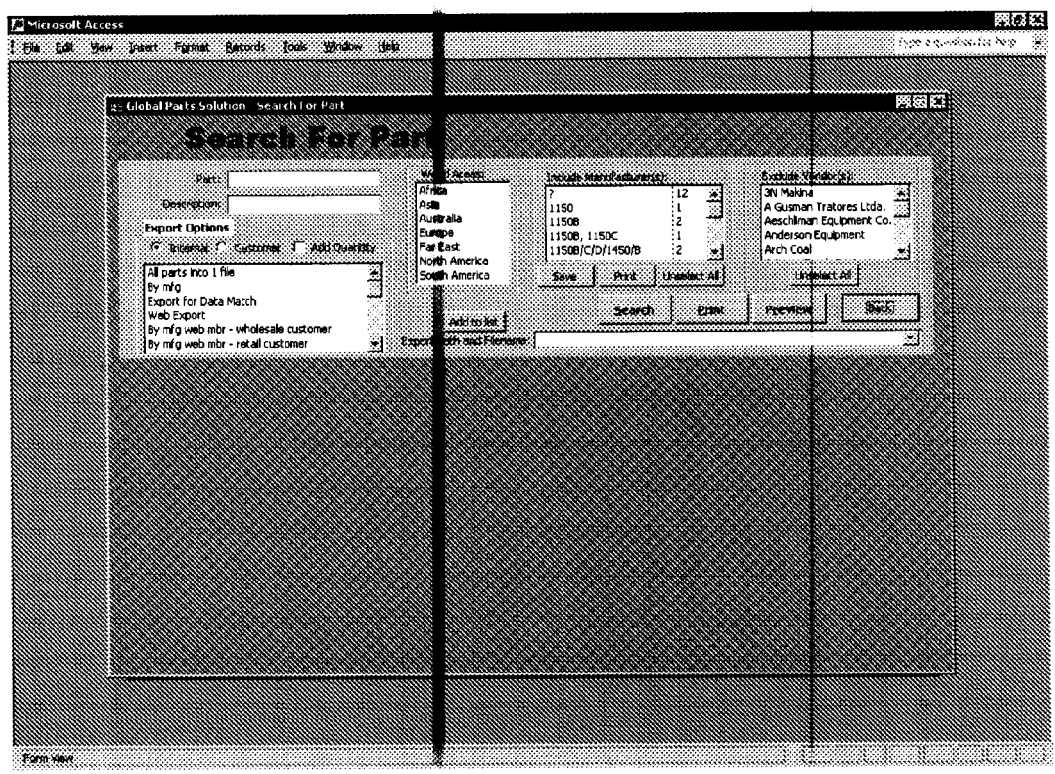

The GPS system allows you to search for existing inventory in the database based on selected criteria. You may narrow down your search by specifying a full or partial part number, description, world area, particular manufacturers, and you can also exclude specific vendors. The search results are viewable on the screen. You may also choose to preview a report of the search results or print the report. Another option available is to export the results of the search into a text delimited or excel spreadsheet depending on the type of export selected. To search for a part, enter your search criteria and click on the Search for Part button on the main screen. The screen shown in FIG. 45 will appear.

Selecting Criteria

The following types of criteria can be specified to narrow your search results.

Part Number—You can enter a full part number to return all the inventory that exists for that part number or enter a partial part number to return the part numbers in inventory that match the partial number entered. For example, if "AK" was entered as the search criteria, any part numbers beginning with "AK" will be returned. The results may include AK1002-900, AK200, AK-J909. The part number entered is not case sensitive.

Description—You can enter either a full description or a partial description to return all the inventory for the parts that match that description entered. For example, if "RET" is entered as the search criteria under description, any part numbers with a description starting with "RET" will be returned such as RETAINER, RETAINER RING, etc. The description entered is not case sensitive.

World Area—You can select one or more world areas from the list to return the part numbers that exist for that world area. If you do not select anything from the list, all of the parts will be returned regardless of what world area they are from. If you select more than one world area, the parts for all of the world areas selected will be returned. To unselect a previously selected world area, click on the world area again and it will no longer be highlighted.

Manufacturers Included—You can specify which manufacturers you would like included in your search. You can choose one or more manufacturers by clicking on the manufacturer name. If you do not select anything from the list, all of the parts will be returned regardless of the manufacturer. If you select more than one manufacturer, the parts with those manufacturers selected will be returned. To unselect a previously selected manufacturer, click on the manufacturer again and it will no longer be highlighted. The number listed next to the manufacturer is the number of inventory items in the database for that manufacturer.

Vendors Excluded—You can also limit your search by excluding certain vendors from your result. You can exclude one or more vendors by clicking on the vendor name. If you do not select a vendor from the list, all of the parts will be returned regardless of the vendor. If you select more than one of the vendors, the parts that are not owned by those vendors selected will be returned. To unselect a previously selected vendor, click on the vendor again and it will no longer be highlighted. Note that this list works differently from the world area and manufacturer lists since it does not return the parts from the vendors that are selected.

You may enter any combination of the criteria listed above. Your results will vary depending on what criteria you specify to search on. For example, if you entered a partial part number of "AK" and selected Africa as your World Area, only part numbers that begin with an "AK" AND that are located in Africa will be returned. The search criteria is always based on an AND result and not an OR unless you specify more than one item in a list box. That is, if you selected Africa and North America from the World Areas list, you would be returned parts that are from either Africa OR North America.

Searching

Figures 46, 47:
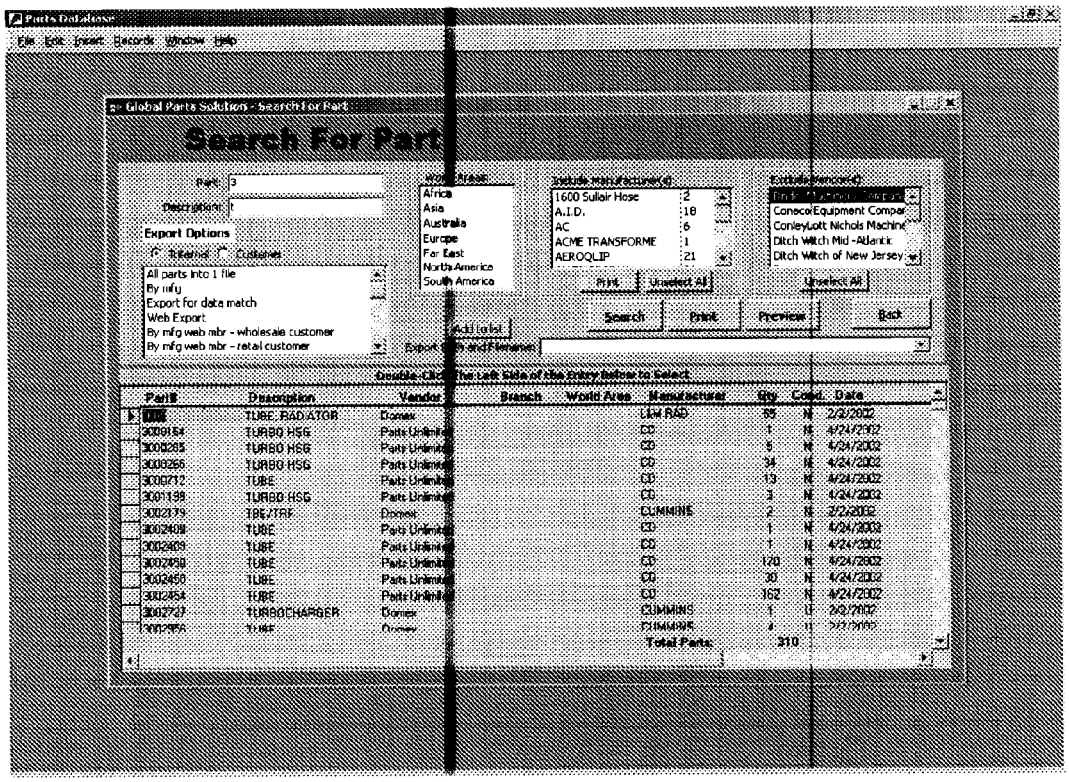

Once all of the criteria are entered, click on the Search button to return all of the part numbers in inventory that match the search criteria. All of the parts in inventory will be returned if no search criteria are entered. The screen in FIG. 46 shows an example of the part numbers that that begin with a "3" and have a description beginning with a "t" and that are not from the Binder Machinery Company. The number of part numbers returned is shown below the list of inventory. In this example, 310 part numbers were returned.

Export Options

There are 12 different types of export options. Each export can also have 2 different formats; an Internal format, or a Customer format. Only inventory items matching the search criteria will be included in the exports. Do not specify any criteria in order to get a full listing of inventory included in the export. Each type of format will be shown in detail below.

Before exporting to a file, you must first enter a path and name for the file that will be created.

Fill in the field next to the label Export Path and Filename with the path and filename of the file that will be exported. All files are created as excel spreadsheets and will need an extension of '.xls' except for the Web export. The Web export is a text delimited file and will need an extension of '.txt'. If you do not specify an extension of '.txt' for the Web Export, the export will fail.

To save a path and filename so that you do not have to type it in every time, click on the Add to List button above the label Export Path and Filename after entering the path and filename. Choose a saved path and filename from the list by clicking on the down arrow next to the field.

Once the path and filename are entered, choose either the Customer or Internal format and double click on the type of export you want to save the file to.

Add Parts into 1 File

This format is saved into an MS Excel format and includes the inventory of the search into one file listing all the parts. If the number of parts exceeds the limit of rows for Excel, which is 65535 rows, another file will be created with a '2' added to the filename. More files will be created if needed based on the number of records returned, each with an increment added to the filename. The internal format contains detail information regarding the company and branch for the part while the customer format does not show company and branch information and instead shows the total quantity by part number. The file will be located in the path specified with the filename specified.

Internal Format Example

The Internal format includes the following columns: 1) Part Number, 2) Description 3) Company, 4) Branch, 5) Manufacturer, 6) Quantity, 7) Condition, 8) Orig Date, 9) WorldAreaDesc FIG. 47 is a sample spreadsheet for this format.

Customer Format Example

Figures 48, 49:
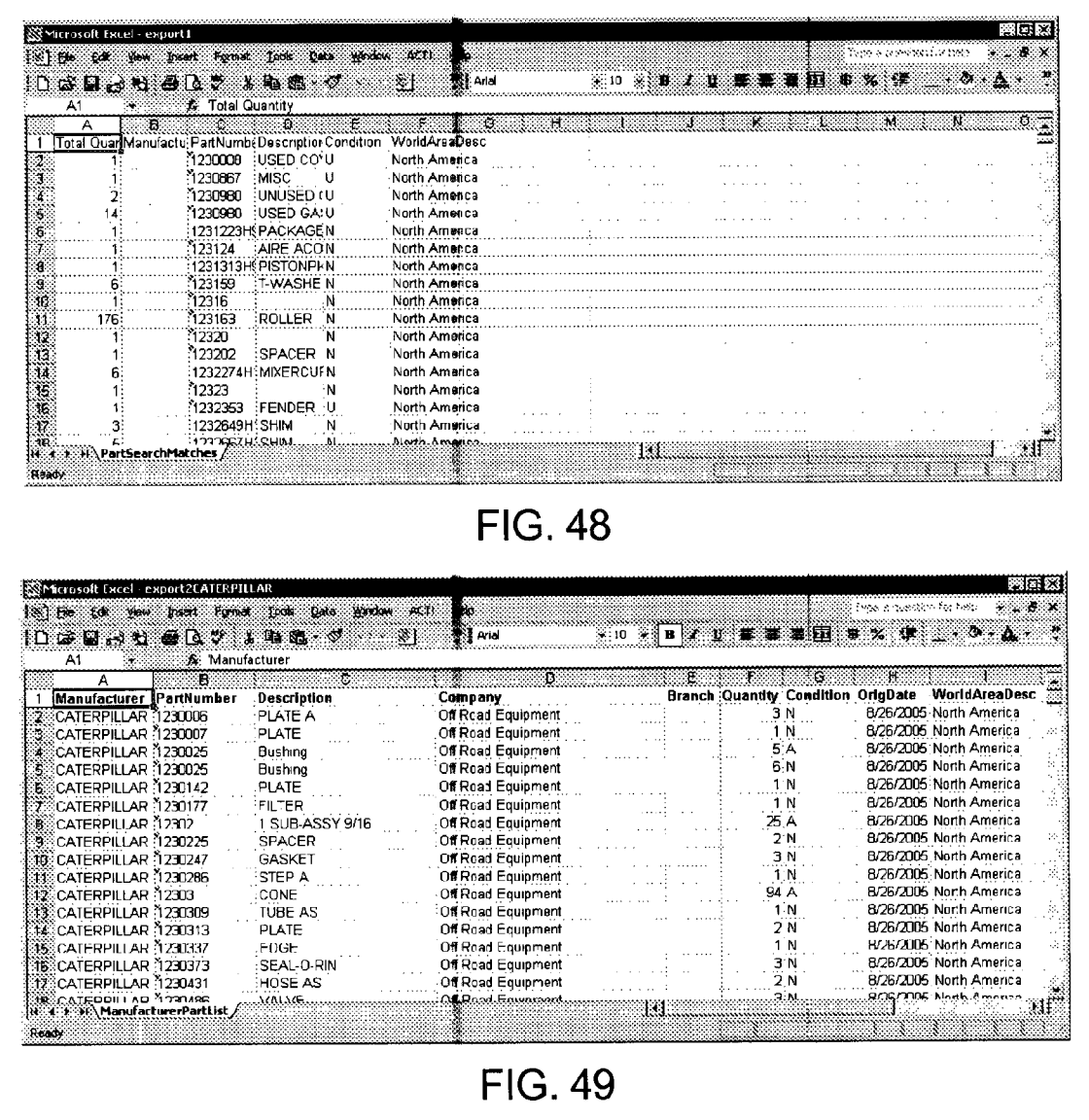

The Customer format includes the following columns: 1) Total Quantity, 2) Manufacturer, 3) Part Number, 4) Description, 5) Condition, 6) WorldAreaDesc FIG. 48 is a sample spreadsheet for this format.

By Manufacturer

This format is saved into an MS Excel format and includes the inventory of the search into multiple files by manufacturer listing all the parts for that manufacturer. There will be one file for each manufacturer included in the results of the search. The internal format contains detail information regarding the company and branch for the part while the customer format does not show company and branch information and instead shows the total quantity by part number. The files will be located in the path specified with the filename specified followed with the manufacturer name.

Internal Format Example

The Internal format includes the following columns: 1) Manufacturer, 2) Part Number, 3) Description, 4) Company, 5) Branch, 6) Quantity, 7) Condition, 8) Orig Date, 9) WorldAreaDesc FIG. 49 is a sample spreadsheet for this format.

Customer Format Example

Figures 50, 51:
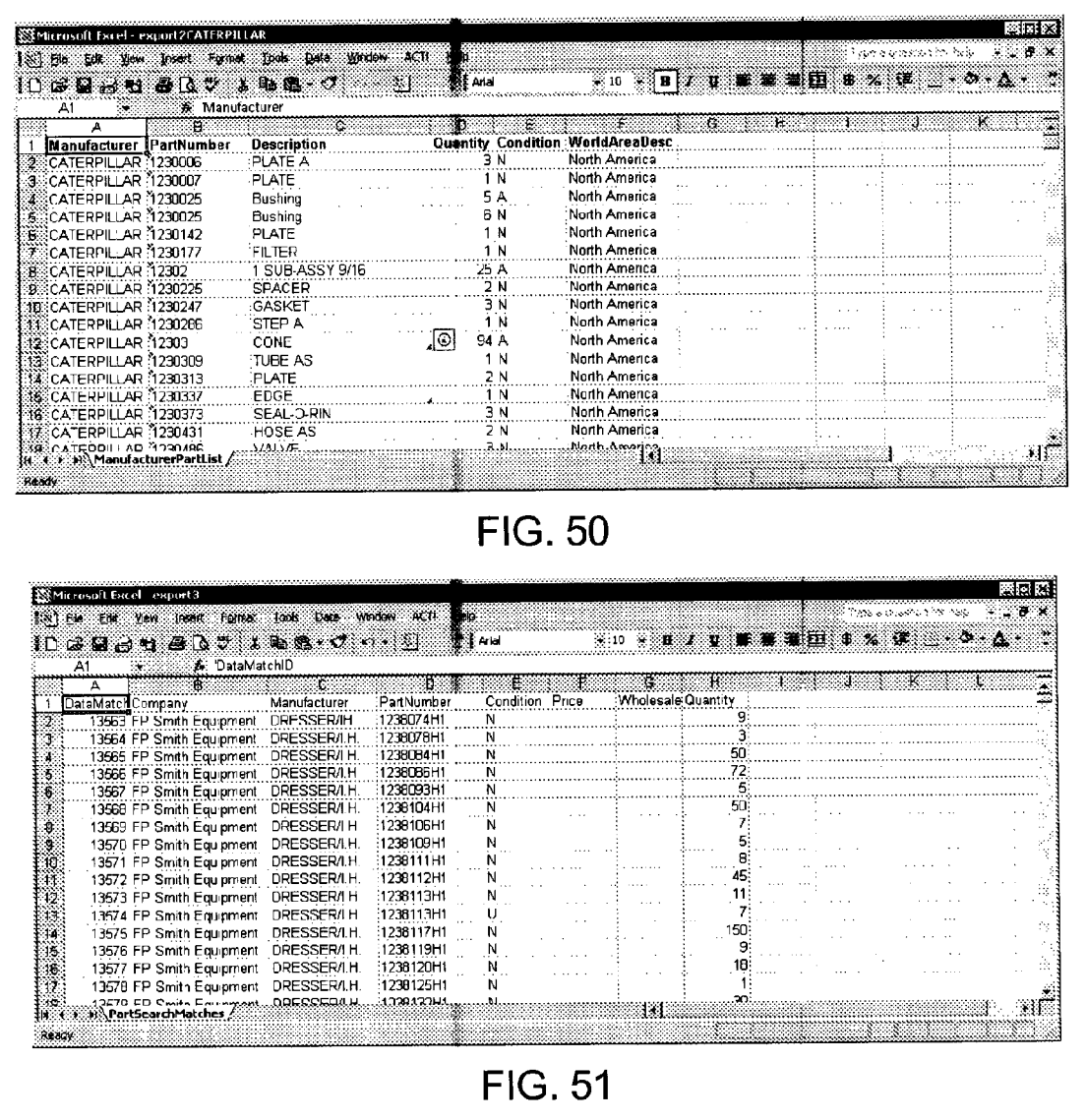

The Customer format includes the following columns: 1) Manufacturer, 2) Part Number, 3) Description, 4) Quantity, 5) Condition, 6) WorldAreaDesc FIG. 50 is a sample spreadsheet for this format.

sExport for Data Match

This format is saved into an MS Excel format and includes the inventory of the search into one file listing all the parts. If the number of parts exceeds the limit of rows for Excel, which is 65535 rows, another file will be created with a '2' added to the filename. More files will be created if needed based on the number of records returned, each with an increment added to the filename. The internal and customer format are identical. This file is formatted to be used as an import into the GPS Model Match software.

The Internal and Customer format includes the following columns: 1) DataMatchID, 2) Company, 3) Manufacturer, 4) Part Number, 5) Condition, 6) Price, 7) WholesalePrice, 8) Quantity FIG. 51 is a sample spreadsheet for this format.

Web Export

This format is saved into a text delimited file and includes the inventory into one file listing the parts based on the search. The fields are delimited by a tab character. The filename for this export must be '.txt' or the export will fail. The internal and customer format are identical. This file is formatted to be used for the GPS on-line Web application.

Figures 52, 53:
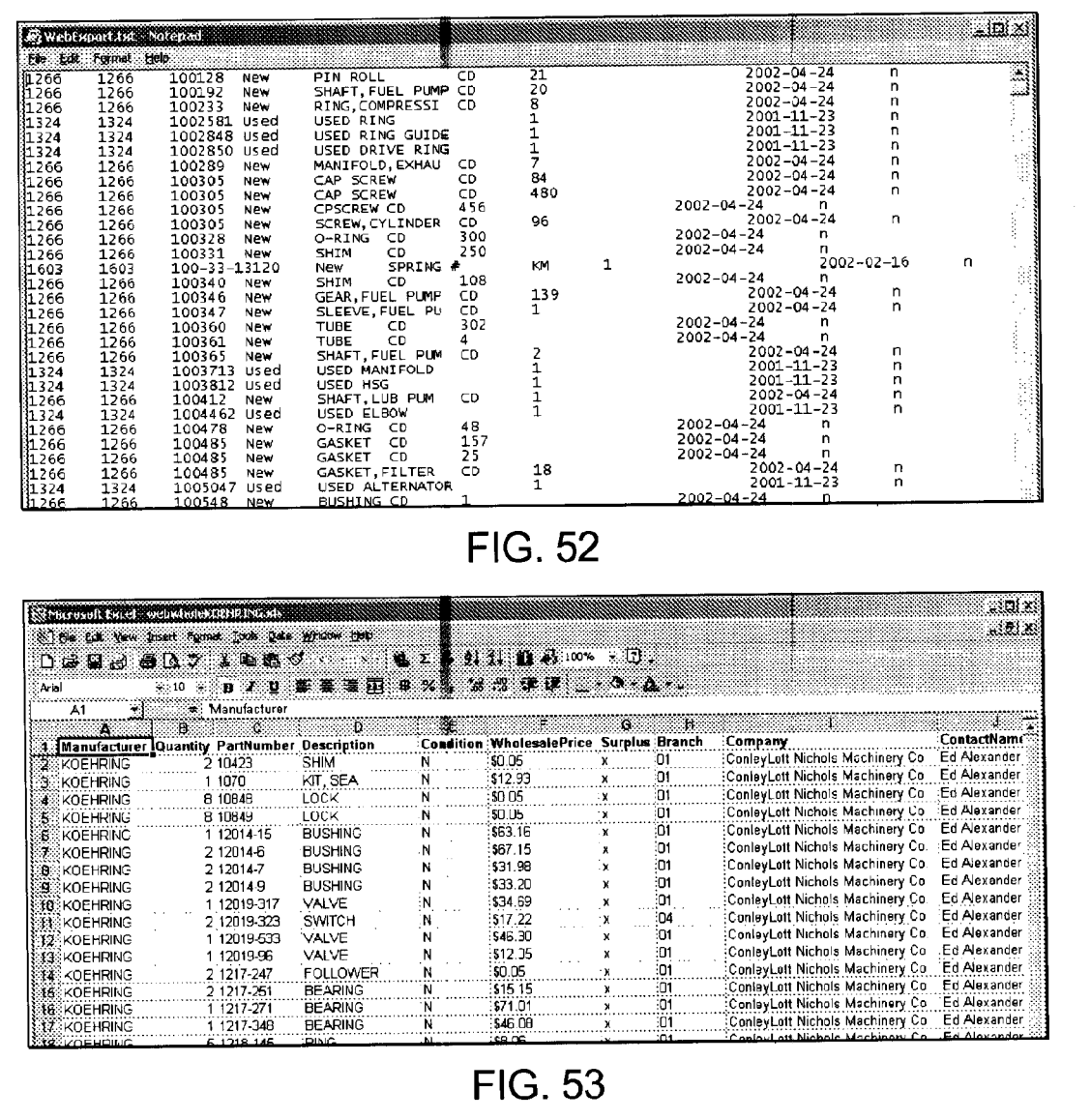

The Internal and Customer format includes the following columns: 1) VendorNo—Vendor # if member, GPS Vendor # if not member, 2) RVendorNo—Vendor #, 3) Part No, 4) Condition—'New', Used', or 'Rebuilt', 5) Description, 6) MfgName, 7) Quantity, 8) Wholesale, 9) Retail, 10) DateAdded, 11) Surplus—'y' for Yes, for No, 12) WorldAreaDesc FIG. 52 is a sample text delimited file for this format.

By Mfg Web Mbr—Wholesale Customer

This format is saved into an MS Excel format and includes only parts that are surplus. Parts that are not surplus and that are part of the search results will not be included in the files. The price shown in this export reflects the wholesale price. This export is for members so that all contact information regarding the vendor is shown. The surplus inventory will be saved into multiple files by manufacturer listing only surplus parts. There will be one file for each manufacturer included in the results of the search. There must be at least 25 or more surplus parts for the manufacturer in order for a file to be created for the manufacturer. Manufacturers with less than 25 surplus parts will be skipped. The files will be located in the path specified with the filename specified followed with the manufacturer name.

The Internal and Customer format are identical. The format includes the following columns: 1) Manufacturer, 2) Quantity, 3) Part Number, 4) Description, 5) Condition, 6) WholesalePrice, 7) Surplus, 8) Branch, 9) Company, 10) ContactName, 11) ContactPhone, 12) ContactFax, 13) ContactEmail, 14) WorldAreaDesc.

FIG. 53 is a sample spreadsheet for this format.

By Manufacturer Web Member—Retail Customer

This format is saved into an MS Excel format and includes all parts that are part of the search results. This will include both surplus and non surplus parts. The price shown in this export reflects the retail price. This export is for members so that all contact information regarding the vendor is shown. The inventory will be saved into multiple files by manufacturer listing all parts. There will be one file for each manufacturer included in the results of the search. There must be at least 25 or more parts for the manufacturer in order for a file to be created for the manufacturer. Manufacturers with less than 25 parts will be skipped. The files will be located in the path specified with the filename specified followed with the manufacturer name.

Figures 54, 55:
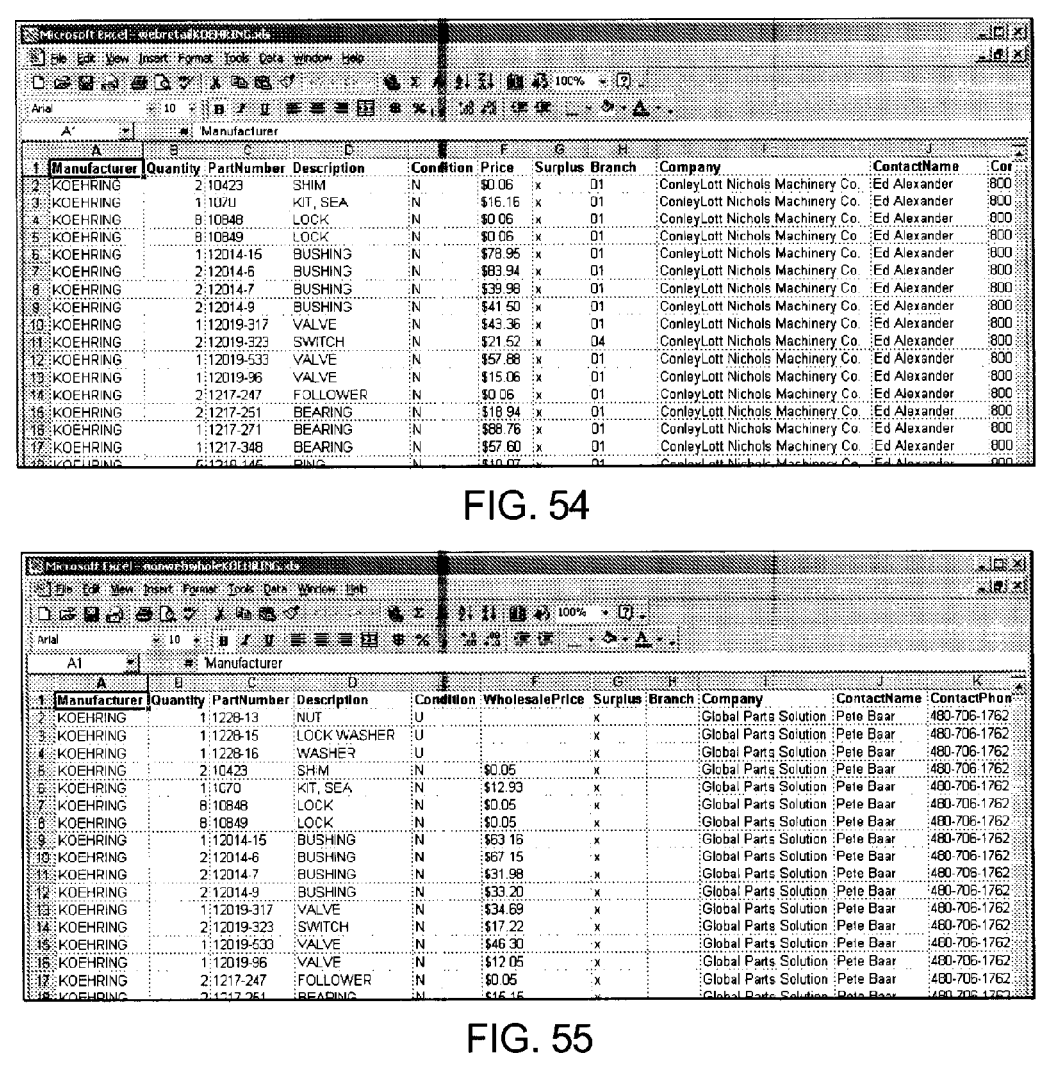

The Internal and Customer format are identical. The format includes the following columns: 1) Manufacturer, 2) Quantity, 3) Part Number, 4) Description, 5) Condition, 6) Price, 7) Surplus, 8) Branch, 9) Company, 10) ContactName, 11) ContactPhone, 12) ContactFax, 13) ContactEmail, 14) WorldAreaDesc FIG. 54 is a sample spreadsheet for this format.

By Manufacturer Non-Web Member—Wholesale Customer

This format is saved into an MS Excel format and includes only parts that are surplus. Parts that are not surplus and that are part of the search results will not be included in the files. The price shown in this export reflects the wholesale price. This export is for non members so that contact information regarding the vendor is shown only if the vendor is a member otherwise GPS contact information will be shown. The surplus inventory will be saved into multiple files by manufacturer listing only surplus parts. There will be one file for each manufacturer included in the results of the search. There must be at least 25 or more surplus parts for the manufacturer in order for a file to be created for the manufacturer. Manufacturers with less than 25 surplus parts will be skipped. The files will be located in the path specified with the filename specified followed with the manufacturer name.

The Internal and Customer format are identical. The format includes the following columns: 1) Manufacturer, 2) Quantity, 3) Part Number, 4) Description, 5) Condition, 6) WholesalePrice, 7) Surplus, 8) Branch, 9) Company, 10) ContactName, 11) ContactPhone, 12) ContactFax, 13) ContactEmail, 14) WorldAreaDesc FIG. 55 is a sample spreadsheet for this format.

By Manufacturer Non-Web Member—Retail Customer

This format is saved into an MS Excel format and includes all parts that are part of the search results. This will include both surplus and non surplus parts. The price shown in this export reflects the retail price. This export is for non members so that contact information regarding the vendor is shown only if the vendor is a member otherwise GPS contact information will be shown. The inventory will be saved into multiple files by manufacturer listing all parts. There will be one file for each manufacturer included in the results of the search. There must be at least 25 or more parts for the manufacturer in order for a file to be created for the manufacturer. Manufacturers with less than 25 parts will be skipped. The files will be located in the path specified with the filename specified followed with the manufacturer name.

The Internal and Customer format are identical. The format includes the following columns: 1) Manufacturer, 2) Quantity, 3) Part Number, 4) Description, 5) Condition, 6) Price, 7) Surplus, 8) Branch, 9) Company, 10) ContactName, 11) ContactPhone, 12) ContactFax, 13) ContactEmail, 14) WorldAreaDesc FIG. 56 is a sample spreadsheet for this format.

By Description Web Member—Wholesale Customer

This format is saved into an MS Excel format and includes only parts that are surplus. Parts that are not surplus and that are part of the search results will not be included in the files. The price shown in this export reflects the wholesale price. This export is for members so that all contact information regarding the vendor is shown. The surplus inventory will be saved into multiple files by part description listing only surplus parts. There will be one file for each part description included in the results of the search. There must be at least 25 or more surplus parts with the same description in order for a file to be created for the part description. Part descriptions with less than 25 surplus parts will be skipped. The descriptions that have been added in the Manage Part Exclusions section will also be skipped. The files will be located in the path specified with the filename specified followed with the part description name.

The Internal and Customer format are identical. The format includes the following columns: 1) Manufacturer, 2) Quantity, 3) Part Number, 4) Description, 5) Condition, 6) WholesalePrice, 7) Surplus, 8) Branch, 9) Company, 10) ContactName, 11) ContactPhone, 12) ContactFax, 13) ContactEmail, 14) WorldAreaDesc FIG. 57 is a sample spreadsheet for this format.

By Description Web Member—Retail Customer

This format is saved into an MS Excel format and includes all parts that are part of the search results. This will include both surplus and non surplus parts. The price shown in this export reflects the retail price. This export is for members so that all contact information regarding the vendor is shown. The inventory will be saved into multiple files by part description listing all parts. There will be one file for each part description included in the results of the search. There must be at least 25 or more parts with the same description in order for a file to be created for the part description. Descriptions with less than 25 parts will be skipped. The descriptions that have been added in the Manage Part Exclusions section will also be skipped. The files will be located in the path specified with the filename specified followed with the part description.

Figures 58, 59:
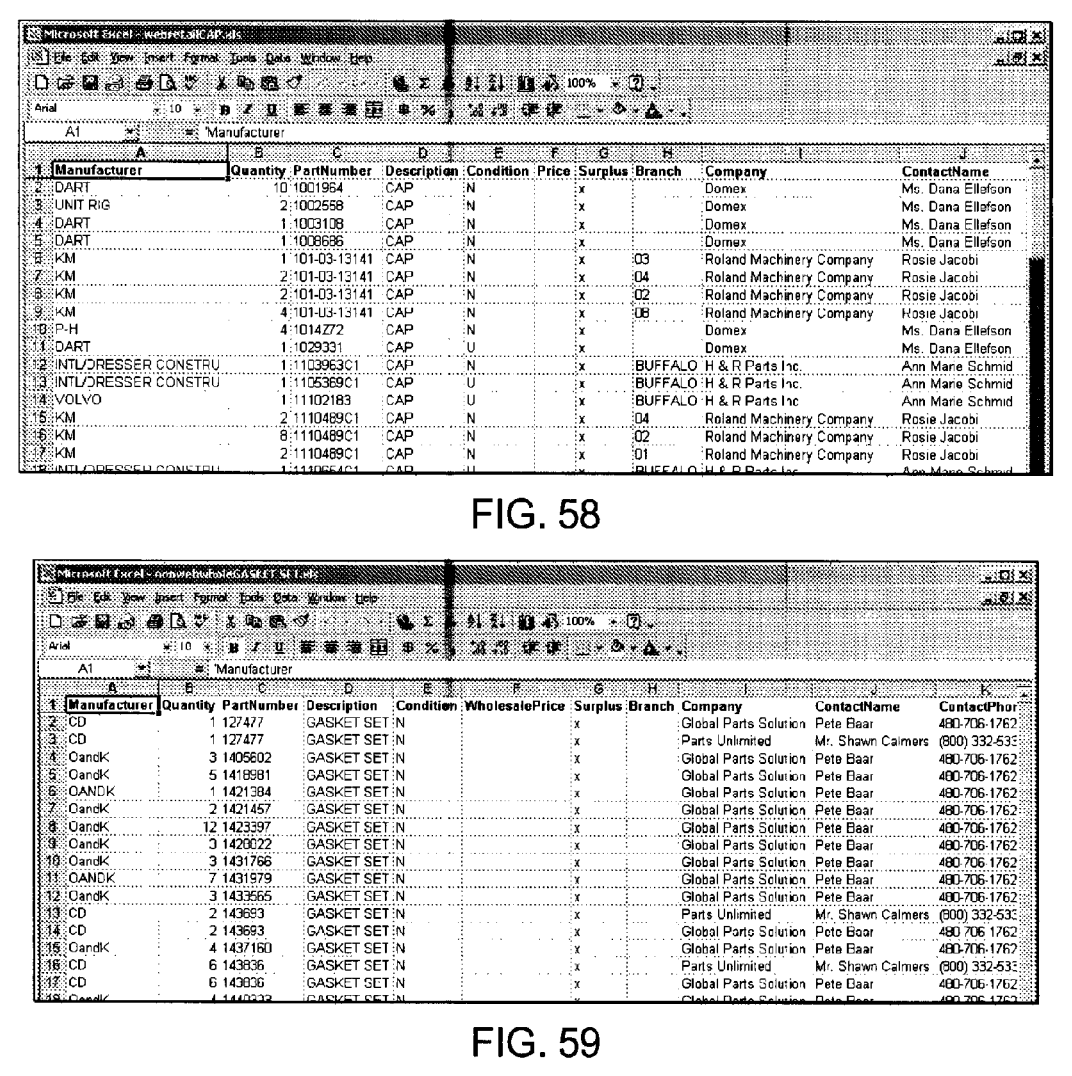

The Internal and Customer format are identical. The format includes the following columns: 1) Manufacturer, 2) Quantity, 3) Part Number, 4) Description, 5) Condition, 6) Price, 7) Surplus, 8) Branch, 9) Company, 10) ContactName, 11) ContactPhone, 12) ContactFax, 13) ContactEmail, 14) WorldAreaDesc FIG. 58 is a sample spreadsheet for this format.

By Description Non-Web Member—Wholesale Customer

This format is saved into an MS Excel format and includes only parts that are surplus. Parts that are not surplus and that are part of the search results will not be included in the files. The price shown in this export reflects the wholesale price. This export is for non members so that contact information regarding the vendor is shown only if the vendor is a member otherwise GPS contact information will be shown. The surplus inventory will be saved into multiple files by part description listing only surplus parts. There will be one file for each description included in the results of the search. There must be at least 25 or more surplus parts with the same part description in order for a file to be created for the description. Descriptions with less than 25 surplus parts will be skipped. The descriptions that have been added in the Manage Part Exclusions section will also be skipped. The files will be located in the path specified with the filename specified followed with the part description.

The Internal and Customer format are identical. The format includes the following columns: 1) Manufacturer, 2) Quantity, 3) Part Number, 4) Description, 5) Condition, 6) Price, 7) Surplus, 8) Branch, 9) Company, 10) ContactName, 11) ContactPhone, 12) ContactFax, 13) ContactEmail, 14) WorldAreaDesc FIG. 59 is a sample spreadsheet for this format.

By Description Non-Web Member—Retail Customer

This format is saved into an MS Excel format and includes all parts that are part of the search results. This will include both surplus and non surplus parts. The price shown in this export reflects the retail price. This export is for non members so that contact information regarding the vendor is shown only if the vendor is a member otherwise GPS contact information will be shown. The inventory will be saved into multiple files by part description listing all parts. There will be one file for each part description included in the results of the search. There must be at least 25 or more parts with the same description in order for a file to be created for the part description. Descriptions with less than 25 parts will be skipped. The descriptions that have been added in the Manage Part Exclusions section will also be skipped. The files will be located in the path specified with the filename specified followed with the part description.

Figures 60, 61:
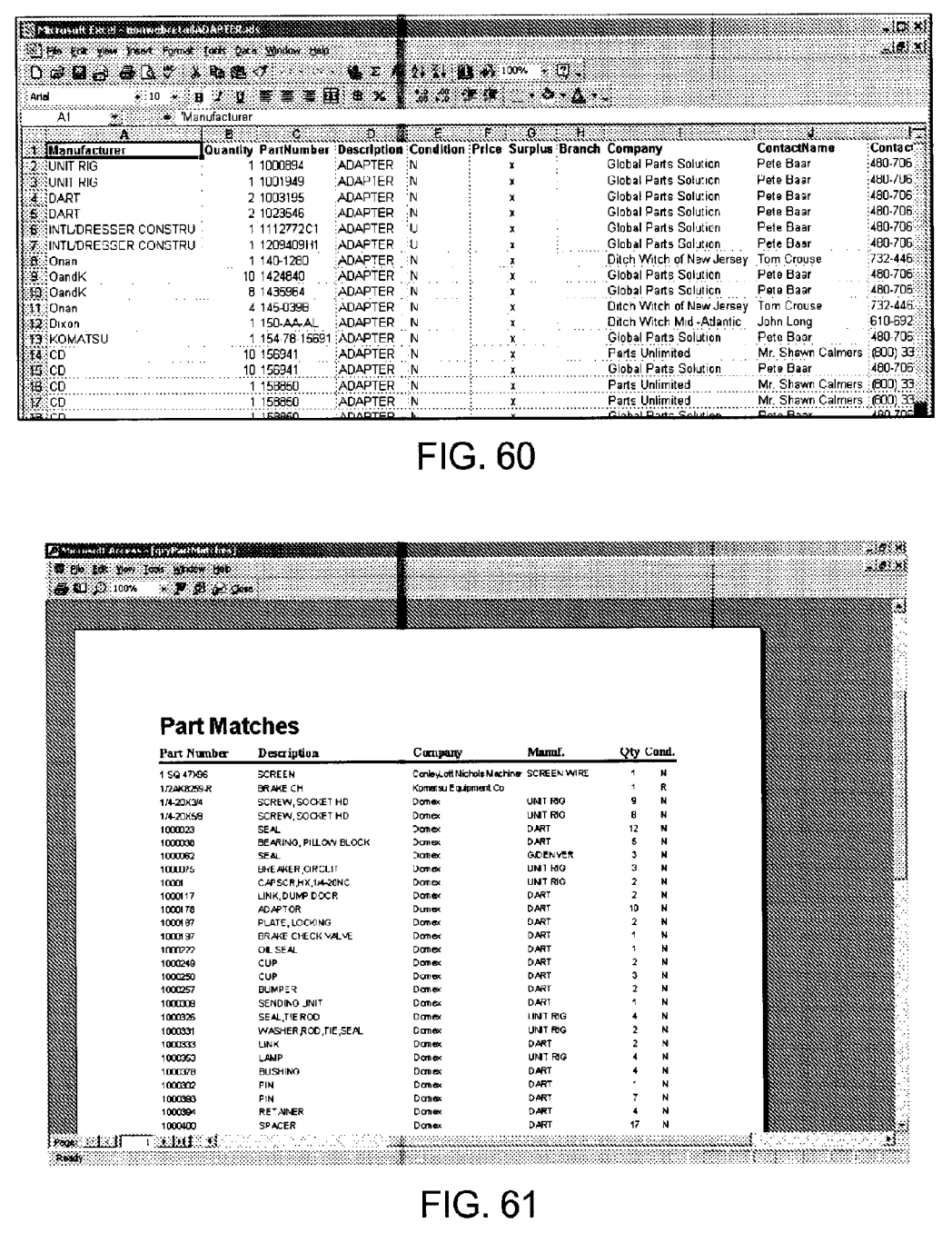

The Internal and Customer format are identical. The format includes the following columns: 1) Manufacturer, 2) Quantity, 3) Part Number, 4) Description, 5) Condition, 6) Price, 7) Surplus, 8) Branch, 9) Company, 10) ContactName, 11) ContactPhone, 12) ContactFax, 13) ContactEmail, 14) WorldAreaDesc FIG. 60 is a sample spreadsheet for this format.

Reports

There are 2 reports that can be printed from the Search for Part screen. The Inventory report is a report listing the inventory based on the criteria entered. Click on the Preview button to view the report or click on the Print button to print the report. The List of Manufacturers report lists all of the manufacturers that exist in the database along with how many inventory items exist for each manufacturer. This report disregards any search criteria entered and instead reflects all of the inventory in the database.

Inventory Report

The Inventory report includes a listing of the inventory based on the criteria entered. Click on the Preview button to view the report or click on the Print button to print the report. The report consists of the following fields: Part Number, Description, Company, Manufacturer, Quantity, and Condition. A sample report is shown in FIG. 61.

Printing a List of Manufacturers

Figure 62:
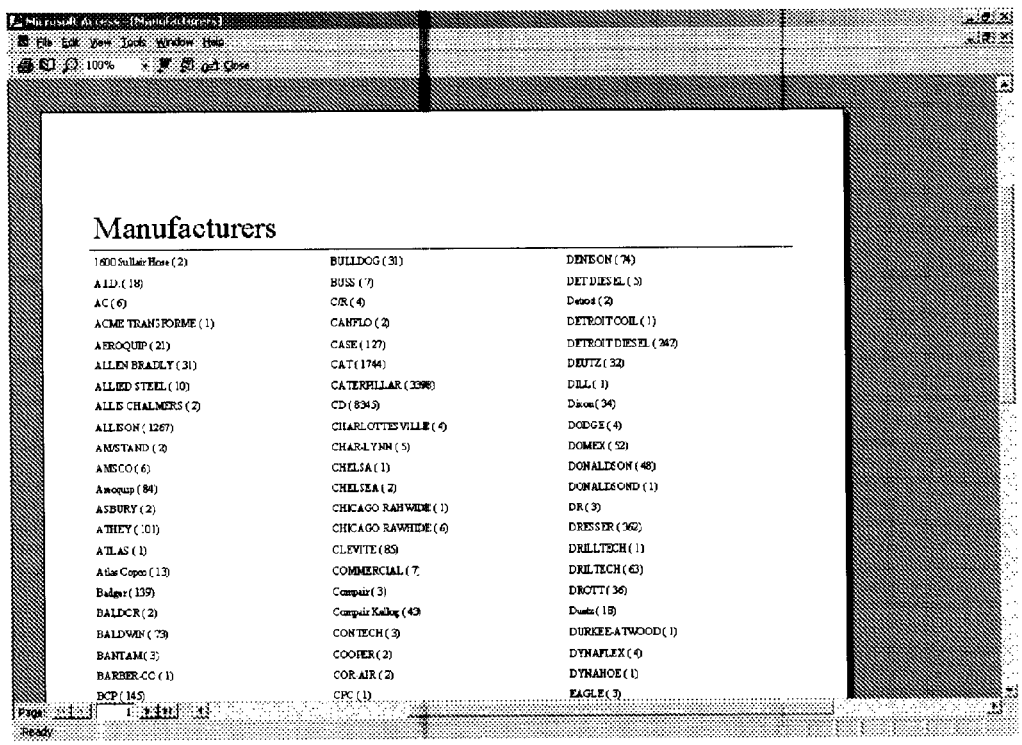

Click on the Print button located under the Include Manufacturer selection criteria to preview a list of manufacturers along with how many inventory items exist for that manufacturer. A sample report is shown in FIG. 62.

To print the report click on the printer icon located below the menu bar on the upper left portion of the screen. You may also change the settings of the page by clicking on the book icon, zoom in or out by clicking on the magnifying glass, set the size shown on the screen by clicking on the drop down box with the 100% title, publish the report in a MS Word document by selecting the Word icon, output the report to a Notepad text file by clicking on the notebook icon, send an email with the report as an attachment by clicking on the envelope icon, or close the report by selecting the close icon.

Gold Mine Matches

Figure 63:
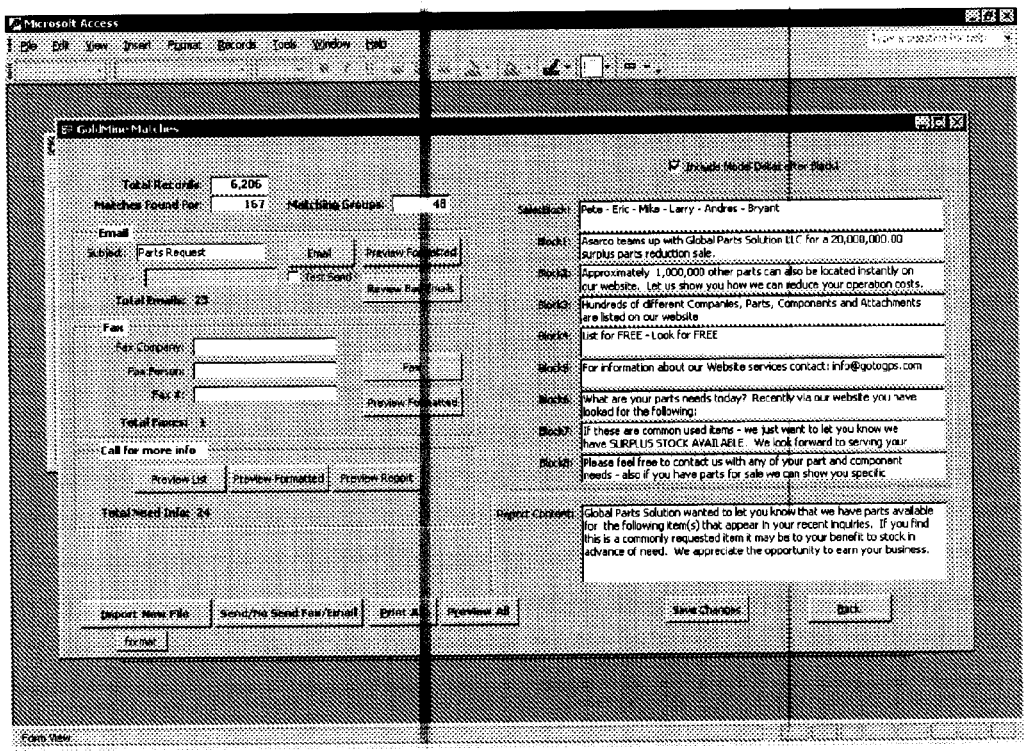

The Gold Mine Matches screen shown in FIG. 63 is used to find matches in inventory against imported gold mine data requests. The output will consist of letters that will show the parts requested from a particular company that have matches in inventory. The letters can be faxed, emailed, or printed depending on the information that is provided in the gold mine request.

Importing Gold Mine File

Before matching against inventory, the gold mine file will need to be imported. The gold mine file will be generated from the Model Match software by clicking on the Export GM button on the main menu. The file that has been exported from the Model Match software can be imported into the Surplus software clicking on the Import New File button and selecting the file. The file that will be imported will be in a text format that is pipe delimited. The format of the file to be imported can be viewed by clicking on the format button located below the Import New File button. Once the file is imported, the Total Records, Matches Found For, and Matching Groups fields will be filled in.

Formatting the Output

The Report Content field will contain the message that will appear on all of the letters generated. To edit the message, click in the field and make changes then click on the Save Changes button to save the changes.

The SalesBlock and Block 1-8 located on the left side of the screen will contain the information that is found on the formatted email messages and faxes. To edit the information in these blocks, click in the field and make changes then click on the Save Changes button to save the changes.

To Preview the entire list of gold mine requests with matching parts, click on the Preview All button located on the bottom of the screen or click on the Print All button to print each letter.

Notifying the Vendors

There are three ways to send the letter—email, fax or print and mail. The Email section of the screen contains all gold mine matching requests that have provided an email. The letters can be sent by clicking on the Email button. To preview what will be sent, click on the Preview Formatted button. The Subject field contains what will appear in the subject line of the email. Each email will be sent in html format to the email listed in the gold mine group. To test the email function before actually sending to the real email addresses, check the box next to Test Email and fill in the email address where all of the emails will get sent to. This is a way to review the actually emails before sending them. To review any bad email addresses, click on the Review Bad Emails button. Make sure to change any of the bad email addresses in the gold mine data before clicking on the Email button.

The Fax section of the screen contains all gold mine matching requests that have not provided an email address but have provided a fax number. These letters must be faxed one at a time by entering the fax company, person and phone number then clicking on the Fax button. To preview the letter to be faxed click on the Preview Formatted button.

Figure 64:
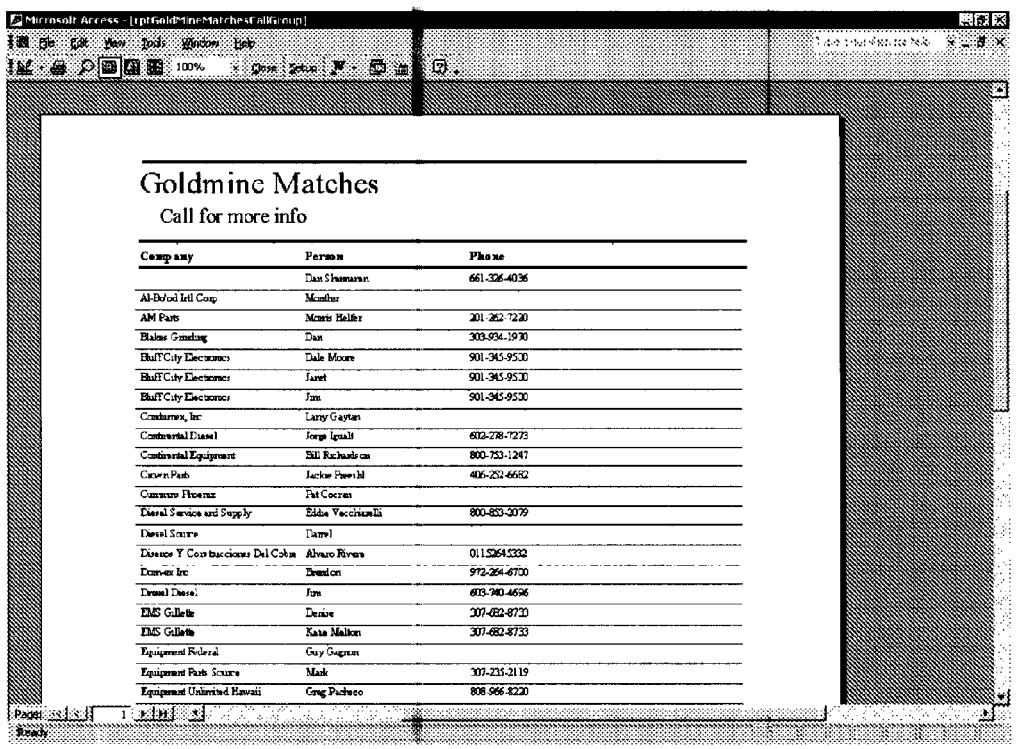

The final way to send the gold mine matching requests is to print out the letter. The Call For More Info section on the screen contains all the requests that have not provided an email address or a fax number. These remaining letters can be printed and sent to the proper address if known or called to find out more information. To preview the list of requests that don't have an email or fax number, click on the Preview List button. The report shown in FIG. 64 will appear.

Figure 65:
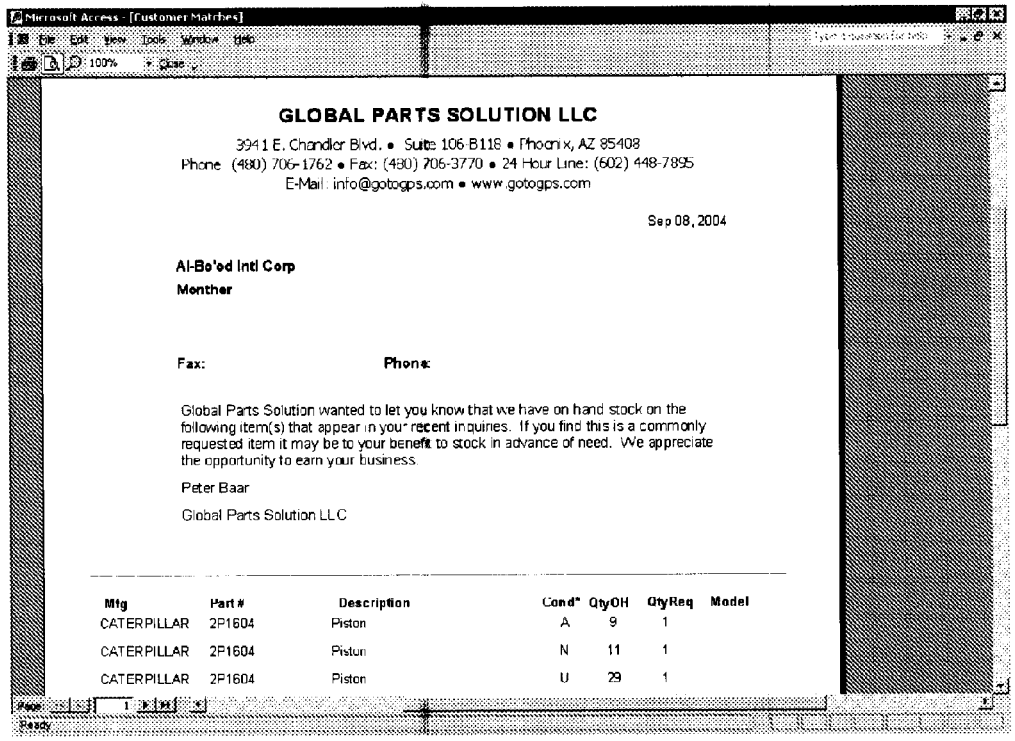

To review letters generated for those requests that have not provided an email address or fax number, click on the Preview Report button. The letters shown in FIG. 65 will appear.

Figure 66:
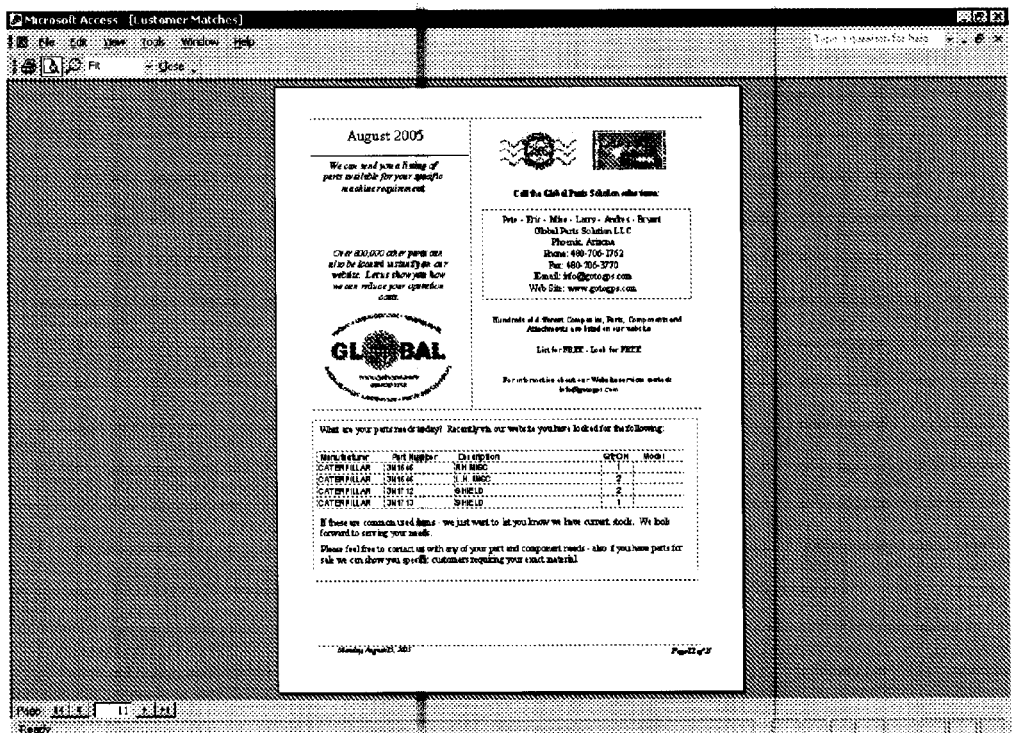

The Preview Formatted button will display the same information in a different format shown in FIG. 66.

Figure 67:
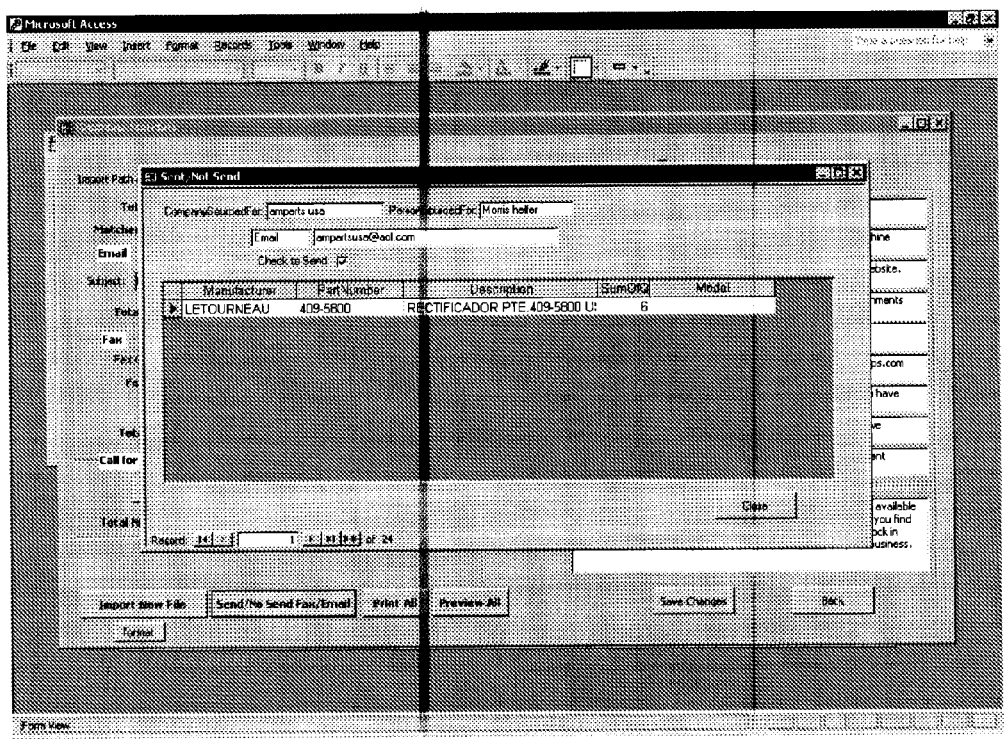

The Send/No Send Fax/Email button shown in FIG. 67 allows you to individually omit certain groups from being faxes or emailed. The Check to Send check box for each group is checked by default. To prevent this from being emailed or faxed, uncheck the Check to Send Box. This group will be omitted when either the Fax or Email buttons are selected.

Match Customer Usage

Figure 68:
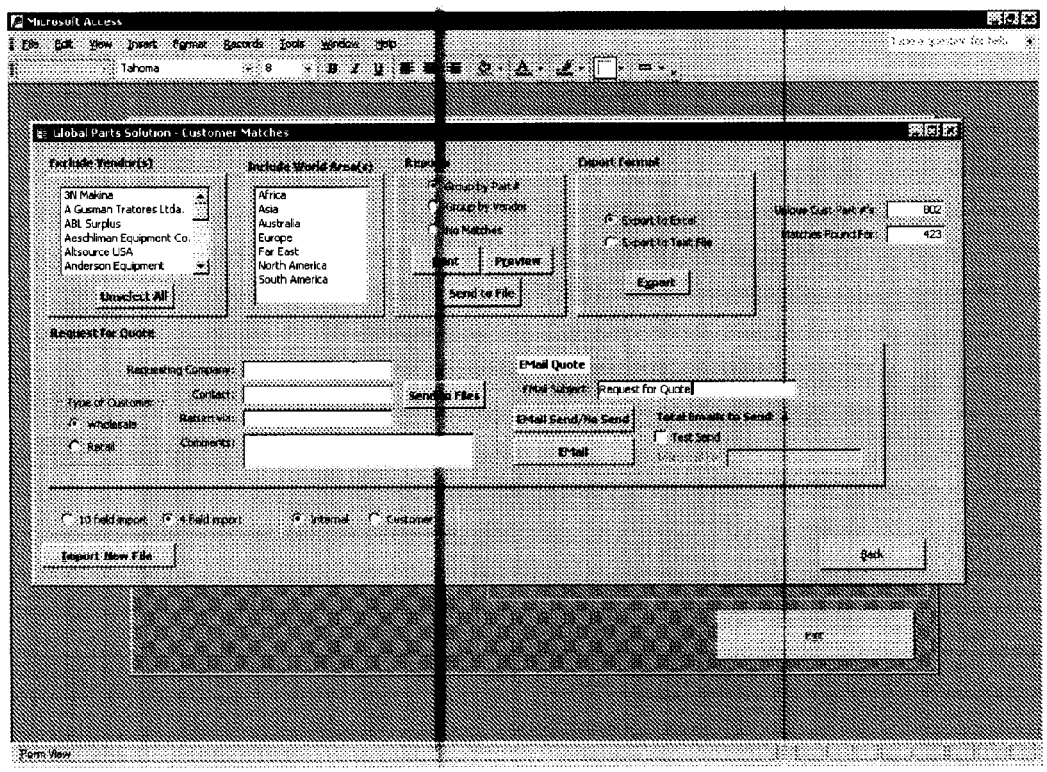

The Match Customer Usage screen shown in FIG. 68 is used to compare customer requests for inventory against inventory available. The customer provides GPS with a pre-defined formatted file which is imported and compared against the inventory existing in the database. The comparison can be customized by excluding certain vendors and/or specifying certain world areas to search against. The results of the search can be exported or view in a report.

Limiting the Comparison

The first step in finding Customer Matches is to limit the comparison, if needed. Vendors can be excluded and not matched against by clicking on the vendor(s) in the Exclude Vendor(s) listbox. If a vendor is selected and has a part requested by the customer, the part will not be included in the matching results.

To only include certain world areas, click on the areas that you want included in the match in the Include World Area(s) listbox. Only inventory with the world areas selected will be compared against the customer file.

Do not select any vendors or world areas to match the customer file against all inventory in the database.

Importing Customer Files

GPS requires that the customer usage file be submitted in electronic form in one of 3 ways—in an excel file, a text delimited file, or an Access database. Each of these files is detailed below. Whichever way is chosen, the file sent to GPS should be named appropriately with the company name and the date to avoid any confusion.

There are also two different formats that the files may be sent. The difference in these formats is the amount of information that will be contained in the file. The first format must contain the following 10 fields: 1) Part Number, 2) Description, 3) Min, 4) Model, 5) Calls, 6) Sales, 7) OnHand, 8) Branch, 9) Cost, 10) QuantityRequested The second format must contain the following 4 data items: 1) Part Number, 2) Description, 3) Model and 4) Quantity Requested You may choose either one of these formats. Although you may not use all of these fields for your particular company, you should make sure to include Part Number and Description as required fields in either format.

In the case of the MS Excel file and MS Access database, the column headings (in Excel) and field names (in Access) must be created exactly as above (*Note: No Spaces!). It is also crucial that the information be presented in the proper order with Part Number followed by Description, etc., ending with Cost or Quantity Requested, depending on the format chosen. If the order is mixed up, the inventory match will fail! Do not insert any hidden columns if you are using an Excel file. Once the type of import is specified by selecting the either the 10 field import or 4 field import, the import path and filename must be specified. Select a saved path and filename by clicking on the arrow next to the field. To save a path and filename, click on the Add to List button after entering the path and filename.

Click on the Import New File button to import the customer file. The file will be matched against the inventory in the database based on any search criteria entered. The number of part numbers listed in the customer file will be displayed in the field next to the Unique Cust Part #'s label. The number of parts that were matched will be displayed in the field next to the Matches Found For label.

Electronic Form #1—Excel

Figure 69:
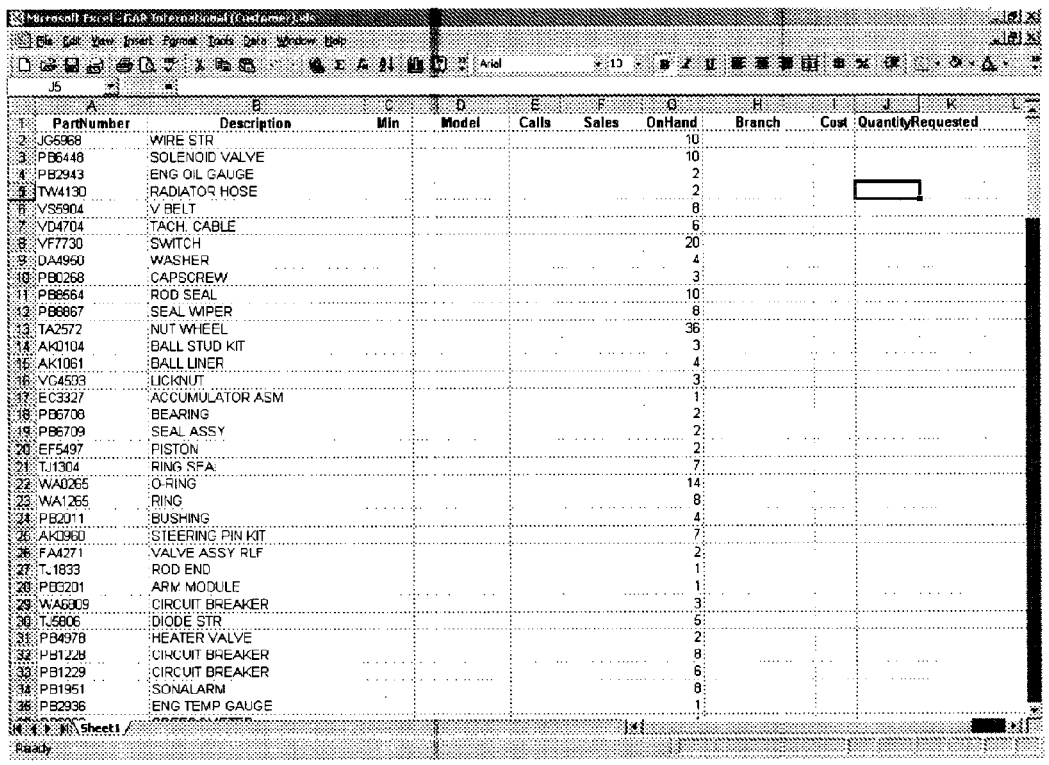
Figure 70:
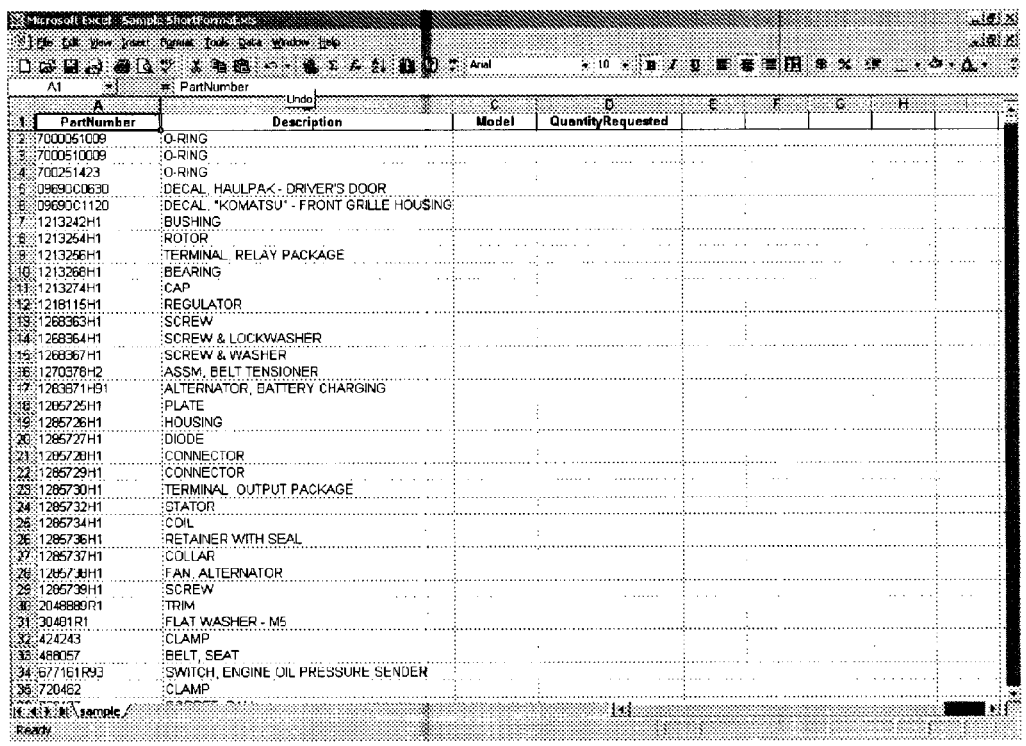

All inventory items will be listed on the first worksheet and that worksheet will be named 'Shee1', which is the default name. Row 1 of the worksheet will contain the column headings described above. Beginning with row 2, enter the usage inventory items and continue doing so only on the first sheet. Do not put inventory information on sheets other than 'Sheet1'. Centering, bolding or otherwise formatting information is not necessary. Do not include any hidden columns. A 10 Filed Format Sample File in shown in FIG. 69 and a 4 Filed Format Sample File is shown in FIG. 70.

Electronic Form #2—Access 2000

Only MS Access 2000 or higher s acceptable, as MS Access 97 databases need to be converted to MS Access 2000 or this will cause problems with the automated importation process. The database will contain one table named 'tblCustomerUsage' with the following fields defined and populated, depending on the format chosen. *Note: Be sure to name both the table and fields EXACTLY as described—no spaces.

10 Field Format Sample

Table: tblCustomerUsage
Columns

| | |
|---|---|
| Part Number - | Text(25) |
| | Allow Zero Length: False |
| | Required: True |
| Description - | Text(50) |
| | Allow Zero Length: False |
| | Required: True |
| Min - | Integer |
| | Required: False |
| Model - | Text(50) |
| | Allow Zero Length: True |
| | Required: False |
| Calls - | Integer |

-continued

|  |  |
|---|---|
| Sales - | Required: False<br>Integer |
| On Hand - | Required: False<br>Integer |
| Branch - | Required: False<br>Text(50)<br>Allow Zero Length: False |
| Cost - | Required: False<br>Double |
| Quantity Requested - Integer | Required: False<br>Decimal Places Auto |
|  | Required: False |

10 Field Format Sample
    Table: tblCustomerUsage
        Columns

|  |  |
|---|---|
| Part Number - | Text(25)<br>Allow Zero Length False<br>Required: True |
| Description - | Text(50)<br>Allow Zero Length: False<br>Required: True |
| Model - | Text(50)<br>Allow Zero Length: True<br>Required: False |
| Quantity Requested - Integer | Required: False |

Electronic Form #3—Text File

This will be a pipe "|" delimited file with the same fields as above, only separated by the pipe character. This file must have a filename extension of '.txt'. There is no pipe after the last field, only a carriage return. If there is no data for an optional field, then type two pipes right next to each other. That way the automated import program will know that there is no data for that field. If you just leave it out, it will pull the next fields information into the incorrect field. Listed below are 2 samples of a pipe delimited files.

10 Field Format Sample
JG5968|Wire Str|||||10|||
    PB6448|Solenoid Valve|||||6||0|3
    PB2943|Eng Oil Gauge|3||||22|Mesa|23.44|

4 Field Format Sample
    JG5968|Wire Str|
PB6448|Solenoid Valve||3
PB2943|Eng Oil Gauge|3|

Reports

There are basically 3 reports that can be printed for the customer matches. Group by Part # lists all of the vendors that have matching parts for the customer grouped by the part number. Group by Vendor lists all of the part numbers that match for a particular vendor, each vendor appearing on a separate page. Both of these reports have 2 formats—an internal format consisting of vendor details and a customer format with no vendor details. These reports can be viewed or printed by selecting the Preview or Print buttons. The final report is a No Matches report that contains the part numbers listed in the customer's imported file that were not matched.

Group by Part #

The Group by Part # report lists all the vendors that have matching parts for the customer grouped by the part number. The heading consists of the customer's part number with the description and quantity requested. Following the heading is the list of vendors that have that part in inventory along with the details of the vendor.

Internal Format

Figure 71:
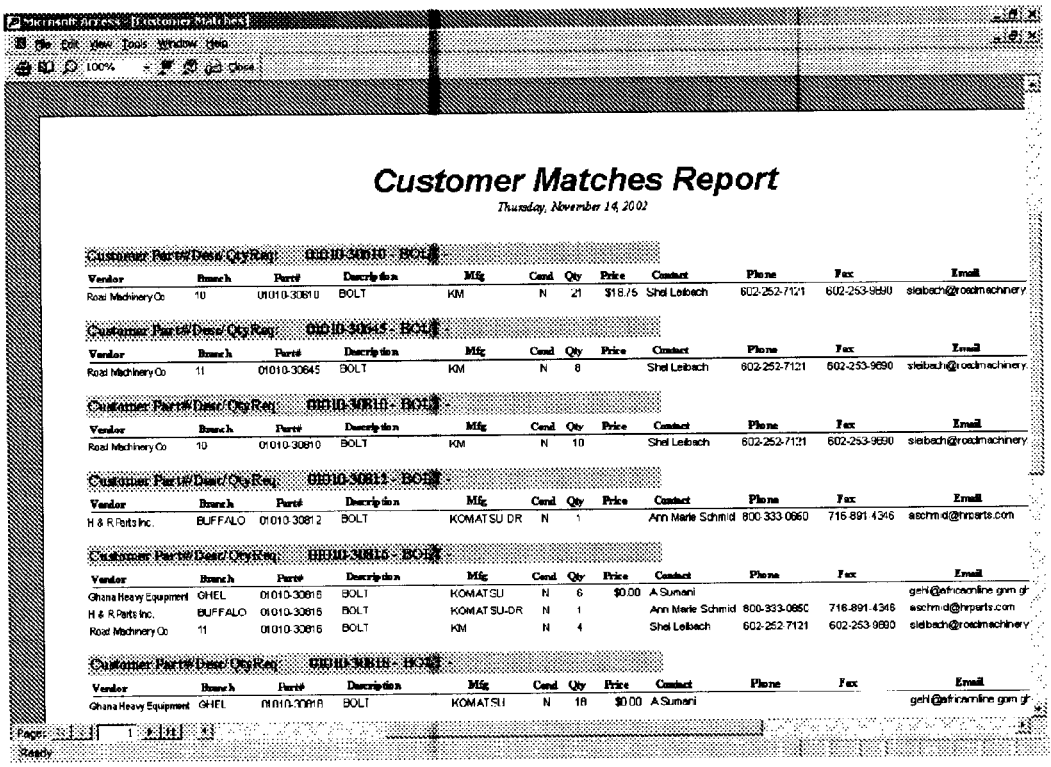

Click on Internal to view the details of the vendor shown in FIG. 71.

Customer Format

Figure 72:
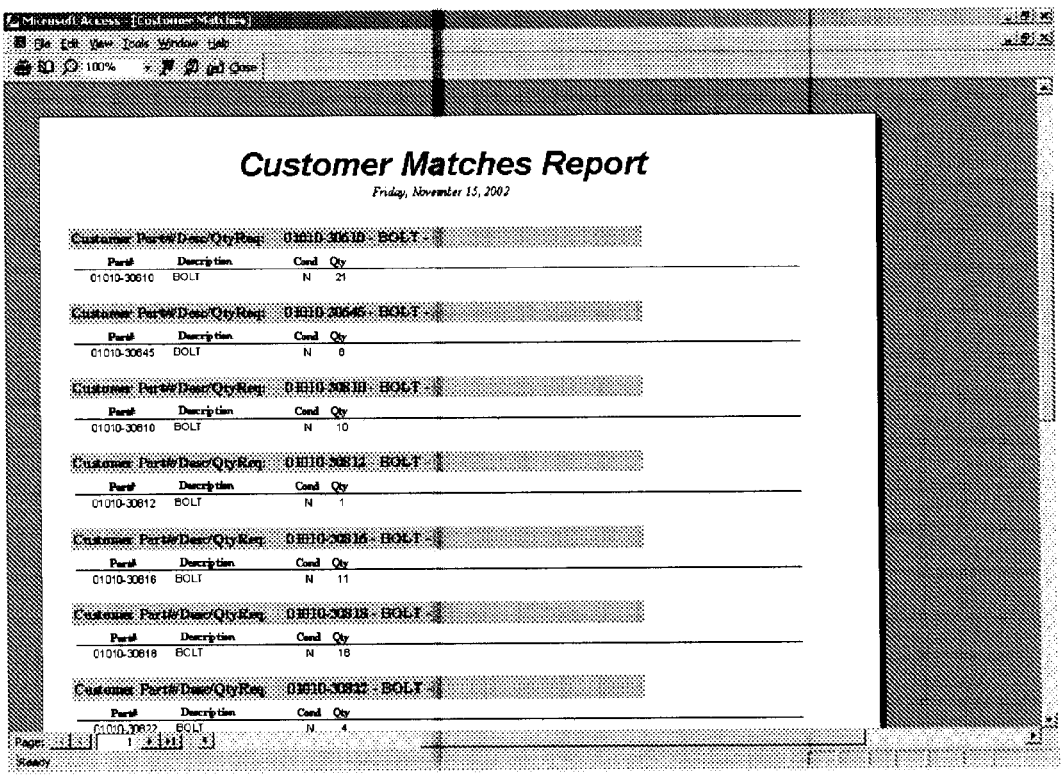

Click on Customer to only show part information and no vendor details shown in FIG. 72.

To print the report click on the printer icon located below the menu bar on the upper left portion of the screen. You may also change the settings of the page by clicking on the book icon, zoom in or out by clicking on the magnifying glass, set the size shown on the screen by clicking on the drop down box with the 100% title, publish the report in a MS Word document by selecting the Word icon, output the report to a Notepad text file by clicking on the notebook icon, send an email with the report as an attachment by clicking on the envelope icon, or close the report by selecting the close icon.

Group by Vendor

The Group by Vendor report lists all the vendors that have matching parts for the customer grouped by the vendor. The heading consists of the vendor with the customer parts that were matched against that vendor along with the company details. Each vendor will appear on a separate page.

Internal Format

Figure 73:
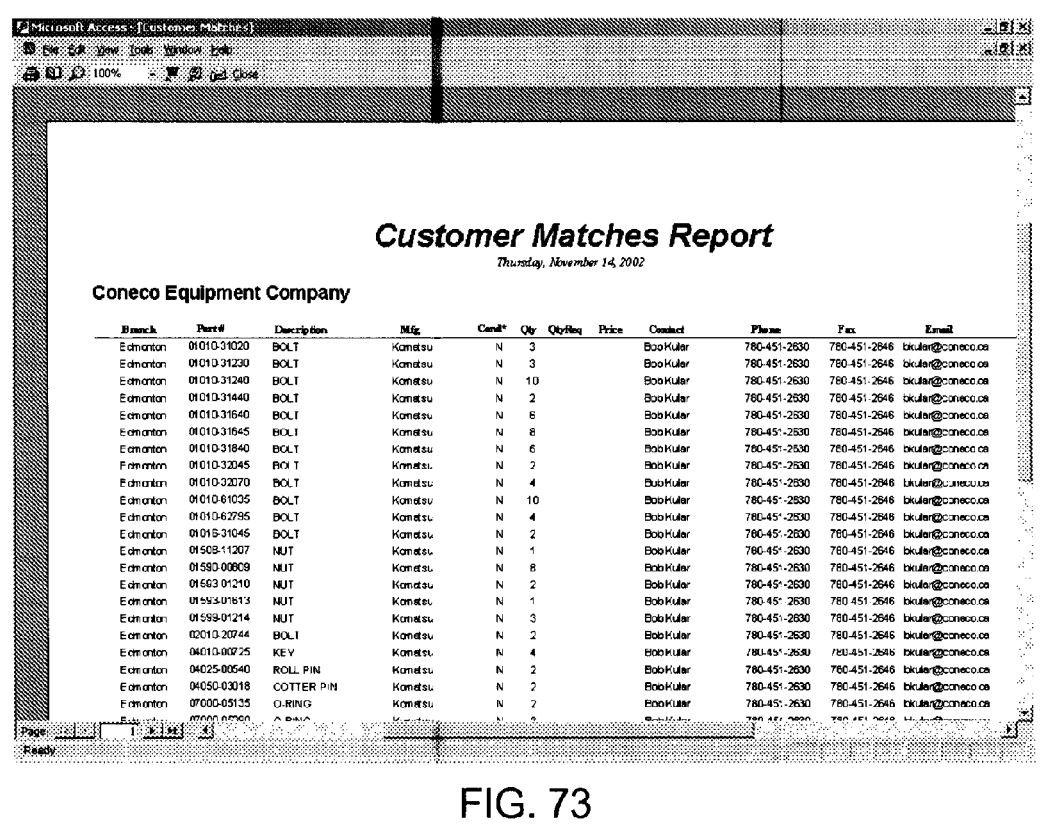

Click on Internal to view the report with vendor details shown in FIG. 73.

Customer Format

Figure 74:
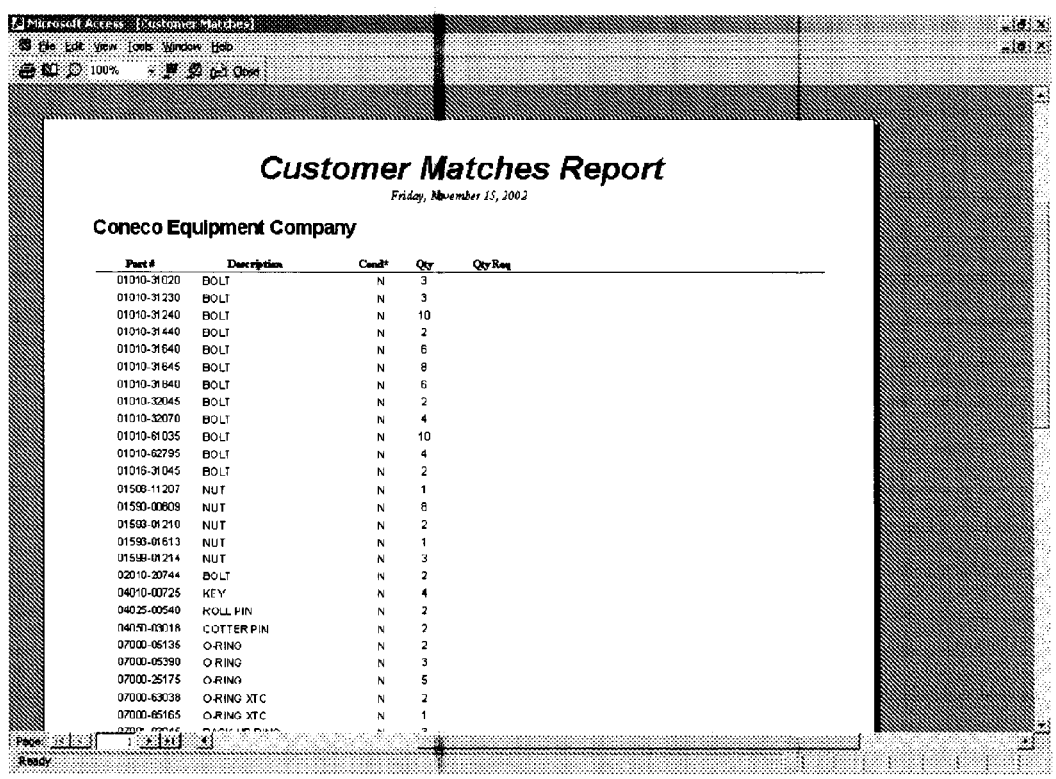

Click on Customer to view the report without the vendor details shown in FIG. 74.

To print the report click on the printer icon located below the menu bar on the upper left portion of the screen. You may also change the settings of the page by clicking on the book icon, zoom in or out by clicking on the magnifying glass, set the size shown on the screen by clicking on the drop down box with the 100% title, publish the report in a MS Word document by selecting the Word icon, output the report to a Notepad text file by clicking on the notebook icon, send an email with the report as an attachment by clicking on the envelope icon, or close the report by selecting the close icon.

No Matches

Figure 75:
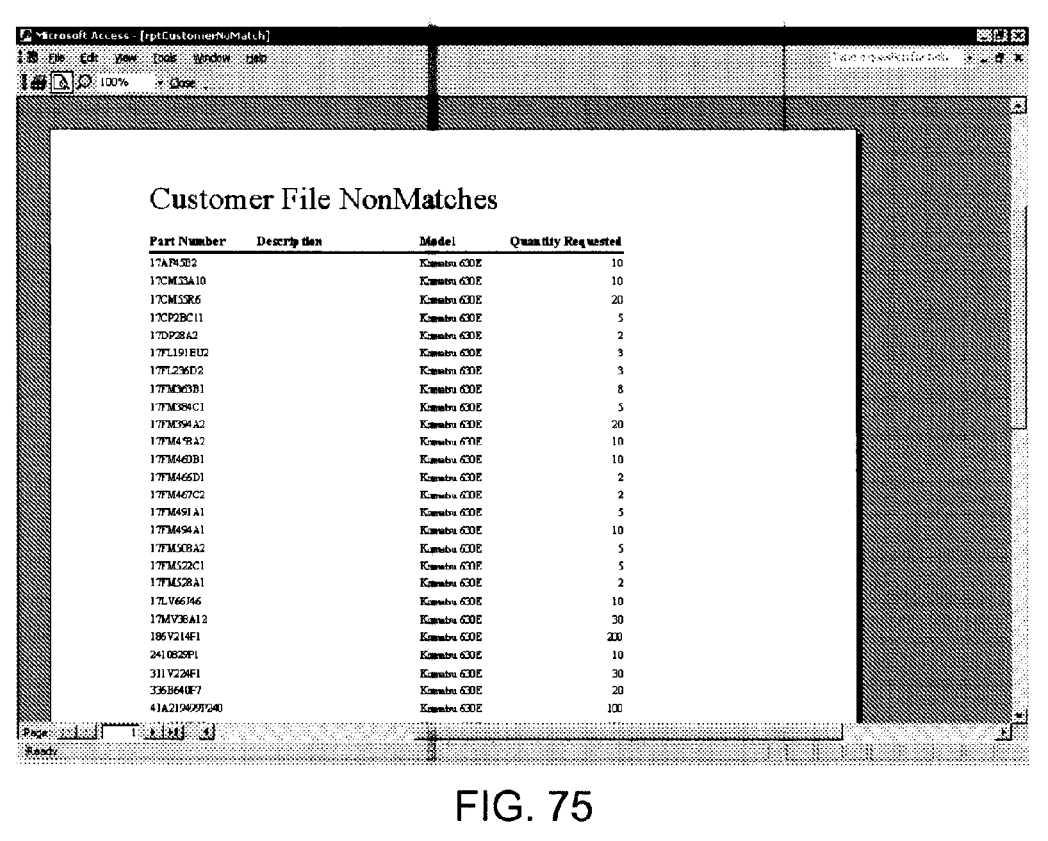

The No Matches report lists all the parts along with the description, model and quantity requested from the customer's imported file that do not have matching parts in inventory. There is only one format for this report shown in FIG. 75 regardless if customer or internal format is chosen.

Send to File

The Send to File button allows you to save the Group by Part #, Group by Vendor, or No Matches report to different formats. Once you click on the button, a dialog box will appear asking what type of format you would like to save the file to. The formats consist of MS Dos Text, HTML, Microsoft Excel, Snapshot Format and Rich Text Format Once the format is selected, a dialog box will appear asking where you want the file saved. Find the path and enter a filename to save the file in the specified format.

Exporting the Results

You may also export the results from the customer matches into a MS Excel workbook or a Text file. Click on the Export button and a file dialog box will appear asking where to export the file to. Select the path and filename to export the results.

Figure 76:
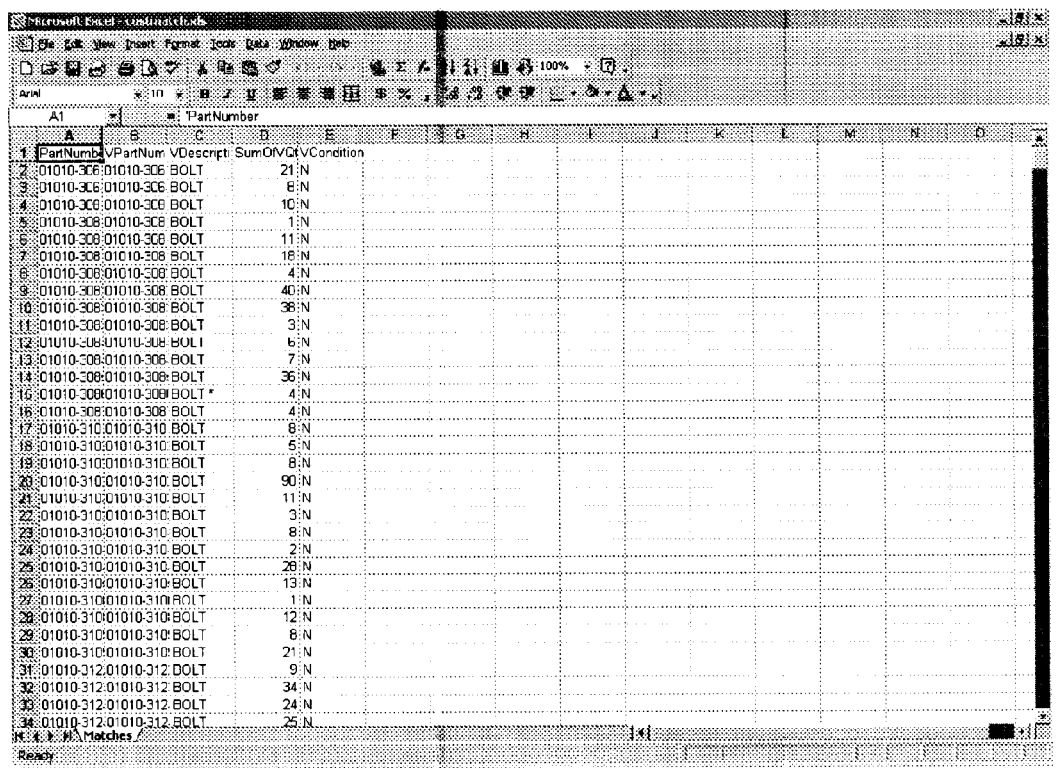

The fields appear in the spreadsheet or text file shown in FIG. 76: Part Number, Vendor Part Number, Vendor Description, Vendor Total Quantity of the part number and Vendor Condition of the part number.

Sample Excel file

Sample Text file

Figure 77:
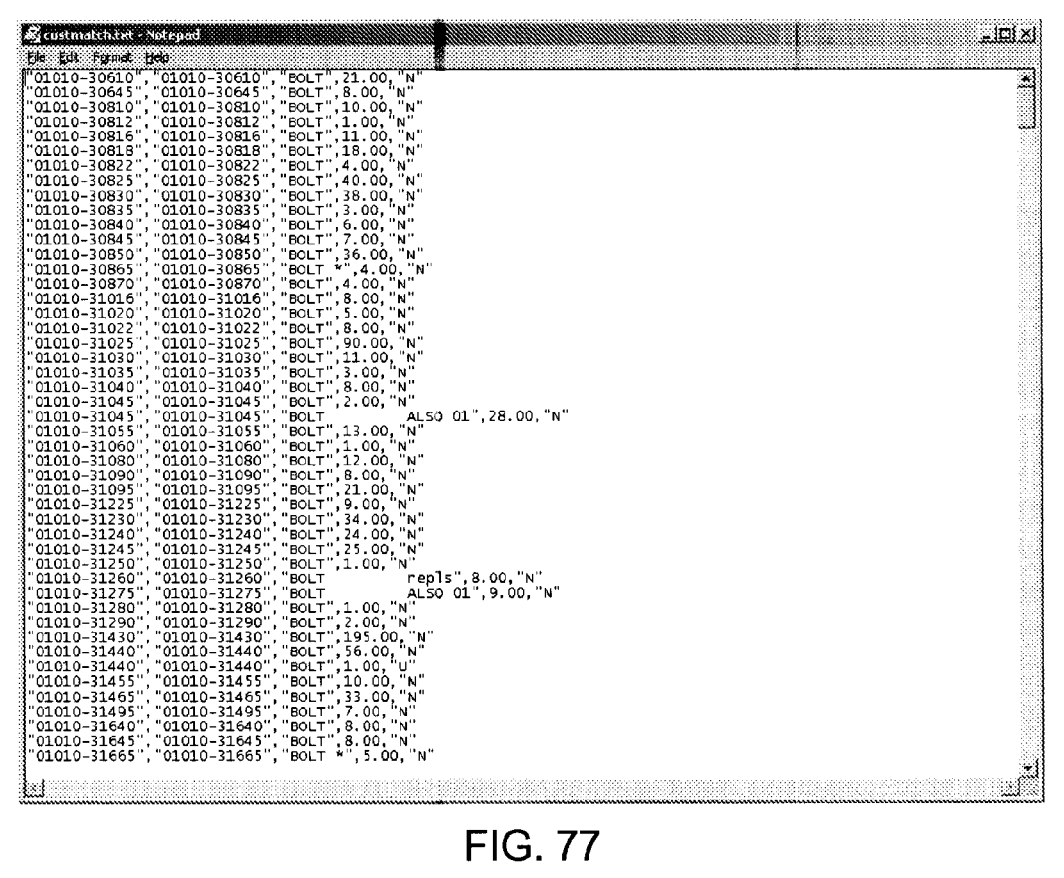

The text file is delimited by commas with strings surrounded by quotes shown in FIG. 77.

Request for Quote

There are 2 ways to produce requests for quotes. Rich text files can be created with each file containing a separate quote for the vendor or html formatted emails may be sent to each vendor. Before choosing either of these methods, make sure to fill out the following information on the screen. This information will be included on both the Request for Quote report and email.

Requesting Company—The name of the company requesting the quote.
    Contact—The contact person from the requesting company.
    Return via—How to contact the company with the quote.
    Comments—Any comments.
    Type of Customer—Wholesale or Retail—Allows you to select the price on the quote to be a wholesale price or a retail price.

Send to Files

Figure 78:
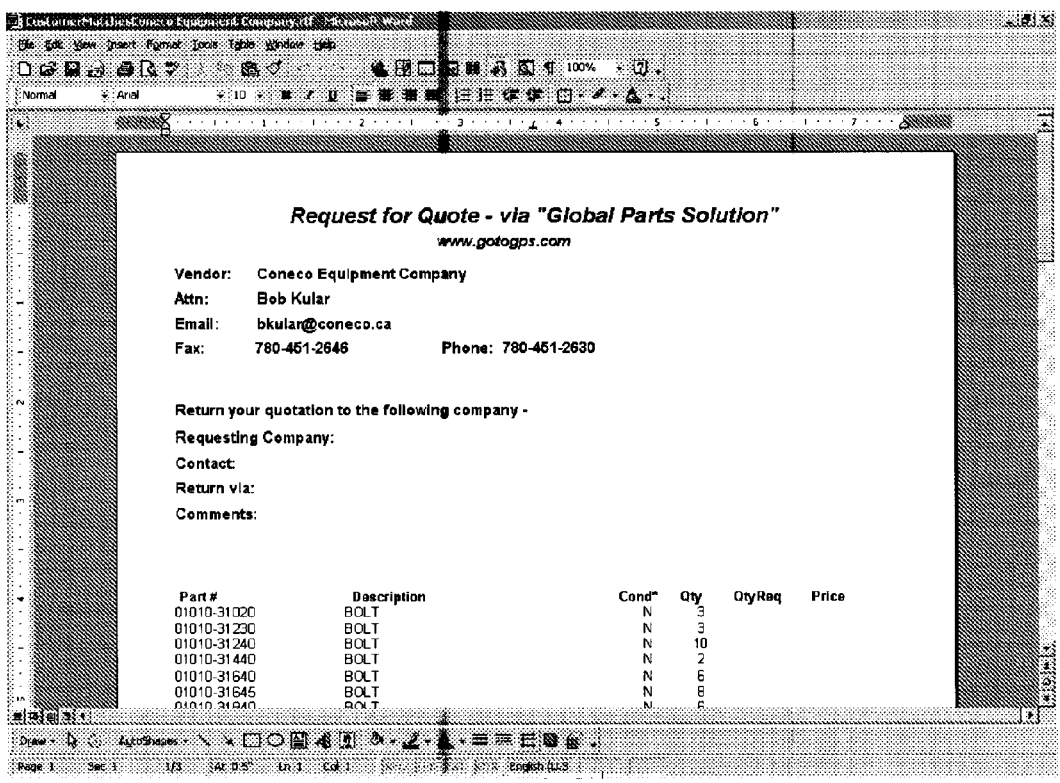

The Send to Files button creates separate "Request for Quote" files for each vendor. A dialog box will appear asking for the path of where you would like the files to be created. Only enter the path, not the filename. The files will be created in the path with the filename consisting of "CustomerMatches" followed by the vendor name as shown in FIG. 78. The files are created in a rich text format with an extension of ".rtf".

Email Quote

A "Request for Quote" report may also be sent electronically for each vendor. The email will be html formatted with the same information included as is in the Send to Files output. You must provide the subject for the email before sending. You may also send the emails to a test email account before actually sending to the vendor. Check the checkbox next to the "Test Send" label and fill in the email address that you would like to send the emails to in the field next to the "Test Send To" label. This will send all quotes to the email specified. Uncheck this box to send to the vendor.

Figure 79:
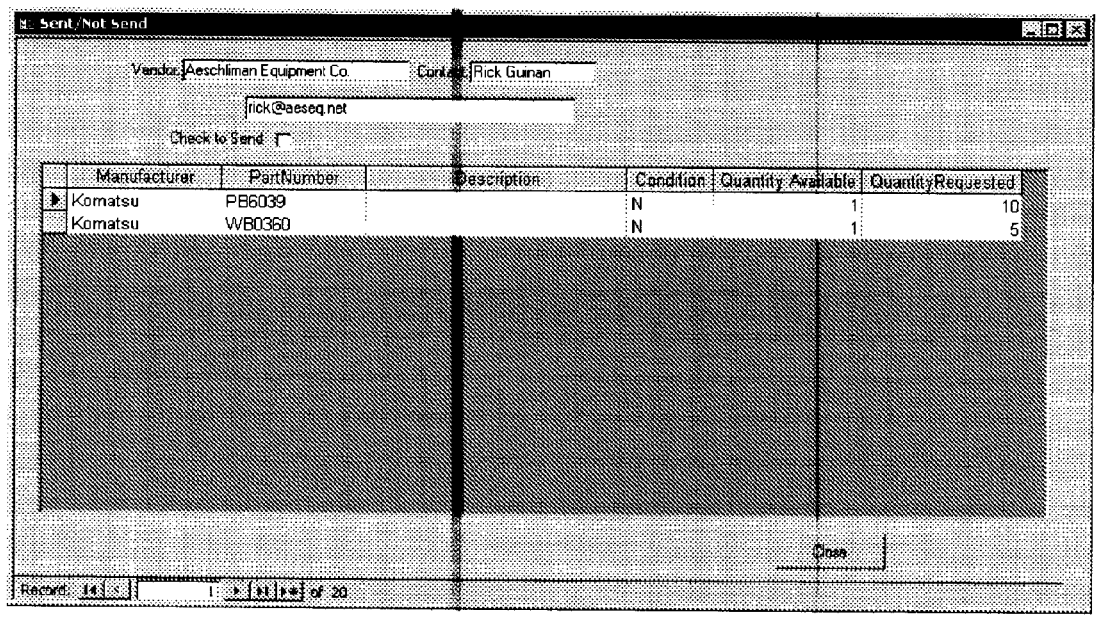

The total number of emails that will be sent is listed on the screen. Clicking on the Email Send/No Send button allows you to choose which vendors will receive an email. If this button is clicked, the screen shown in FIG. 79 will appear.

The "Check to Send" checkbox is checked by default which indicates that the vendor will receive the email. Uncheck the box next to prevent the email from being sent to this vendor. Continue going through each vendor by clicking on the right arrow button located at the bottom of the screen.

Figure 80:
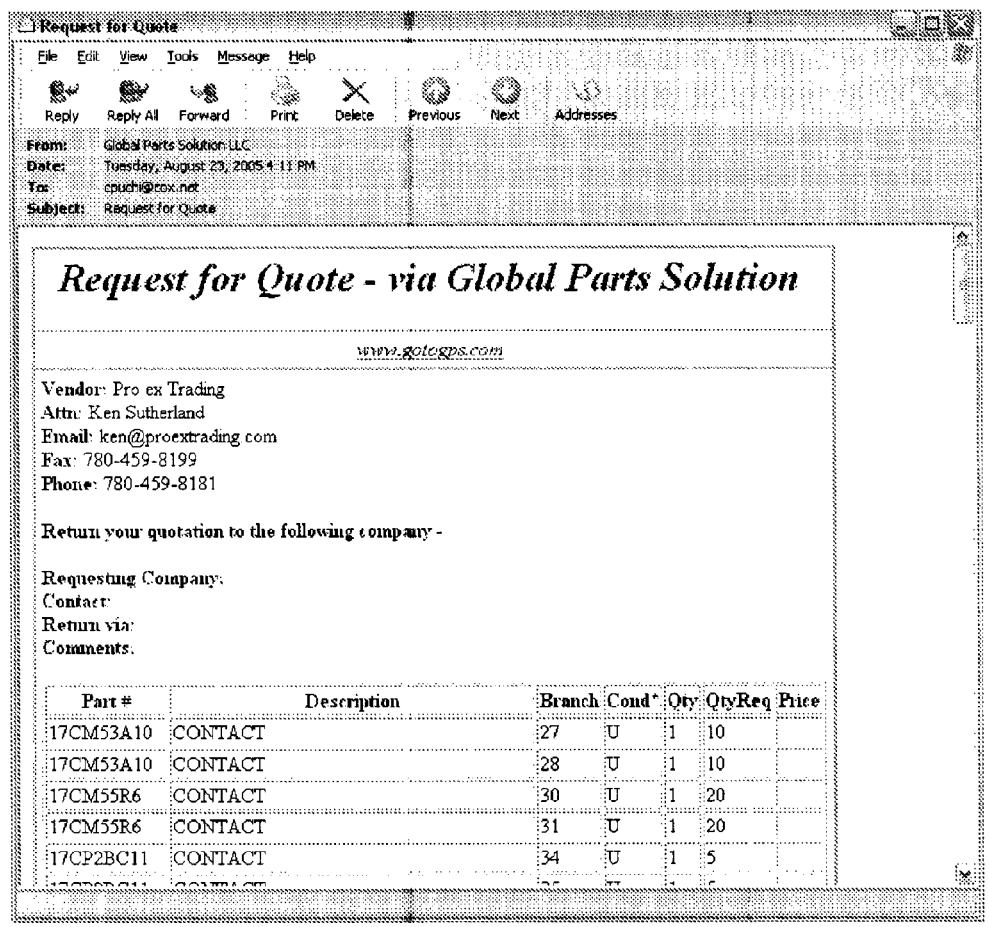

A sample email is shown in FIG. 80.

Manage Part Descriptions, Manufacturers, Part Exclusions, & World Areas

There will be many different part descriptions and manufacturer names in the database. Depending on the company, the same description or manufacturer may be called something slightly different. This makes it very difficult to group the same type of part or same manufacturer into the same group when exporting inventory by description or manufacturer. Instead of the same part being in one file, it may be in several files named differently. To manage this problem, click on either the Manage Part Descriptions or Manage Manufacturers button on the main screen. These 2 functions will allow you to group like names together so that they will be included in the same file at the time of export and when importing new inventory.

Figure 81:
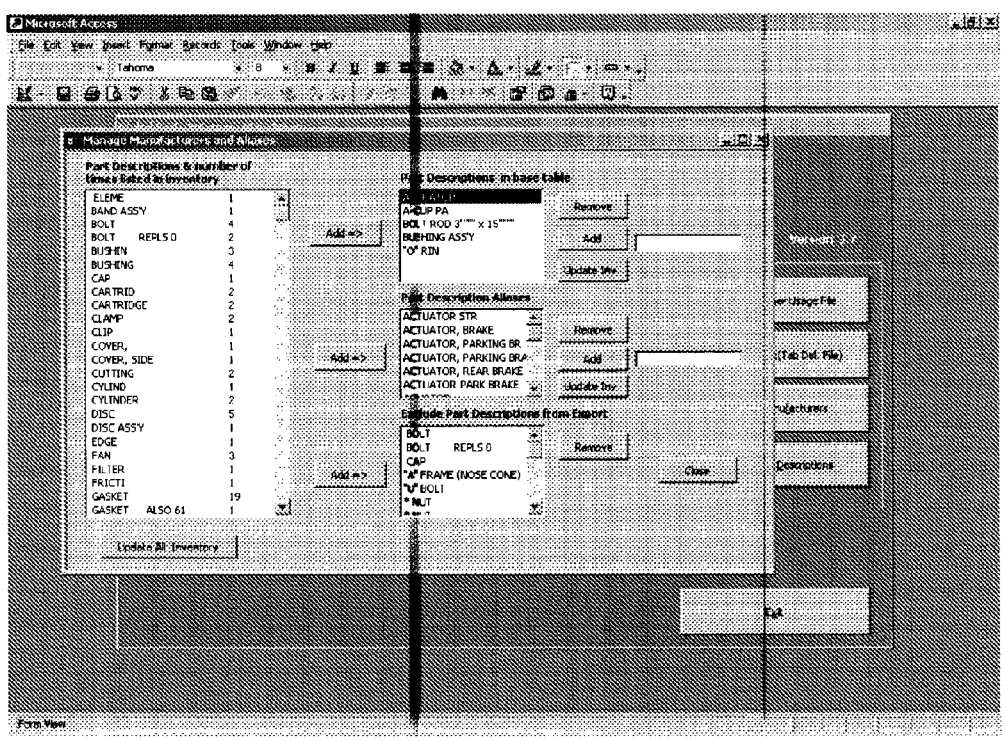

Clicking on the Manage Part Description button will take you to the the screen shown in FIG. 81.

Adding Base Description and Aliases

The Part Descriptions that exist currently in the database will be listed on the left hand side of the screen. The number of items that are listed for each description is listed next to the description. The Part Descriptions in base table listbox contains the descriptions that other descriptions will be grouped under. Click on the Add button next to this listbox to add the Part Description to this listbox.

Once the Part Description is added to the base table, you can add aliases or other part descriptions that are spelled differently but are the same part under that description. To add an alias for a part description, follow these steps: 1) Highlight the part description in the Part Descriptions in base table listbox that the alias will be grouped under; 2) Highlight the part description from the list of parts in inventory on the left hand side of the screen that will be grouped under the previously highlighted part description; and 3) Click on the Add button next to the Part Description Aliases listbox.

The part description alias will appear in the Part Description Aliases listbox. The part that the alias is grouped under must be highlighted in the Part Descriptions in base table listbox in order to view the alias.

You may also manually add a part to the base table by adding the part description in the field by the Add button, which is next to the Part Descriptions in base table listbox. Once the description is entered, click on the Add button.

To manually add an alias to the part description base, highlight the part in the Part Descriptions in base table listbox. Enter the part description of the alias in the field by the Add button, which is next to the Part Description Aliases listbox.

Removing Base Description and Aliases

You cannot remove a base description if aliases are listed under it. You must first remove all of the aliases then remove the base description. To remove an alias, highlight the base description which the alias is grouped under. Then click on the alias to be removed, and click on the Remove button next to the Part Description Aliases listbox. Once all of the aliases are removed, make sure the correct base description is highlighted, then click on the Remove button next to the Part Descriptions in base table listbox.

Updating Inventory

Once the descriptions are created in the base table and the aliases are created for that description, you can update all or part of the current inventory to reflect those changes. There are three ways of updating inventory. You can update all of the inventory, you can update only the inventory for a certain description in the base table, or you can update only the inventory for a particular alias.

Once the base part descriptions and aliases are defined, all part descriptions in vendor imports will be checked against the current part description aliases. On import of new inventory, all parts that have a part description that matches an alias description will be changed to the part description base that the alias is grouped under. Therefore, the alias description can never be added to inventory, only the base description can be added.

Updating all of the Inventory

Click on the Update All Inventory button under the listbox that contains all of the part descriptions in the database located on the left-hand side of the screen to update all of the inventory. This will update each alias to the base description that it is defined under. The alias will no longer exist in the database under the alias description. The alias description will be changed to the part description in the base table.

Updating Inventory Based on a Description in Base Table

Highlight the part description base and click on the Update Inv. button next to the Base Table listbox to update all parts in the current inventory that have a description that is an alias for the base description. All inventory that has that alias will be updated to the description in the base table for that alias. Only those aliases for the highlighted base description will be updated.

Updating Inventory Based on an Alias

Highlight the alias description and click on the Update Inv. button next to the Alias listbox to update all parts in the current inventory that have a description that matches the alias highlighted. All inventory that has that alias will be updated to the description in the base table for that alias. Only the one alias description will be updated.

Excluding Part Descriptions from Export

There may be times when you do not want all of the descriptions for parts to be included in an export by description. To exclude certain parts from exporting, highlight the part description in the listbox on the left-hand side of the screen and click on the Add button next to the Exclude Part Descriptions from Export listbox. These part descriptions will not be exported into a separate file when choosing any of the "by desc" exports from the Search for Part screen.

Manage Manufacturers

Figure 82:
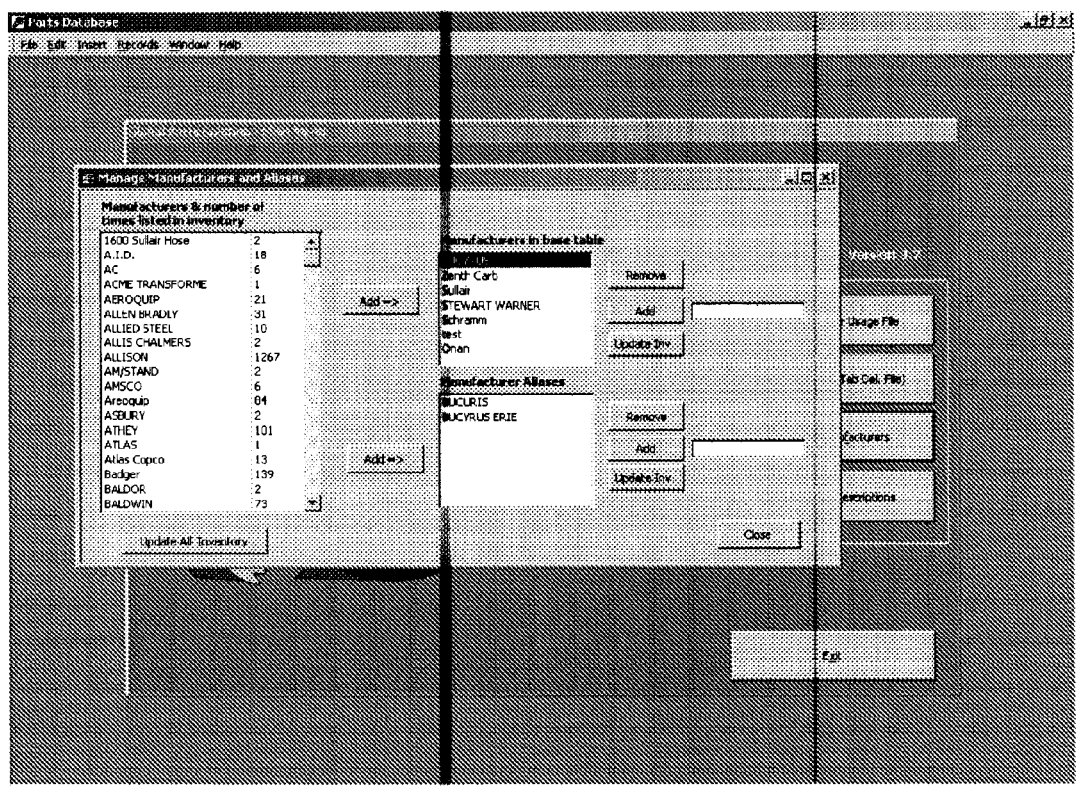

Clicking on the Manage Manufacturers button will take you to the screen shown in FIG. 82.

Adding Base Description and Aliases

The Manufacturers that exist currently in the database will be listed on the left hand side of the screen. The number of items that are listed for each manufacturer is listed next to the name. The Manufacturers in base table listbox contains the names that other manufacturers will be grouped under. Click on the Add button next to this listbox to add the Manufacturer to this listbox.

Once the Manufacturer is added to the base table, you can add aliases or other manufacturers that are spelled differently but are the same manufacturer under that name. To add an alias for a manufacturer, follow these steps: 1) Highlight the manufacturer in the Manufacturers in base table listbox that the alias will be grouped under; 2) Highlight the manufacturer from the list of manufacturers in inventory on the left hand side of the screen that will be grouped under the previously highlighted manufacturer; and 3) Click on the Add button next to the Manufacturer Aliases listbox.

The manufacturer alias will appear in the Manufacturer Aliases listbox. The manufacturer that the alias is grouped under must be highlighted in the Manufacturers in base table listbox in order to view the alias.

You may also manually add a manufacturer to the base table by adding the manufacturer name in the field by the Add button, which is next to the Manufacturers in base table listbox. Once the name is entered, click on the Add button.

To manually add an alias to the manufacturer base, highlight the manufacturer in the Manufacturers in base table listbox. Enter the manufacturer of the alias in the field by the Add button, which is next to the Manufacturer Aliases listbox.

Removing Base Description and Aliases

You cannot remove a base manufacturer if aliases are listed under it. You must first remove all of the aliases then remove the base manufacturer. To remove an alias, highlight the base manufacturer which the alias is grouped under. Then click on the alias to be removed, and click on the Remove button next to the Manufacturer Aliases listbox. Once all of the aliases are removed, make sure the correct base manufacturer is highlighted, then click on the Remove button next to the Manufacturer in base table listbox.

Updating Inventory

Once the manufacturers are created in the base table and the aliases are created for that manufacturer, you can update all or part of the current inventory to reflect those changes. There are three ways of updating inventory. You can update all of the inventory, you can update only the inventory for a certain manufacturer in the base table, or you can update only the inventory for a particular alias.

Once the base manufacturers and aliases are defined, all manufacturers in vendor imports will be checked against the current manufacturer aliases. On import of new inventory, all manufacturers that have a name that matches an alias manufacturer will be changed to the manufacturer base that the alias is grouped under. Therefore, the alias manufacturer can never be added to inventory, only the base manufacturer can be added.

Updating all of the Inventory

Click on the Update All Inventory button under the listbox that contains all of the manufacturers in the database located on the left-hand side of the screen, to update all the inventory. This will update each alias to the base manufacturer that it is defined under. The alias will no longer exist in the database under the alias manufacturer. The alias manufacturer will be changed to the manufacturer name in the base table.

Updating Inventory Based on a Manufacturer in Base Table

Highlight the manufacturer base and click on the Update Inv. button next to the Base Table listbox to update all manufacturers in the current inventory that have a name that is an alias for the base manufacturer. All inventory that has that alias will be updated to the manufacturer name in the base table for that alias. Only those aliases for the highlighted base manufacturer will be updated.

Updating Inventory Based on an Alias

Highlight the alias manufacturer and click on the Update Inv. button next to the Alias listbox to update all manufacturer names in the current inventory that have a name that matches the alias highlighted. All inventory that has that alias will be updated to the manufacturer name in the base table for that alias. Only the one alias manufacturer name will be updated.

Manage Part Exclusions

Figure 83:
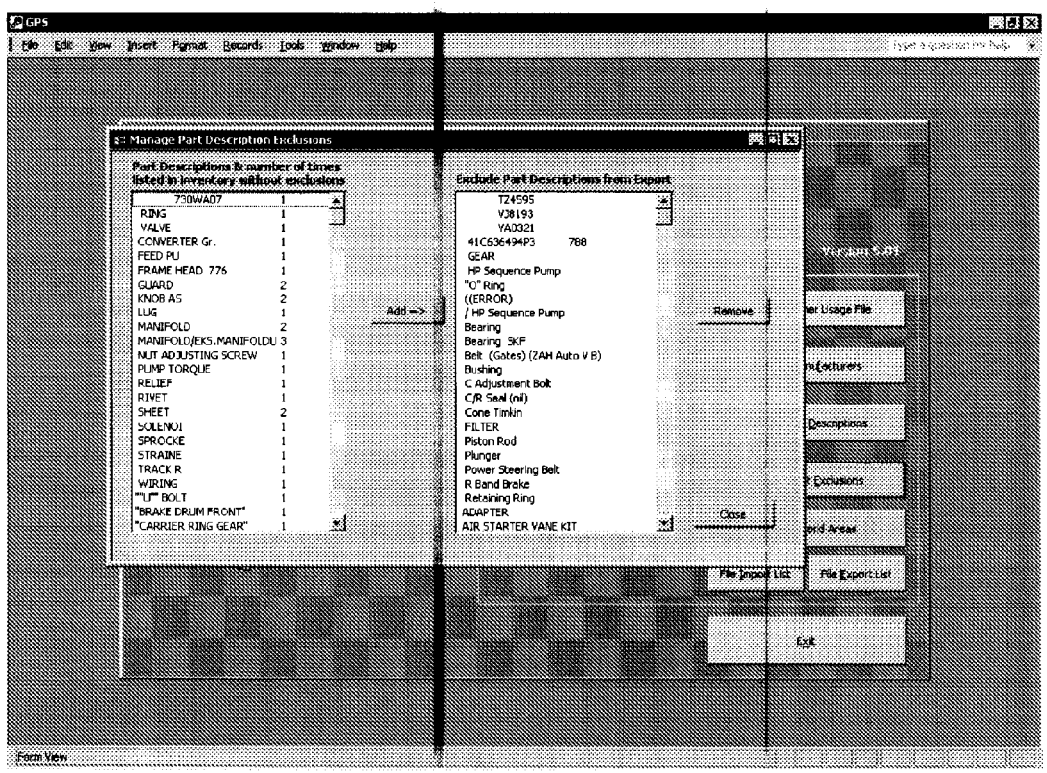

The Manage Part Exclusions screen is used to determine what parts will be included in the Export by Desc exports located in the Search for Part section of the software. The list of part descriptions in inventory is so vast that there may be cases in which some part descriptions are not needed in the exports. To eliminate exporting certain descriptions from the exports, click on the Manage Part Exclusions button to manage this list. The screen shown in FIG. 83 will appear.

The list on the left side of the screen contains all of the descriptions in parts inventory that will be included in the exports. The list on the right side of the screen lists all of the descriptions that will not be exported. To eliminate a description from the exports, select the description in the list on the left side of the screen and click on the Add button. This will move the description to the list on the right side of the screen. To include a description that was previously excluded, select the description in the list on the right side of the screen and click on the Remove button. This will include this description in any future exports by Description.

Manage World Areas

The Manage World Areas screen contains the list of World Areas that can be attached to a vendor in the Vendor screen. This screen can be used to add new World Areas to the current list.

Managing File Lists

The two buttons on the main menu named File Import List and File Export List are used as a shortcut for typing path and filenames for importing and exporting.

To import vendor inventory from the Vendor screen, you must enter the path and filename of the file you are going to import. If you always import a file from the same path, you can save the path name by clicking on the Add To List button next to the import path. This will allow you to select the path next time you do an import so that you do not have to type it again. You will still need to add the filename at the end of the path unless you have saved both the path and filename.

The Search for Part screen also has an export path that must be entered when exporting your search results. Just as the Vendor screen, if you always export to the same path and call the filename the same for each type of export, you can save the path, filename or both by clicking on the Add To List button after you have entered the path and/or filename. This will save you from retyping it in next time you need to save the search results to a file.

File Import List

Figure 84:
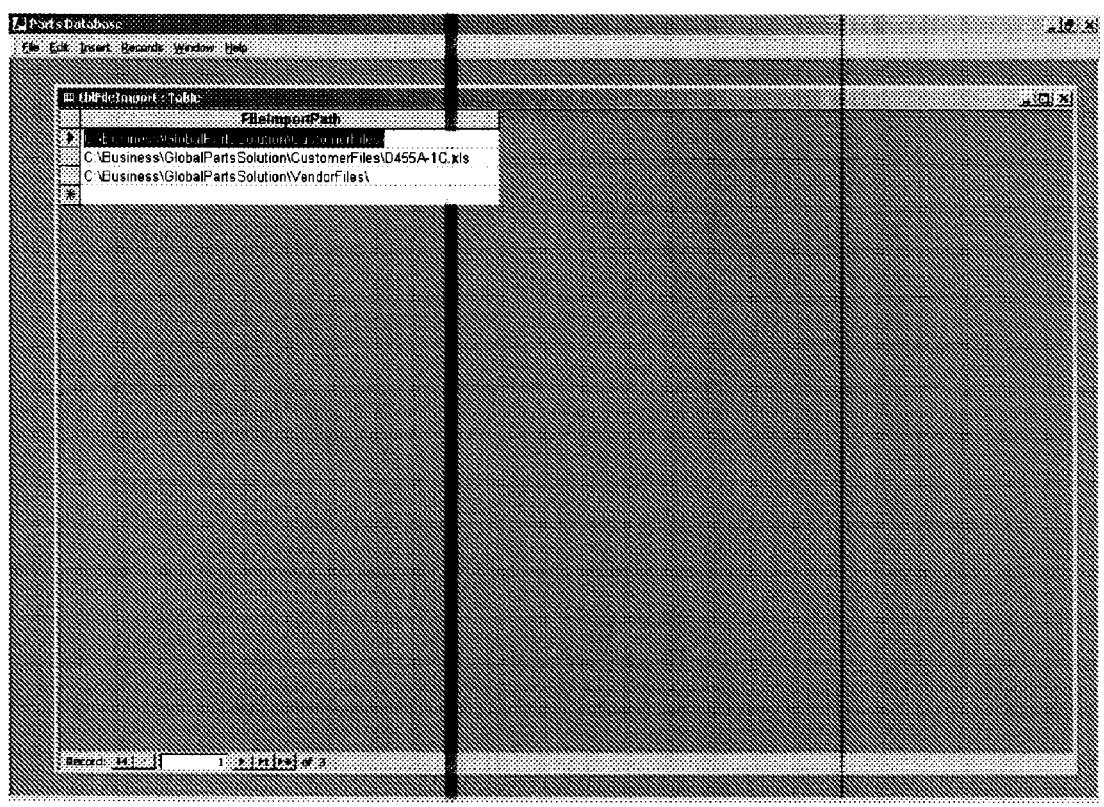

To add, change or delete paths and/or filenames to the file import list click on the File Import List button on the main menu to reach the screen shown in FIG. 84. Click on the star at the bottom of the table and begin typing the path and/or filename to add a new one. Click on an existing path and/or filename to make changes to it. Click on the square next to the path and/or filename and hit your delete key to delete a path. Any changes made on this screen will appear in the drop down boxes when importing or exporting from the Search for Part or Vendor screens.

File Export List

Figure 85:
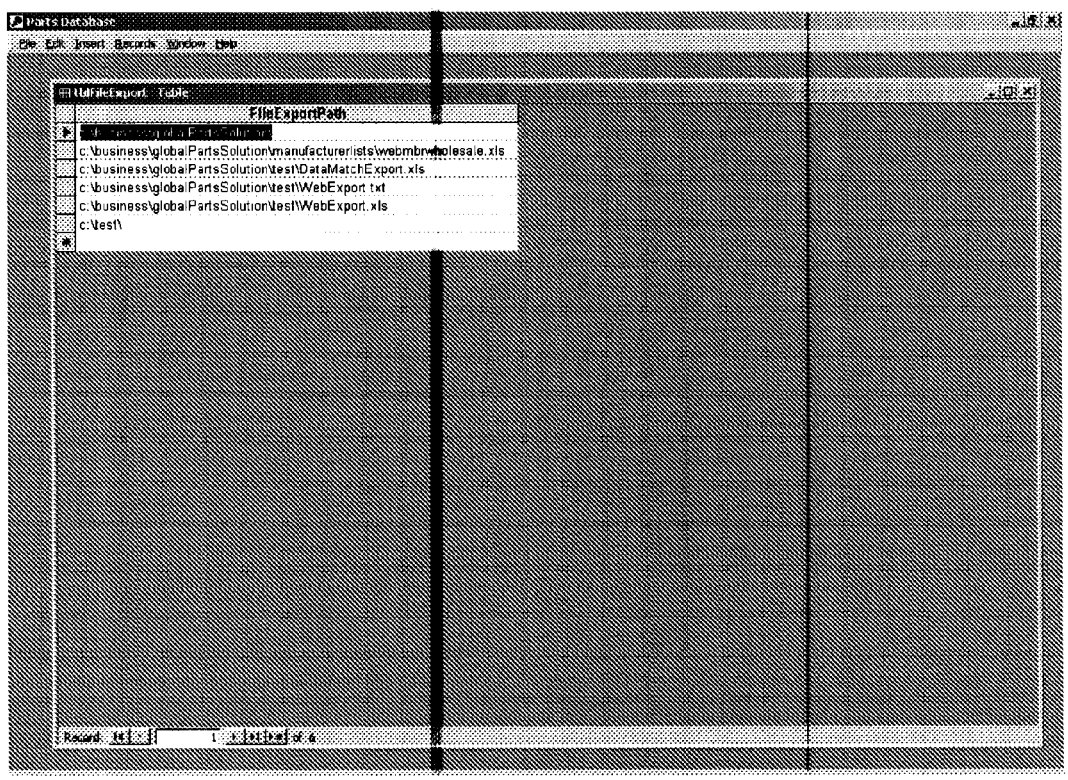

To add, change or delete paths and/or filenames to the file import list click on the File Import List button on the main menu to reach the screen shown in FIG. 85. Click on the star at the bottom of the table and begin typing the path and/or filename to add a new one. Click on an existing path and/or filename to make changes to it. Click on the square next to the path and/or filename and hit your delete key to delete a path. Any changes made on this screen will appear in the drop down boxes when importing or exporting from the Search for Part or Vendor screens.

The embodiments and examples set forth herein were presented in order to best explain the present invention and its practical application and to thereby enable those of ordinary skill in the art to make and use the invention. However, those of ordinary skill in the art will recognize that the foregoing description and examples have been presented for the purposes of illustration and example only. The description as set forth is not intended to be exhaustive or to limit the invention to the precise form disclosed. Many modifications and variations are possible in light of the teachings above without departing from the spirit and scope of the invention.

The invention claimed is:

1. A parts usage comparison system for buying and selling parts, the system comprising:
    at least one parts database storing part information corresponding to a plurality of new and used parts, the part information comprising existing new, used and reman parts inventory of a plurality of third party sellers;
    a processor coupled to the parts database, the processor configured to receive the part information, store the information in the database, and process information in the database; and
    a software interface in electronic communication with the processor; wherein:
        the software interface is configured to receive input of requested parts from a plurality of third party buyers, the processor is further configured to process the input of requested parts and determine matches of the requested parts and the part information, and
        the software interface is further configured to display all matching part information corresponding to the input of requested parts, wherein the input of requested parts comprises at least one of gold mine matches, matching seller data with gold mine information exported in a spreadsheet, matching the seller data with the gold mine information exported in a postcard, and matching the seller data with the gold mine information exported in a text file, wherein a goldmine file must contain the following thirteen fields in the order specified: 1) date sent, 2) email of sender, 3) person sourced for, 4) company sourced for, 5) email sourced for, 6) phone sourced for, 7) fax sourced for, 8) type of customer, 9) manufacturer, 10) quantity, 11) part number, 12) description and 13) model.

2. The system of claim 1, wherein the part information comprises a part number, a part description and a part quantity.

3. The system of claim 2, wherein the part information further comprises at least one of seller information, store branch information, manufacturer, part condition, part cost, list price and any combination thereof.

4. The system of claim 1, wherein the input of requested parts comprises input of at least one of a part number, a model, an inventory needed, a part source needed and any combination thereof.

5. The system of claim 1, wherein the software interface comprises an email interface, wherein the email interface is configured to receive an email request from the plurality of third party buyers requesting pricing of the requested parts and send an email to the plurality of third party sellers who have matching parts.

6. The system of claim 1, wherein the software interface is configured to receive input requesting recent parts requested by the plurality of third party buyers, wherein requesting recent parts requested includes requesting all recent parts requested and matching buyer self entered part number and model to sellers information stored on the parts database.

7. The system of claim 6, wherein software interface is further configured to receive updated contact information and inventory of the plurality of third party sellers, wherein updated inventory may comprise at least one of an export of the seller's inventory by model, a parts look up to determine what models a particular part fits and any combination thereof.

8. A method of using a parts usage comparison system for buying and selling parts, the method comprising:
    storing part information corresponding to a plurality of new, used and reman parts, the part information comprising existing new, used and reman parts inventory of a plurality of third party sellers on at least one parts database;
    receiving input of requested parts from a plurality of third party buyers through a software interface;
    processing the input of requested parts with a processor to determine matches of the requested parts and the part information; and
    displaying all matching part information corresponding to the input of requested parts through the software interface, wherein the input of requested parts comprises at least one of gold mine matches, matching seller data with gold mine information exported in a spreadsheet, matching the seller data with the gold mine information exported in a postcard, and matching the seller data with the gold mine information exported in a text file, wherein a goldmine file must contain the following thirteen fields in the order specified: 1) date sent, 2) email of sender, 3) person sourced for, 4) company sourced for, 5) email sourced for, 6) phone sourced for, 7) fax sourced for, 8) type of customer, 9) manufacturer, 10) quantity, 11) part number, 12) description and 13) model.

9. The method of claim 8, wherein storing part information corresponding to a plurality of new, used and reman parts comprises storing a part number, a part description and a part quantity for each part of the plurality of new, used and reman parts.

10. The method of claim 9, wherein storing part information corresponding to a plurality of new, used and reman parts further comprises storing at least one of seller information, store branch information, manufacturer, part condition, part cost, list price and any combination thereof.

11. The method of claim 8, wherein receiving input of requested parts further comprises receiving at least one of a part number, a model, an inventory needed, a part source needed and any combination thereof.

12. The method of claim 8, further comprising sending an email from the plurality of third party buyers requesting pricing of the requested parts to the plurality of third party sellers who have matching parts.

13. The method of claim 8, wherein displaying all matching part information corresponding to the input of requested parts further comprises at least one of sending an email, sending a facsimile and providing a downloadable file containing the part information matching the input of requested parts.

14. The method of claim 8, further comprising:
requesting recent parts requested by the plurality of third party buyers by a third party seller through use of the software interface, wherein requesting recent parts requested includes requesting all recent parts requested and matching buyer self entered part number and model to sellers information stored on the parts database; and
displaying a list of recent parts requested through the software interface.

15. The method of claim 14, wherein displaying a list of recent parts requested further comprises at least one of ending an email, sending a facsimile and providing a downloadable file containing the list of recent parts requested.

16. The method of claim 14, further comprising updating contact information and part inventory of the plurality of third party sellers through the software interface, wherein updating inventory may comprise at least one of an export of the seller's inventory by model, a parts look up to determine what models a particular part fits and any combination thereof.

17. A method of using a parts usage comparison system for buying and selling parts, the method comprising:
storing part information corresponding to a plurality of new, used and reman parts, the part information comprising existing new, used and reman parts inventory of a plurality of third party sellers on at least one parts database;
receiving input of requested parts from a plurality of third party buyers through a software interface;
processing the input of requested parts with a processor to determine matches of the requested parts and the part information;
displaying all matching part information corresponding to the input of requested parts through the software interface, wherein the input of requested parts comprises at least one of gold mine matches, matching seller data with gold mine information exported in a spreadsheet, matching the seller data with the gold mine information exported in a postcard, and matching the seller data with the gold mine information exported in a text file, wherein a goldmine file must contain the following thirteen fields in the order specified: 1) date sent, 2) email of sender, 3) person sourced for, 4) company sourced for, 5) email sourced for, 6) phone sourced for, 7) fax sourced for, 8) type of customer, 9) manufacturer, 10) quantity, 11) part number, 12) description and 13) model.

18. The method of claim 17, wherein storing part information corresponding to a plurality of new, used and reman parts comprises storing a part number, a part description, a part quantity and at least one of seller information, store branch information, manufacturer, part condition, part cost, list price and any combination thereof for each part of the plurality of new, used and reman parts.

19. The method of claim 17, wherein receiving input of requested parts further comprises receiving at least one of a part number, a model, an inventory needed, a part source needed and any combination thereof.

20. The method of claim 17, further comprising:
requesting recent parts requested by the plurality of third party buyers by a third party seller through use of the software interface, wherein requesting recent parts requested includes requesting all recent parts requested and matching buyer self entered part number and model to sellers information stored on the parts database;
displaying a list of recent parts requested through the software interface; and
updating contact information and part inventory of the plurality of third party sellers through the software interface, wherein updating inventory may comprise at least one of an export of the seller's inventory by model, a parts look up to determine what models a particular part fits and any combination thereof.

* * * * *